United States Patent
Sundararaman et al.

(10) Patent No.: US 10,671,916 B1
(45) Date of Patent: Jun. 2, 2020

(54) SYSTEMS AND METHODS TO EXECUTE EFFICIENTLY A PLURALITY OF MACHINE LEARNING PROCESSES

(71) Applicant: DataRobot, Inc., Boston, MA (US)

(72) Inventors: Swaminathan Sundararaman, San Jose, CA (US); Lior Khermosh, Givataim (IL); Gal Zuckerman, Holon (IL)

(73) Assignee: DataRobot, Inc., Boston, MA (US)

( * ) Notice: Subject to any disclaimer, the term of this patent is extended or adjusted under 35 U.S.C. 154(b) by 661 days.

(21) Appl. No.: 15/270,447

(22) Filed: Sep. 20, 2016

Related U.S. Application Data

(60) Provisional application No. 62/333,162, filed on May 7, 2016, provisional application No. 62/275,261, filed on Jan. 6, 2016, provisional application No. 62/251,718, filed on Nov. 6, 2015, provisional application No. 62/234,149, filed on Sep. 29, 2015.

(51) Int. Cl.
*G06N 3/08* (2006.01)
*G06N 3/04* (2006.01)

(52) U.S. Cl.
CPC .................. *G06N 3/08* (2013.01); *G06N 3/04* (2013.01)

(58) Field of Classification Search
CPC ..................................... G06N 3/04; G06N 3/08
See application file for complete search history.

(56) References Cited

U.S. PATENT DOCUMENTS

| | | | | |
|---|---|---|---|---|
| 2010/0223213 | A1* | 9/2010 | Su | G06N 20/00 706/12 |
| 2013/0080641 | A1* | 3/2013 | Lui | H04L 67/10 709/226 |
| 2014/0142929 | A1* | 5/2014 | Seide | G06N 3/08 704/202 |
| 2016/0034809 | A1* | 2/2016 | Trenholm | H04L 41/5041 706/20 |

(Continued)

OTHER PUBLICATIONS

Dean etal. "Large Scale Distributed Deep Networks" NIPS 2012 [Published Online 2012] [Retrieved Online May 2019] (Year: 2012) Year: 2012).*

(Continued)

*Primary Examiner* — Kamran Afshar
*Assistant Examiner* — Randall K. Baldwin
(74) *Attorney, Agent, or Firm* — Goodwin Procter LLP

(57) ABSTRACT

Described herein are systems and methods for executing efficiently, in real-time, a plurality of machine learning processes. In one embodiment, a computing platform with multiple compute elements receives multiple data streams, each such stream associated with its own respective machine learning process. Each machine learning process is operative to use its data stream as input to train, in real-time, a respective mathematical model. Each of the processes has peaks and dips in processing demands. The system re-allocates, in real-time, compute elements from the processes with lower processing demands to processes with higher processing demands, thereby handling all of the multiple processes on-the-fly, preventing peak demands from causing the system to stall, and reducing overall the computational resources required by the system.

20 Claims, 15 Drawing Sheets

(56) References Cited

U.S. PATENT DOCUMENTS

2016/0078361 A1* 3/2016 Brueckner .............. H04L 67/10
  706/12
2017/0220949 A1* 8/2017 Feng ...................... G06N 20/00

OTHER PUBLICATIONS

Zhang et al. "Poseidon: A System Architecture for Efficient GPU-based Deep Learning on Multiple Machines" arXiv.org [Published Online Dec. 19, 2015] [Retrieved online May 2019] (Year: 2015) (Year: 2015).*

Herrero-Lopez et al. "Parallel Multiclass Classification using SVMs on GPUs" GPGPU '10, Mar. 14, 2010 [Retrieved online May 2019] (Year: 2010) (Year: 2010).*

* cited by examiner

SYSTEMS AND METHODS TO EXECUTE EFFICIENTLY A PLURALITY OF MACHINE LEARNING PROCESSES

CROSS REFERENCE TO RELATED APPLICATIONS

The present application is also related to and claims priority under 35 USC § 120 to U.S. Provisional Application No. 62/234,149, filed on Sep. 29, 2015, which is hereby incorporated by reference.

The present application is also related to and claims priority under 35 USC § 120 to U.S. Provisional Application No. 62/251,718, filed on Nov. 6, 2015, which is hereby incorporated by reference.

The present application is also related to and claims priority under 35 USC § 120 to U.S. Provisional Application No. 62/275,261, filed on Jan. 6, 2016, which is hereby incorporated by reference.

The present application is also related to and claims priority under 35 USC § 120 to U.S. Provisional Application No. 62/333,162, filed on May 7, 2016, which is hereby incorporated by reference.

BACKGROUND

Modern computer systems may be required to execute multiple machine learning processes simultaneously and in real-time. Such systems often rely upon streaming data as a real-time training input to the machine learning processes, in which data that is located initially outside the system streams continuously into the system. As long as system processing capacity meets or exceeds the demands created by the streaming data and the tasks being performed by the system, the system performs properly. However, if the demands so created exceed the processing capacity of the system, the continuation of in-streaming data will cause the system to stall, or will lead to the loss of critical data, or will create other problems of system performance. It is known that machine learning processes often require a training of multiple mathematical models. It is also know that such training can create enormous variability in processing demand, perhaps as much as two orders of magnitude, or even more, from a base case. Systems and methods are required for meeting in real-time the great variability of processing demand in such cases.

SUMMARY

Described herein are systems and methods to execute efficiently multiple machine learning processes in order to manage efficiently large variability in processing demands.

One embodiment is a system (FIG. 19A and FIG. 19B) operative to execute in real-time a plurality of machine learning processes. In one particular form of such embodiment, the system is a computing platform that includes multiple compute elements. The system includes also multiple streams of data sets that are sent to and received by the computing platform, and that are associated with, respectively, multiple machine learning processes, in which each of the machine learning processes is operative to use its respective stream as real-time input in order to train, in real-time, a respective mathematical model, and in which each of the machine learning processes is characterized by having peak and dip demands for computational resources during progression of the training of the respective mathematical model. Further, the system is configured to re-allocate, in real-time, the compute elements to the different machine learning processes according the varying peak and dip demands, such that all of the peak demands are handled by the system on-the-fly by re-allocating more compute elements to the machine learning processes when they have peak demands, and correspondingly allocating fewer compute elements to the machine learning processes when they do not have peak demands (and preferably, when they are at or close to dip demands). The result of such re-allocations by the system is that the system prevents peak demands from causing the system to stall or to otherwise fail in the training of real-time mathematical models.

One embodiment is a method (FIG. 20A) for efficiently executing multiple machine learning processes. In one particular form of such embodiment, there is a computing platform that includes multiple compute elements, and such computing platform receives a plurality of streams of data sets. Further, the compute platform uses multiple data streams as inputs, in order to train continuously multiple mathematical models, in which the continuous training is executed respectively as multiple machine learning processes in conjunction with the compute elements. Further, during its execution of the multiple machine learning processes, the computing platform detects a temporary condition in which one of the continuous training of one of the mathematical models is lagging behind its respective data stream, and this lag is a result of a temporary computational state associated with the mathematical model and the respective data stream. Further, the system re-allocates, at least temporarily, some of the multiple compute elements away from at least some of the continuous training currently requiring less computational resources, and toward boosting performance of the continuous training that is lagging behind the stream. This diversion allows the computing platform to cope with the temporary condition.

One embodiment is a method (FIG. 20B) for reducing significantly the processing resources required to accomplish multiple real-time machine learning processes. In one particular form of such embodiment, a computing platform includes multiple compute elements, and performs multiple real-time machine learning processes associated with, respectively, multiple real-time data streams, in which each of the machine learning processes is inherently characterized by having a peak demand for computational resources that is significantly higher than an average demand for computational resources. Further, according to the different and varying demands of the different machine learning processes, the computing platform re-allocates in real-time the compute elements in the system such that all of the peak demands are handled by the computing platform on-the-fly, thereby preventing the peak demands of one or more machine learning processes from causing the system to stall. Further, the re-allocation of compute elements to meet the requirements of peak demand significantly increases the utilization rate of the compute elements, thereby decreasing the actual number of compute elements needed to achieve the objective of preventing system stall.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Described herein are systems and methods for obtaining and processing data cooperatively between a local compute element, sometimes called herein a "first compute element", and a computing platform.

Figure 1:
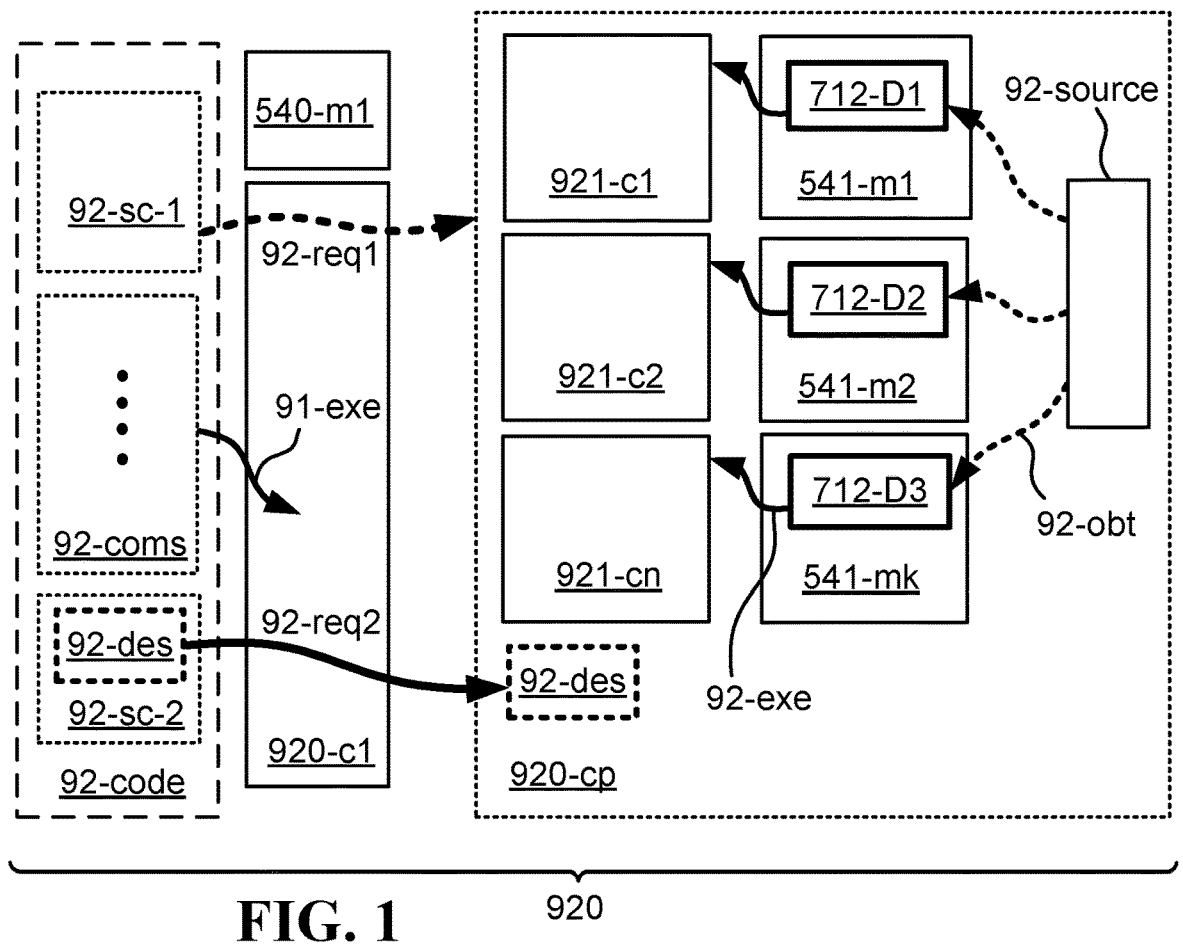
FIG. 1 illustrates one embodiment of a system operative to obtain and process data cooperatively between a first compute element and a computing platform.

FIG. 1 illustrates one embodiment of a system 920 operative to obtain and process data cooperatively between a first compute element 920-$c1$ and a computing platform 920-$cp$. In various embodiments, there is a local compute element 920-$c1$ and a computing platform 920-$cp$. The computing platform 920-$cp$ includes multiple compute elements or other CPUs (central processing units) 921-$c1$, 921-$c2$, 921-$cn$, and multiple memories 541-$m1$, 541-$m2$, 541-$mk$, which may be any combination of cache memories, internal memory modules, or external memory modules. Therefore, in comparison to the computing platform 920-$cp$, the local compute element 920-$c1$ is limited in both memory storage 540-$m1$ and processing power.

The local compute element 920-$c1$ has direct access to a first code sequence 92-$code$, which includes at least two specific commands 92-$sc$-1, 92-$sc$-2. The first specific command 92-$sc$-1 instructs the system 920 to obtain at least a first data set 712-D1, 712-D2, 712-D3, in which the data set includes data of a certain type. The local compute element 920-$c1$ reads the first specific command 920-$sc$-1, understands the type of data to be obtained, understands further that the type of data is such that either the local compute element 920-$c1$ is unable to obtain and/or process the data set, or that the data set may be obtained and processed much more efficiently by the computing platform 920-$cp$, with its superior memory and processing capabilities. For example, the task may require the obtaining and processing a very large amount of data, which cannot be handled easily (or perhaps cannot be handled at all) by a single local compute element 920-$c1$ limited in memory storage and processing capacity. Or for example, the task may require obtaining data that has been organized into a relative large number of distinct data elements, in which the structure of the data (including not just the data itself, but also the relationships that create the elements) cannot be handled easily (or perhaps cannot be handled at all) by the single compute element 920-$c1$. Or for example, even if the data might be obtained well by the local compute element 920-$c1$, the processing to be executed may simply be too complex to be implemented easily (or perhaps cannot be implemented at all) by the local compute element 920-$c1$ with its limited processing capacity. This might be the case, for example, in data transactions with heavy mathematical content, such as the multiplying of two or more matrices. This might be the case, for example, for data transactions that include heavy visual representations, which is not unusual in computer languages such as MATLAB or R. In such cases, the local compute element 920-$c1$ may make a first request 92-$req1$ to the computing platform that the computing platform obtain 92-*obt* and store the required data set.

The second specific command 92-*sc*-2 instructs the system 920 to execute a certain operation on the obtained data. The local compute element recognizes that the second command 92-*sc*-2 is associated with the first data set 712-D1, 712-D2, 712-D3 that was obtained and stored. The local compute element 920-*c*1 understands also that, for one or more of the reasons listed above, the data set should be obtained 92-*obt* and processed by the computing platform 920-*cp* rather than by the local compute element 920-*c*1. Therefore, after it has received and interpreted the second specific command 92-*sc*-2, the local compute element 920-*c*1 sends a second request 92-*req*2 to the computing platform 920-*c*1, asking the computing platform 920-*cp* to execute 92-*exe* the operation required by the second specific command 92-*sc*-2, on the data that was obtained 92-*obt* and stored in conjunction with the first specific command 92-*sc*-1.

For its part, the computing platform 92-*cp* receives the first request 92-*req*1 from the local compute element 920-*c*1, and, in accordance with such first request 92-*req*1, obtains 92-*obt* the required data set 712-D1, 712-D2, 712-D3, and stores it in one or more memories (541-*m*1, 541-*m*2, 540-*mk*, or cache memories associated with the computer platform 920-*cp*, or external memories associated with the computing platform). The computing platform 920-*cp* also receives the second request 920-*req*2 from the local compute element 920-*c*1, and, in accordance with such second request 920-*req*2, executes 92-*exe* the required operation on the data set that was previously obtained 92-*obt* in accordance with the first request 920-*sc*-1 from the local compute element 920-*c*1. Such execution 92-*exe* may be in one or several of the compute elements or other CPUs 921-*c*1, 921-*c*2, 921-*cn* associated with the computing platform 920-*cp*.

In some embodiments, the local compute element 920-*c*1 conveys to the computing platform 920-*cp*, as part of the second request 92-*sc*-2, a description or instruction or identification 92-*des* of a certain operation (hereinafter "description") that is to be performed by the computing platform 92-*cp* on the obtained data set 712-D1, 712-D2, 712-D3, in addition to the general request that an operation be performed on the obtained data set. As one general case, the description 92-*des* of a certain operation may be the exact manner in which the computing platform 920-*cp* is to distribute the imminent operation among various compute elements or other CPUs 921-*c*1, 921-*c*2, 921-*cn*, associated with the computing platform 920-*cp*. One specific example of this general case is executing a single-instruction-multiple-data (SIMD) operation on the obtained data set. A second general case is higher-order function (sometimes called a "functional form"). One specific example of this second general case is a map operation in conjunction with multiple data sets and a lambda operator. A third general case is the streaming of multiple data sets to a plurality of compute elements associated with the computing platform 920-*cp*.

In some embodiments, the data set 712-D1, 712-D2, 712-D3, or one or more of multiple data sets, obtained 92-*obt* by the computing platform 920-*cp*, may be obtained 92-*obt* from a specific data source 92-*source* that holds the requested data. This specific data source 92-*source* may be a source within the computing platform as shown in FIG. 1, or may be external to but in communicative contact with the computing platform 920-*cp*, or may be multiple data sources with some sources within the computing platform 920-*cp* and some sources external to the computing platform 920-*c*.

In some embodiments, the first code sequence 920-*code* includes various commands 92-*coms* in addition the two specific commands 92-*sc*-1, 92-*sc*-2. These additional commands 92-*coms* may be executed 91-*exe* by the local compute element 920-*c*1 using the first memory 540-*m*1 associated with the compute element 920-*c*1 and the processing power of the local compute element 920-*c*1. In cases in which this occurs, the execution 91-*exe* of the additional commands 92-*coms* by the local compute element 920-*c*1 does not prevent or otherwise negatively impact the obtaining 92-*obt* of data sets in accordance with the first specific command 92-*sc*-1 or the execution 92-*exe* of operations in accordance with the second specific command 92-*sec*-2. Thus, although there is still cooperation between the local compute element 920-*c*1 and the computing platform 920-*cp* in fulfilling the first 92-*sc*-1 and second 92-*sc*-2 specific commands, nevertheless some of the tasks required in executing the entire first code sequence 92-*code* may be realized locally by the local compute element 920-*c*1.

In all of the various embodiments described herein, a "data set" that is obtained and processed by the system 920 may also be a data corpus that includes, by itself, multiple data sets.

One embodiment is a system 920 operative to obtain and process data cooperatively. In one particular form of such embodiment, the system 920 includes a first compute element 920-*c*1 that has access to a first code sequence 92-*code*. The first code sequence 92-*code* is operative to instruct execution of a first processing task, and includes at least a first specific command 92-*sc*-1 and a second specific command 920-*sc*-2, in which the first specific command 92-*sc*-1 is operative to instruct the system 920 to obtain at least a first data set 712-D1, 712-D2, 712-D3 of a certain type, and the second specific command 920-*sc*-2 is operative to instruct the system 920 to execute 92-*exe*a certain operation associated with the first processing task in conjunction with the first data set 712-D1, 712-D2, 712-D3 obtained. The system includes also a computing platform 920-*cp* communicatively connected with the first compute element 920-*c*1. Further, the first compute element 920-*c*1 is configured, during execution of the first code sequence 92-*code*: (i) to detect, in conjunction with the first specific command 92-*sc*-1, the certain type of the first data set 712-D1, 712-D2, 712-D3, and consequently (ii) to decide to cooperate with the computing platform 920-*cp* by sending a request 92-*req*1, to the computing platform 920-*cp*, to obtain the first data set 712-D1, 712-D2, 712-D3. Further, the computing platform 920-*cp* is configured: (i) to receive the request 92-*req*1 from the first compute element 920-*c*1, and consequently (ii) to obtain 92-*obt* the first data set in the computing platform. Further, the first compute element 920-*c*1 is further configured, during the execution of the first code sequence 92-*code*, and under the decision to cooperate: (i) to identify that the second specific command 92-*sc*-2 is associated with the first data set 712-D1, 712-D2, 712-D3, and consequently (ii) to send a second request 92-*req*2, to the computing platform 920-*cp*, to execute the certain operation on the first data set 712-D1, 712-D2, 712-D3. Further, the computing platform 920-*cp* is further configured: (i) to receive the second request 92-*req*2, and consequently (ii) to execute 92-*exe* the certain operation in conjunction with the first data set 712-D1, 712-D2, 712-D3.

In a first alternative to the system 920 operative to obtain and process data cooperatively, further the second request 92-*req*2 conveys to the computing platform 920-*cp* a description 92-*des* or an instruction or an identification of the certain operation prior to the execution 92-*exe* of the certain operation by the computing platform 920-*cp*.

In a second alternative to the system 920 operative to obtain and process data cooperatively, further the computing platform 920-*cp* is also configured to return to the first compute element 920-*c*1 a result of the execution 92-*exe* of the certain operation.

In a third alternative to the system 920 operative to obtain and process data cooperatively, further the first code sequence 92-*code* also includes additional commands 92-*coms*, the first compute element 920-*c*1 is associated with a first memory 540-*m*1, and the computing platform 920-*cp* is associated with a second memory 541-*m*1, 541-*m*2, 541-*mk*. Further, the first compute element 920-*c*1 is configured to execute 91-*exe* the additional commands 92-*coms* in conjunction with the first memory 540-*m*1, thereby realizing some aspects of the first processing task locally, while the obtaining 92-*obt* of the first data set 712-D1, 712-D2, 712-D3 and execution 92-*exe* of the certain operation in conjunction with the first data set 712-D1, 712-D2, 712-D3 is handled by the computing platform 920-*cp* in conjunction with the second memory 541-*m*1, 541-*m*2, 541-*mk*, thereby achieving the cooperation between the first compute element 920-*c*1 and the computing platform 920-*cp*.

In a possible configuration of the third alternative just described, further the first data set 712-D1, 712-D2, 712-D3 is of a size above one Terabyte, the first compute element 920-*c*1 and the first memory 540-*m*1 are a personal computer (PC), the computing platform 920-*cp* includes a plurality of compute elements 921-*c*1, 921-*c*2, 921-*cn*, and the second memory 541-*m*1, 541-*m*2, 541-*mk* is a distributed random-access-memory associated with the plurality of compute elements 921-*c*1, 921-*c*2, 921-*cn*, in which the second memory 541-*m*1, 541-*m*2, 541-*mk* is large enough to hold the first data set 712-D1, 712-D2, 712-D3 and thereby facilitate efficient execution of the certain operation on the first data set 712-D1, 712-D2, 712-D3.

Figure 2:
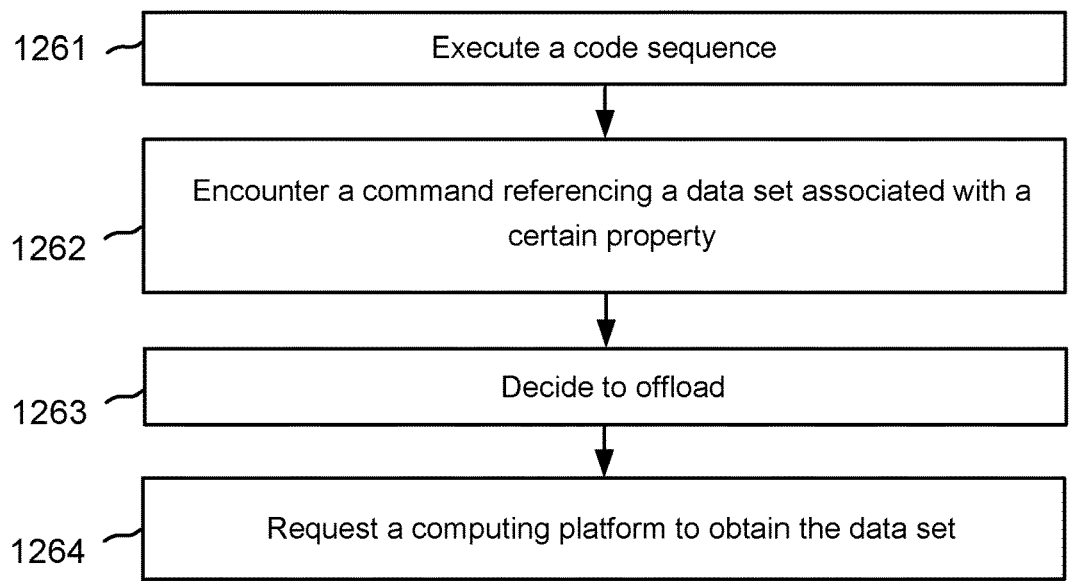
FIG. 2 illustrates one embodiment of a method by which certain aspects of executing a processing task are offloaded from a local computing element to a computing platform.

FIG. 2 illustrates one embodiment of a method for offloading certain aspects of executing a processing task from a first compute element to a computing platform. In step 1261, a first compute element 920-*c*1 executes a first processing task by following a first code sequence 92-*code*. In step 1262, while following the first code sequence 92-*code*, the first compute element 920-*c*1 encounters a command 92-*sc*-1 that, for the first time, references a first data set 712-D1, 712-D2, 712-D3 associated with a certain property. In step 1263, as a result of such property encountered, the first compute element 920-*c*1 decides that the first compute element 920-*c*1 is not optimally suitable for, or not capable of, directly handling the first data set referenced 712-D1, 712-D2, 712-D3. In step 1264, consequently, the first compute element 920-*c*1 requests, from a computing platform 920-*cp*, to obtain the first data set 712-D1, 712-D2, 712-D3, in the computing platform 920-*cp*, on behalf of the first compute element 920-*c*1, and in facilitation of an imminent operation associated with the first data set and incoming in the first code sequence 92-*code*, thereby freeing the first compute element 920-*c*1 from directly handling the first data set 712-D1, 712-D2, 712-D3 in conjunction with the imminent operation.

In a first possible alternative to the method just descried for offloading certain aspects of executing a processing task, further the computing platform 920-*cp* obtains 92-*obt*, in the computing platform 920-*cp*, the first data set 712-D1, 712-D2, 712-D3.

In a first possible configuration of the first alternative embodiment just described, further the obtaining 92-*obt* of the first data set 712-D1, 712-D2, 712-D3 is achieved in the computing platform 920-*cp* by reading the first data set from a source 92-*socure* to a memory 541-*m*1, 541-*m*2, 541-*nk* in the computing platform 920-*cp*.

In a first possible variation of the first possible configuration just described, further the source 920-*source* is selected from a group consisting of (i) a disk, (ii) a flash memory, (iii) a non-volatile memory, and (iv) a network interface card (NIC).

In a second possible variation of the first possible configuration just described, further the memory 541-*m*1, 541-*m*2, 541-*mk* is selected from a group consisting of (i) a random access memory (RAM), (ii) a memory module, and (iii) a plurality of memory modules.

In a second possible configuration of the first alternative embodiment described above, further the obtaining 92-*obt* of the first data set 712-D1, 712-D2, 712-D3 is achieved in the computing platform 920-*cp* by generating or synthesizing the first data set in the computing platform 920-*cp*.

In a second possible alternative to the method described above for offloading certain aspects of executing a processing task, further while following the first code sequence 92-*code*, the first compute element 920-*c*1 encounters another command 92-*sc*-2 associated with the imminent operation. Based on the decision, the first compute element 920-*c*1 requests 92-*req*2 the computing platform 920-*cp* to execute the imminent operation using the data set 712-D1, 712-D2, 712-D3 previously obtained 92-*obt* in the computing platform 920-*cp*, thereby offloading from the first compute element 920-*c*1 at least those aspects of executing the first processing task that are associated with the first data set 712-D1, 712-D2, 712-D3 in conjunction with the imminent operation.

In a first possible configuration of the second possible alternative just described, further the computing platform 920-*cp* executes the imminent operation using the data set 712-D1, 712-D2, 712-D3 previously obtained 92-*obt* in the computing platform 920-*cp*.

In a second possible configuration of the second possible alternative just described, further the request 92-*req*2 to execute the imminent operation is sent to the computing platform 920-*cp* in conjunction with a description 92-*des* of the imminent operation or a derivation thereof, and such description 92-*des* is used by the computing platform 920-*cp* for the execution 92-*exe*.

In a first possible variation of the second possible configuration just described, further the another command 92-*cs*-2 includes the description 92-*des* of the imminent operation.

In a second possible variation of the second possible configuration just described, further the imminent operation is selected from a group consisting of (i) a matrix multiplication in which the first data set 712-D1, 712-D2, 712-D3 is one matrix, (ii) any mathematical function to be applied on the first data set 712-D1, 712-D2, 712-D3, and (iii) any sorting, counting, or filtering operation to be applied on the first data set 712-D1, 712-D2, 712-D3.

In a third possible alternative to the method described above for offloading certain aspects of executing a processing task, further the first command 92-*sc*-1 is a variable initialization command including a variable name to be associated with the first data set 712-D1, 712-D2, 712-D3, and a type of variable to be associated with the first data set 712-D1, 712-D2, 712-D3, thereby achieving the reference to the first data set 712-D1, 712-D2, 712-D3 for the first time. As just one example, if the first command is "Huge_Array Array1", the word "Huge_Array" is the type of the variable, and the word "Array1" is the variable name to be associated with the first data set 712-D1, 712-D2, 712-D3.

In a first possible configuration of the third possible alternative just described, further the certain property is the type of variable appearing in the first command 92-sc-1, in which the decision is based on recognizing the type of variable as a specific type of variable that is not to be handled by the first compute element 920-c1. Continuing the first example in which a first command is "Huge_Array Array 1", the type of variable "Huge_Array" is recognized, from a list of possible types of variables, as a type of variable that is outside the scope of the first compute element's ability to handle directly, and this recognition facilitates said decision.

In a fourth possible alternative to the method described above for offloading certain aspects of executing a processing task, further the first command 92-sc-1 is a variable assignment command including a variable name to be associated with the first data set 712-D1, 712-D2, 712-D3, and an identification of a source 92-source from which to obtain the first data set 712-D1, 712-D2, 712-D3, thereby achieving the reference to the first data set 712-D1, 712-D2, 712-D3 for the first time. As one example, if the first command is "Array1=Get_Data_From_Disk", the word "Array1" is the variable name to be associated with the first data set 712-D1, 712-D2, 712-D3, and the word "Get_Data_From_Disk" is the identification of the source 92-source.

In a fifth possible alternative to the method described above for offloading certain aspects of executing a processing task, further the certain property is a threshold size of the first data set 712-D1, 712-D2, 712-D3, in which the decision is made provided that the size of the first data set 712-D1, 712-D2, 712-D3, or a size expected in conjunction with the first data set 712-D1, 712-D2, 712-D3, is above the threshold size.

In a sixth possible alternative to the method described above for offloading certain aspects of executing a processing task, further the certain property is a threshold number of data elements in the first data set 712-D1, 712-D2, 712-D3, in which the decision is made provided that the number of data elements in the first data set 712-D1, 712-D2, 712-D3 is above the threshold number.

In a seventh possible alternative to the method described above for offloading certain aspects of executing a processing task, further the first compute element 920-c1 is associated with a first memory 540-m1, and the computing platform 920-cp is associated with a second memory 541-m1, 541-m2, 541-mk that is at least 10 (ten) times larger than the first memory 540-m1. Further, the first compute element 920-c1 is not optimally suitable for, or not capable of, directly handling the first data set 712-D1, 712-D2, 712-D3 referenced as a result of the first memory 540-m1 being insufficiently large to store or otherwise facilitate the first data set 712-D1, 712-D2, 712-D3. Further, the computing platform 920-cp is optimally suitable for, or otherwise capable of, directly handling the first data 712-D1, 712-D2, 712-D3 set referenced as a result of the second memory 541-m1, 541-m2, 541-mk being sufficiently large to store or otherwise facilitate the first data set 712-D1, 712-D2, 712-D3.

In a first possible configuration of the seventh possible alternative just described, further the second memory 541-m1, 541-m2, 541-mk is selected from a group consisting of (i) a memory pool, (ii) a memory pool shared by a plurality of processing elements belonging to the computing platform, (iii) a distributed memory, (iv) a plurality of memory modules, and (v) a random access memory.

In a second possible configuration of the seventh possible alternative just described, further the first data set 712-D1, 712-D2, 712-D3 is a data corpus including a plurality of data sets 712-D1, 712-D2, 712-D3.

In a eighth possible alternative to the method described above for offloading certain aspects of executing a processing task, further the first compute element 920-c1 has a certain finite processing power, and the computing platform 920-cp includes a plurality of connected compute elements 921-c1, 921-c2, 921-cn, having a collective processing power that is at least 10 (ten) times higher than the certain finite processing power. Further, the first compute element 920-c1 is not optimally suitable for, or not capable of, directly handling the first data set 712-D1, 712-D2, 712-D3 referenced as a result of the certain finite processing power being insufficiently high to process or otherwise facilitate processing of the first data set 712-D1, 712-D2, 712-D3. Further, the computing platform 920-cp is optimally suitable for, or otherwise capable of, directly handling the first data set 712-D1, 712-D2, 712-D3 referenced as a result of the collective processing power being sufficiently large to process or otherwise facilitate processing of the first data set 712-D1, 712-D2, 712-D3. The relative abilities of the first compute element 920-c1 and the computing platform 920-cp to handle the first data set 712-D1, 712-D2, 712-D3 further facilitate the decision.

In a first possible configuration of the eighth possible alternative just described, further while following the first code sequence 92-code, the first compute element 920-c1 encounters another command 92-sc-2 associated with the imminent operation. Further, based on the decision, the first compute element 920-c1 requests 92-req2 the computing platform 920-cp to execute the imminent operation using the data set 712-D1, 712-D2, 712-D3 previously obtained 92-obt in the computing platform 920-cp, thereby offloading from the first compute 920-c1 element at least those aspects of executing the first processing task that are associated with the first data set 712-D1, 712-D2, 712-D3 in conjunction with the imminent operation. Further, the requesting 92-req2 to execute the imminent operation is sent by the first compute element 920-c1 to the computing platform 920-cp in conjunction with an execution instruction that describes 92-des or instructs or identifies, to the computing platform 920-cp, an exact way by which the computing platform 920-cp is to distribute the imminent operation among the plurality of connected compute elements 921-c1, 921-c2, 921-cn. Various non-exclusive examples include: (i) executing a SIMD in conjunction with multiple data sets, (ii) executing a Map operation in conjunction with multiple data sets and a lambda operator, and (iii) executing the streaming of multiple data sets to a plurality of compute elements. In these examples, and other cases, the first data set 712-D1, 712-D2, 712-D3 may be a data corpus including, by itself, a plurality of data sets in accordance with some embodiments.

In a ninth possible alternative to the method described above for offloading certain aspects of executing a processing task, further the first command 92-sc-1, or a following command which is a specific command to obtain the first data set 712-D1, 712-D2, 712-D3, is a variable assignment command comprising a variable name associated with the first data set, and an identity of a source 92-source from which to obtain the first data set 712-D1, 712-D2, 712-D3. For example, in the command, "Array1=Get_Data_From_Disk", the word "Array1" is the variable name associated with the first data set, and the word "Get_Data_From_Disk" is the identification of the source, Further, the identity of the source 92-*source* is passed from the first compute element 920-*c*1 to the computing platform 920-*cp* in conjunction with the request 92-*req*1 by the first compute element 920-*c*1, to the computing platform 920-*cp*, to obtain the first data set 712-D1, 712-D2, 712-D3, and in which the identity passed is used by the computing platform 920-*cp* for the obtaining 92-*obt* of the first data set 712-D1, 712-D2, 712-D3.

In a tenth possible alternative to the method described above for offloading certain aspects of executing a processing task, further the first command 92-*sc*-1, or a following command which is a specific command to obtain the first data set 712-D1, 712-D2, 712-D3, is a variable assignment command comprising a variable name associated with the first data set 712-D1, 712-D2, 712-D3, and an analytical or otherwise synthesizable expression. For example, the expression could be, "Array1={an analytical expression}". Further, the analytical or otherwise synthesizable expression, either as is or in a derived form, is passed from the first compute element 920-*c*1 to the computing platform 920-*cp* in conjunction with the request 92-*req*1 by the first compute element 920-*c*1, and in which the analytical or otherwise synthesizable expression passed is used by the computing platform 920-*cp* to synthesize the first data set 712-D1, 712-D2, 712-D3, thereby achieving the obtaining 92-*obt* of the first data set 712-D1, 712-D2, 712-D3.

Described herein are systems and methods to efficiently execute a sequence of computational commands located in a code sequence that includes, in addition to the computational commands, general commands and specific commands.

Figure 3:
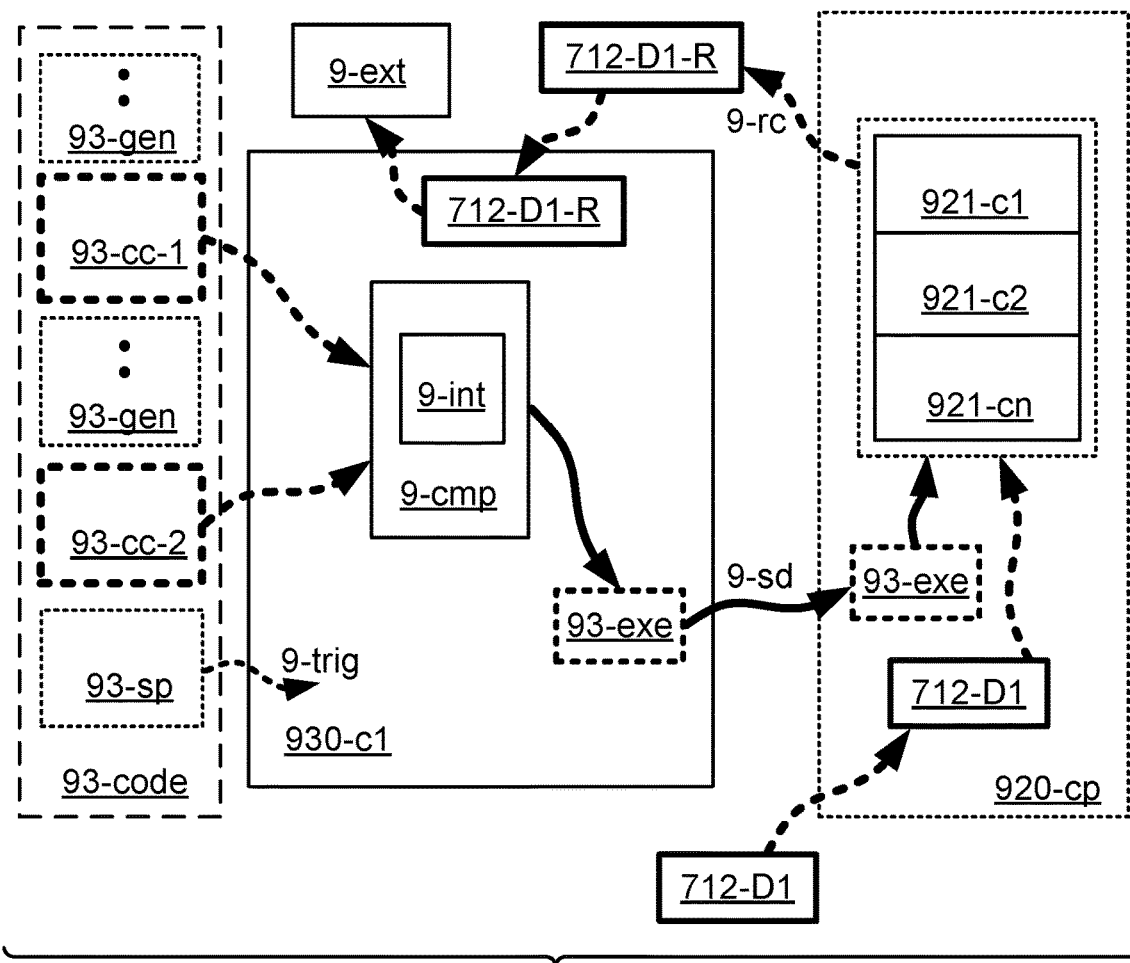
FIG. 3 illustrates one embodiment of a system operative to execute efficiently a sequence of computational commands.

FIG. 3 illustrates one embodiment of a system 930 operative to execute efficiently a sequence of computational commands. In various embodiments, there is a code sequence 93-*code* that includes a sequence of general commands 93-*gen*, at least two computational commands 93-*cc*-1, 93-*cc*-2 that are embedded in such sequence 93-*gen* and that constitute steps for transforming an original data set 712-D1 into a resulting date set 712-D1-R1, and a specific command 93-*sp* that, when executed, instructs the performing of a specific action. The system includes also a first compute element 930-*c*1, that receives the code sequence 93-*code*, executes the sequence of general commands 93-*gen*, but defers execution of the computational commands 93-*cc*-1, 93-*cc*-2 until the resulting data set 712-D1-R is needed to perform the certain action required by the specific command 93-*sp*. When the first compute element 930-*c*1 encounters the specific command 93-*sp*, this encounter triggers 9-*trig* a compilation process 9-*cmp* in which the first compute element 930-*c*1 first converts the computational commands 93-*cc*-1, 93-*cc*-2 from a first high level programming language into an intermediary cod 9-*int* in a second high level programming language, and then compiles the converted intermediary code from the second high level programming language into executable instructions 93-*exe*. The first compute element 930-*c*1 then sends 9-*sd* the compiled executable instructions 93-*exe* to a computing platform.

The computing platform 920-*cp* includes multiple other compute elements 921-*c*1, 921-*c*2, 921-*cn*, and has received previously, or does receive after receipt of the compiled executable instructions 93-*exe*, the original data set 712-D1. The other compute elements 921-*c*1, 921-*c*2, 921-*cn* in the computing platform 920-*cp* perform an efficient transformation of the original data set 712-D1 into the resulting data set 712-D1-R according to the executable instructions 93-*exe*, by executing the executable instructions 93-*exe*. The transformation is "efficient" in that multiple steps required by the computational commands 93-*cc*-1, 93-*cc*-2, are executed together, or seriatim one right after the other, such that there is no need to store and recall intermediate results. The computing platform 920-*cp* then sends the resulting data set 712-D1-R to the first compute element 930-*c*1.

The first compute element receives 9-*rc* the resulting data set 712-D1-R from the computing platform 920-*cp*. If the received resulting data set 712-D1-R, or at least a certain part of the resulting data set 712-D1-R, is within a predetermined range of values, then the first compute element 930-*c*1 will perform the certain action required by the specific command 93-*sp*. If the resulting data set 712-D1-R, or at least the specific part of the resulting data set 712-D1-R that is relevant to the processing of the code sequence 93-*code*, is not within a predetermined range of values, then the first compute element 930-*c*1 will not perform the certain action required by the specific command 93-*sp*. In some embodiments, the certain action required by the specific command 93-*sp* is that the first compute element 930-*c*1 transport the resulting data set 712-D1-R, or a certain of the resulting data set 712-D1-R, from the first compute element 930-*c*1 to element 9-*ext* that is external to the first compute element 930-*c*1. Such external element 9-*ext* may be any number of components, including, for example, a storage device, a printing device, or a communication device (such as a network interface card, often called a "NIC" card).

One embodiment is a system 930 operative to execute efficiently a sequence of computational commands 93-*cc*-1, 93-*cc*2. In one particular form of such embodiment, the system 930 includes a first compute element 930-*c*1 that is configured to follow a code sequence 93-*code*. The code sequence includes at least two computational commands 93-*cc*-1, 93-*cc*-2 embedded in a sequence of general commands 93-*gen*, and the at least two computational commands constitute, respectively, at least two steps of transforming an original data set 712-D1 into a resulting data set 712-D1-R. The first compute element 930-*c*1 is further configured to execute the sequence of general commands 93-*gen*, but defer execution of the at least two computational commands 93-*cc*-1, 93-*cc*-2 until such time that the resulting data set 712-D1-R is needed in conjunction with performing a certain action. The first compute element is further configured to trigger 9-*trig*, as a result of encountering a specific command 93-*sp* that instructs the performing of the certain action, a compilation process 9-*cmp* in which the at least two computational commands are compiled jointly into executable instructions 93-*exe* operative to perform efficiently the at least two steps together, thereby enabling efficient transformation of the original data set 712-D1 into the resulting data set 712-D1-R in facilitation of performing the certain action. Also in this embodiment, the system 930 includes a computing platform 920-*cp* that is configured to receive, from the first compute element 930-*c*1, the executable instructions 93-*exe* just compiled, thereby enabling the computing platform 920-*cp* to perform the efficient transformation. After performing the efficient transformation from the original data set 712-D1 to the resulting data set 712-D1-R, the computing platform 920-*cp* is further configured to send the resulting data set 712-D1-*r* to the first compute element.

In a first alternative embodiment to the system 930 just described, the first compute element 930-*c*1 is further configured to receive 9-*rc* the resulting data set 712-D1-R from the computing platform 920-*cp*. Also, if the resulting data set 712-D1-4, or a certain portion of the resulting data set 712-D1-4, is within a predetermined range of values, then the first compute element 930-*c*1 is further configured to perform the certain action instructed by the specific command 93-*sp*.

In a possible configuration of the first alternative embodiment just described, the computing platform 920-*cp* includes a plurality of compute elements 912-*c*1, 921-*c*2, 921-*cn* other than the first compute element 930-*c*1. Also, in some embodiments the compilation process 9-*cmp* is optimized for distributing the transformation among the plurality of other compute elements 912-*c*1, 921-*c*2, 921-*cn*, thereby further facilitating the efficient transformation of the original data set 712-D1 into the resulting data set 712-D1-R.

In a second alternative embodiment to the system 930 operative to execute efficiently a sequence of computational commands 93-*cc*-1, 93-*cc*2, as described above, there is no computing platform and rather all the functions are executed by the first compute element 930-*c*1 rather than by any computing platform. In a particular form of this second alternative embodiment, the system 930 includes a first compute element 930-*c*1 that is configured to follow a code sequence 93-*code*. The code sequence includes at least two computational commands 93-*cc*-1, 93-*cc*-2 embedded in a sequence of general commands 93-*gen*, and the at least two computational commands constitute, respectively, at least two steps of transforming an original data set 712-D1 into a resulting data set 712-D1-R. The first compute element 930-*c*1 is further configured to execute the sequence of general commands 93-*gen*, but defer execution of the at least two computational commands 93-*cc*-1, 93-*cc*-2 until such time that the resulting data set 712-D1-R is needed in conjunction with performing a certain action. The first compute element is further configured to trigger 9-*trig*, as a result of encountering a specific command 93-*sp* that instructs the performing of the certain action, a compilation process 9-*cmp* in which the at least two computational commands are compiled jointly into executable instructions 93-*exe* operative to perform efficiently the at least two steps together, thereby enabling efficient transformation by the first compute element 930-*c*1 of the original data set 712-D1 into the resulting data set 712-D1-R in facilitation of performing the certain action.

In one configuration of the second alternative embodiment just described, if the resulting data set 712-D1-4, or a certain portion of the resulting data set 712-D1-4, is within a predetermined range of values, then the first compute element 930-*c*1 is further configured to perform the certain action instructed by the specific command 93-*sp*.

In a possible variation of the configuration just described, further the first compute element 930-1 includes a plurality of compute elements. Further, the compilation process 9-*cmp* is optimized for distributing the transformation among these plurality of other compute elements, thereby further facilitating the efficient transformation of the original data set 712-D1 into the resulting data set 712-D1-R.

Figure 4:
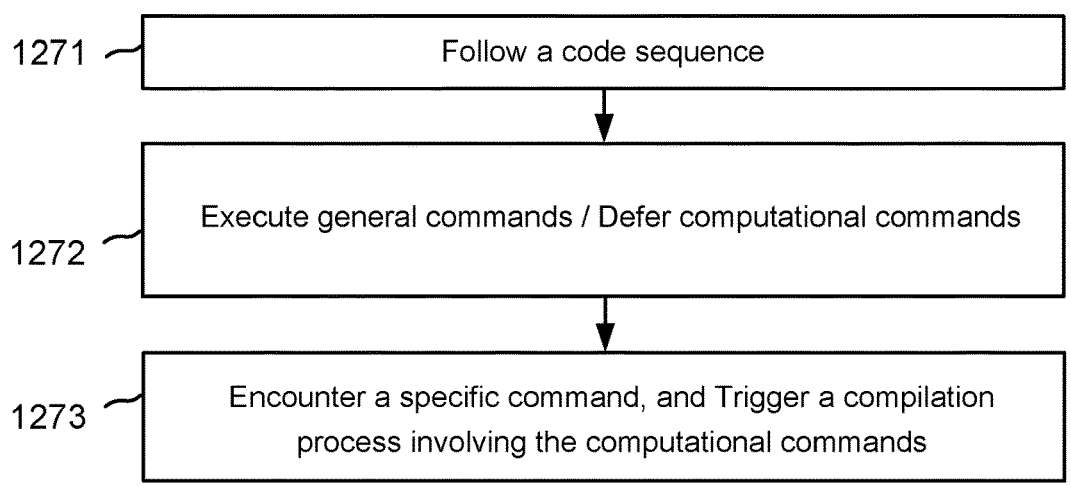
FIG. 4 illustrates one embodiment of a method for executing efficiently a sequence of computational commands.

FIG. 4 illustrates one embodiment of a method for efficiently executing a sequence of computational commands 93-*cc*-1, 93-*cc*-2. In step 1271, a first compute element 930-*c*1 follows a code sequence 93-*code* that includes at least two computational commands 93-*cc*-1, 93-*cc*-2 embedded in a sequence of general commands 93-*gen*, and further in which the at least two computational commands constitute, respectively, at least two steps of transforming an original data set 712-D1 into a resulting data set 712-D1-R. In step 1272, the first compute element 930-*c*1 executes the sequence of general commands 93-*gen*, while deferring execution of the at least two computational commands 93-*cc*-1, 93-*cc*-2 until such time that the resulting data set 712-D1-R is needed in conjunction with performing of a certain action. In step 1273, the first compute element 930-*c*1 encounters a specific command 93-*sp* that instructs the performing of the certain action, thus triggering 9-*trig* a compilation process 9-*cmp* in which the at least two computational commands 93-*cc*-1, 93-*cc*-2 are compiled jointly into executable instructions 93-*exe* operative to perform efficiently the at least two steps together, thereby enabling efficient transformation of the original data set 712-D1 into the resulting data set 712-D1-R in facilitation of performing the certain action.

In a first possible alternative to the method just descried for efficiently executing a sequence of computational commands 93-*cc*-1, 93-*cc*-2, further the specific command 93-*sp* is a control flow statement whose execution by the first compute element 930-*c*1 results in a choice being made as to which of two or more branches should be followed in conjunction with the following of the code sequence 93-*code*, and in which the certain action is the choice being made by the first compute element 930-*c*1.

In a first possible configuration of the first alternative embodiment just described, further the control flow statement is selected from a group consisting of: (i) a conditional branch, (ii) a conditional loop, and (iii) a conditional call to a subroutine.

In a second possible configuration of the first alternative embodiment just described, further the first compute element 930-*c*1 compares the resulting data set 712-D1-R, or a certain part of the resulting data set 712-D1-R, with a predetermined value. Further, the first compute element 930-*c*1 uses a result of such comparison to facilitate the choice.

In a second possible alternative to the method described above for efficiently executing a sequence of computational commands 93-*cc*-1, 93-*cc*-2, further the specific command 93-*sp* is a conditional statement, such as an "if-then" statement or a "switch" statement, in which the certain action is described by the specific command 93-*sp* and is executed by the first compute element 930-*c*1 provided that the resulting data set 712-D1-R, or a certain part of the resulting data set 930-*c*1, is within a predetermined range of values.

In a third possible alternative to the method described above for efficiently executing a sequence of computational commands 93-*cc*-1, 93-*cc*-2, further the certain action is a transport by the first compute element 930-*c*1 of the resulting data set 712-D1-R, or a certain part of the resulting data set 712-D1-R, to an external element 9-*ext*.

In one possible configuration of the first possible alternative embodiment just described, further the external element 9-*ext* is selected from a group consisting of (i) a storage device, (ii) a printing device, and (iii) a communication device such as a network interface card (NIC).

In a fourth possible alternative to the method described above for efficiently executing a sequence of computational commands 93-*cc*-1, 93-*cc*-2, further the first compute element 930-*c*1 executes the executable instructions 93-*exe*, thereby transforming the original data set 712-D1 into the resulting data set 712-D1-R. Further, if the resulting data set 712-D1-R, or a certain part of the resulting data set 712-D1-R, is within a predetermined range of values, then the first compute element 930-*c*1 performs the certain action instructed by the specific command 93-*sp*.

In a fifth possible alternative to the method described above for efficiently executing a sequence of computational commands 93-*cc*-1, 93-*cc*-2, further the first compute element 930-*c*1 sends, to a computing platform 920-*cp*, the executable instructions 93-*exe* just compiled, thereby enabling the computing platform 920-*cp* to perform the efficient transformation of the original data set 712-D1 into the resulting data set 712-D1-R. Further the first compute element 930-*c1* receives 9-*rc* from the computing platform 920-*cp*, the resulting data set 712-D1-R transformed by the computing platform 920-*cp* using the executable instruction 930-*exe* sent by the first compute element 930-*c1* to the computing platform 920-*cp*. Further, the first compute element 930-*c1* performs the certain action provided that the resulting data set 712-D1-R, or a certain part of the resulting data set 712-D1-R, as received from the computing platform 920-*cp*, is within a predetermined range of values.

In one possible configuration of the fifth possible alternative embodiment just described, further the computing platform 920-*cp* includes a plurality of other compute elements 912-*c1*, 921-*c2*, 921-*cn*. Further, the compilation process 9-*cmp* is optimized for distributing the transformation among the plurality of other compute elements 921-*c1*, 921-*c2*, 921-*cn* in accordance with some embodiments, thereby further facilitating the efficient transformation of the original data set 712-D1 into the resulting data set 712-D1-R.

In a sixth possible alternative to the method described above for efficiently executing a sequence of computational commands 93-*cc*-1, 93-*cc*-2, further the first compute element's 930-*c1* execution of the sequence of general commands 93-*gen* includes the first compute element's 930-*c1* use of an interpretation process to execute each of the commands in the sequence of general commands 93-*gen*, in which each of the general commands is interpreted and executed separately by the first compute element 930-*c1*.

In one possible configuration of the sixth possible alternative embodiment just described, further the compilation process 9-*cmp* is different from the interpretation process at least in that the at least two computational commands 93-*cc*-1, 93-*cc*-2 are compiled jointly, and not interpreted separately, into the executable instructions 93-*exe*, such that the execution of the executable instructions 9-*exe* is done instead of interpreting separately the at least two computational commands 93-*cc*-1, 93-*cc*-2, thereby avoiding all together interpretation of the at least two computational commands 93-*cc*-1, 93-*cc*-2, and consequently facilitating the efficient transformation of the original data set 712-D1 into the resulting data set 712-D1-R.

In one possible variation of the possible configuration of the sixth possible alternative embodiment just described, further the code sequence 93-*code* is written in a high level programming language. Also, the compilation process 9-*cmp* includes converting the at least two computational commands 93-*cc*-1, 93-*cc*-2 from the first high level programming language into an intermediary code 9-*int* in a second high level programming language, and also compiling the intermediary code 9-*int* from the second high level programming language into the executable instructions 93-*exe*.

In one possible option of the possible variation just described, further the first high level programming language is selected from a group consisting of: (i) Python, (ii) Matlab, (iii) R, (iv) Java or Java variant, and (v) any interpretable functional programming language.

In a possible form of the possible option just described, further the second high level programming language is selected from a group consisting of: (i) C or C variant, (ii) Pascal, (iii) Fortran, and (iv) any programming language for which an optimizing compiler exists.

In a seventh possible alternative to the method described above for efficiently executing a sequence of computational commands 93-*cc*-1, 93-*cc*-2, further each of the at least two steps of transforming an original data set 712-D1 into a resulting data set 712-D1-R is a mathematical operation. Further, the at least two mathematical operations are unified during the compilation process 9-*cmp* into a reduced number of mathematical operations, thereby facilitating the efficient transformation of the original data set 712-D1 into the resulting data set 712-D1-R. As one non-limiting example, if the first mathematical operation is multiplication and the second mathematical operation is also multiplication, then the two multiplications can be reduced to a single multiplication using a single operation In an eighth possible alternative to the method described above for efficiently executing a sequence of computational commands 93-*cc*-1, 93-*cc*-2, further each of the at least two steps of transforming an original data set 712-D1 into a resulting data set 712-D1-R is a mathematical operation. Further, the at least two mathematical operations are converted during the compilation process 9-*cmp* into the executable instructions 93-*exe* that constitute specific instructions associated with a specific hardware architecture, thereby facilitating the efficient transformation of the original data set 712-D1 into a resulting data set 712-D1-R. As one non-limiting example, if the first mathematical operation is multiplication and the second mathematical operation is addition, then performing the two operations as a consecutive sequence using a specific hardware processing architecture could be beneficial if, for example, that specific hardware processing architecture supports a process of efficient multiplication and immediate addition, perhaps in a single clock cycle or in two consecutive clock cycles.

In a ninth possible alternative to the method described above for efficiently executing a sequence of computational commands 93-*cc*-1, 93-*cc*-2, further the original data set 712-D1 includes a first plurality of data sets, and such first plurality of data sets forms a data structure selected from a group consisting of: (i) a vector, (ii) a table, (iii) a matrix, and (iv) a list.

In a first possible configuration of the ninth possible alternative embodiment just described, further the resulting data set 712-D1-R includes a second plurality of data sets, and the second plurality of data sets forms a data structure selected from a group consisting of: (i) a vector, (ii) a table, (iii) a matrix, and (iv) a list.

In one possible variation of the first possible configuration just described, further the at least two steps of transforming an original data set 712-D1 into a resulting data set 712-D1-R are associated with combinations of map functions operative to eventually map the first plurality of data sets into the second plurality of data sets.

To illustrate this possible variation, consider two map functions. In this example, "A" is the original data set 712-D1, comprising the first plurality of data sets, and "C" is the resulting data set 712-D1-R, comprising the second plurality of data sets. The two map functions are:

(1) B←map(A, x→x+1)// create collection B from A by adding 1 to all elements of A; and (2) C←map(B, x→x*2)// create collection C from B by multiplying by 2 all elements of B.

According to this sequence of map functions, the system 930 must scan collections A and B, materialize the intermediate collection B, and call the lambda functions for each of A and B. The result is a use, by the system 930, of large quantities of storage space, processing power, and time.

Compare the above execution of the two map functions with an optimized map function, in which the following code equivalent is generated compiled and executed:

(1) C←map(A, x→(x+1)*2)

Thus, instead of two separate map functions, the first and second map functions are executed together, with a saving of storage space, processing power, and time. Since the two computations have been compressed into a single computation, it is probable that the optimized map function will be twice as fast as the first and second map functions executed separately.

In a second possible configuration of the ninth possible alternative embodiment described above, further the resulting data set 712-D1-R includes a reduced data set, which may be, as one example, a single data element.

Described herein are systems and methods for jointly obtaining and processing data.

Figure 5:
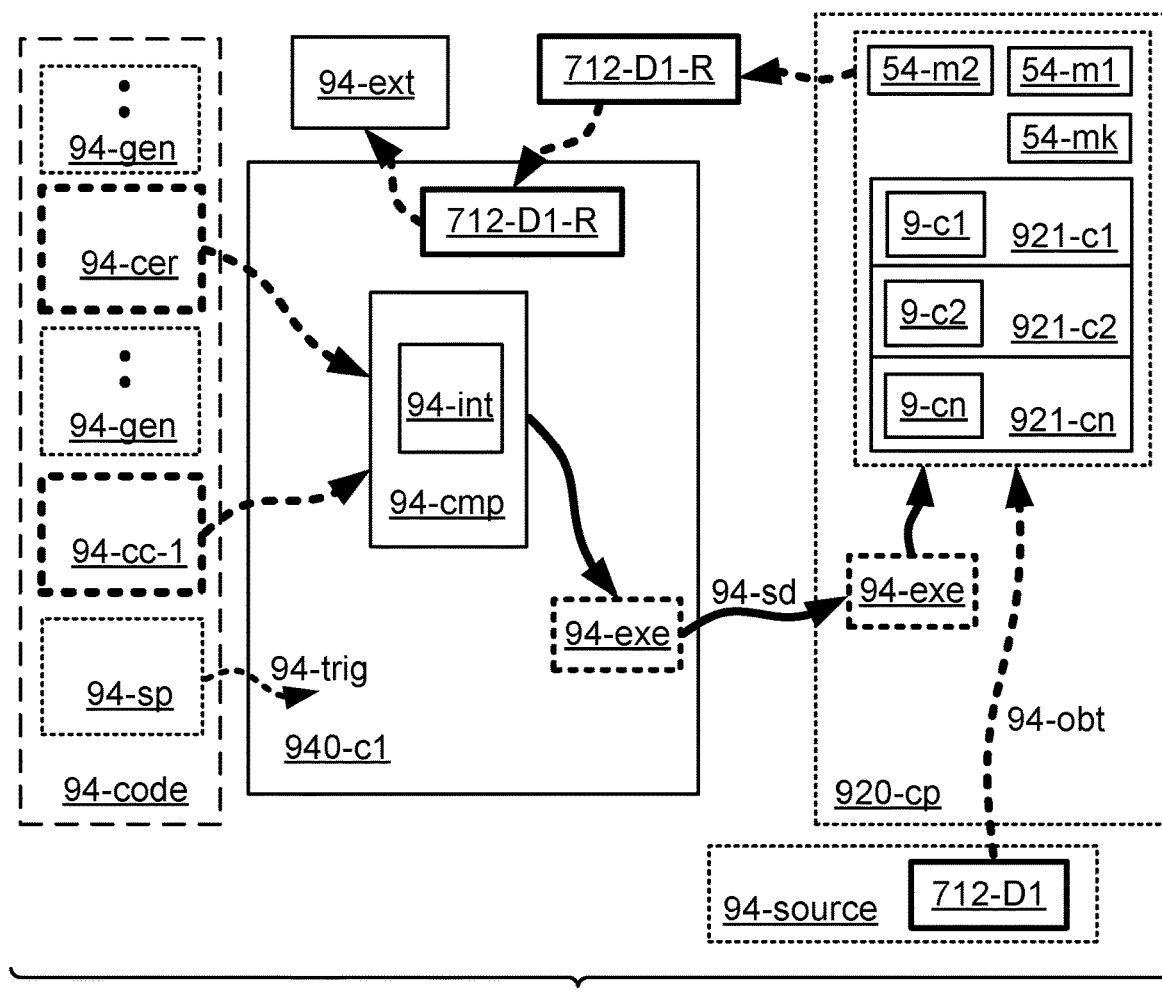
FIG. 5 illustrates one embodiment of a system operative to jointly obtain and process data.

FIG. 5 illustrates one embodiment of a system 940 operative to jointly obtain and process data. In various embodiments, there is a code sequence 94-*code* that includes a sequence of general commands 94-*gen*, and a certain command 94-*cer* that calls for obtaining 94-*obt*, into a memory such as memory 54-*m1*, 54-*m2*, 54-*mk* of a computing platform 920-*cp*, a first data set 712-D1 that is not currently located in the memory but is located rather in an external source 94-*source* or in a first compute element 940-*c1*, or doesn't yet exist and needs to be synthesized by the first compute element 940-*c1* or the computing platform 920-*cp*. The code sequence 94-*code* includes also computational command 94-*cc*-1 that calls for executing a certain computation in conjunction with the first data set 712-D1 that is still not in the memory 54-*m1*, 54-*m2*, 54-*mk*. The code sequence 94-*code* may include also a specific command 94-*sp* that can be executed only by using a result 712-D1-R of the certain computation performed by the computational command 94-*cc*-1. In alternative embodiments, the code sequence 94-*code* does not include a specific command 94-*sp*. In alternative embodiments, there are two or more code sequences 94-*code*, some of which include a specific command 94-*sp* and some of which do not.

The embodiment illustrated in FIG. 5 includes also a first compute element 940-*c1* that is configured to execute the code sequence 94-*code*. The first compute element 940-*c1* is configured to identify the certain command 94-*cer*, but not to execute it immediately, and rather to defer its execution. The first compute element 940-*c1* is further configured, upon identifying the computational command 94-*cc*-1, or upon identifying a specific command 94-*sp*, to trigger 94-*trig* a compilation process 94-*cmp* in which the certain command 94-*cer* and the computational command 94-*cc*-1 are compiled together into executable instructions 94-*exe*. The executable instructions 94-*exe*, when executed, perform jointly at least two actions required by the by the certain command 94-*cer* and the computational command 94-*cc*-1. These at least two actions are (i) obtaining the first data set 712-D1, from either a source 94-*source* or by synthesizing the first data set, into the memory 54-*m1*, 54-*m2*, 54-*mk* of the computing platform 920-*cp* or into a cache memory 9-*c1*, 9-*c2*, 9-*cn* of the computing platform 920-*cp*; and (ii) executing the certain computation on the data set 712-D1 that has just been fetched 94-*obt* into the computing platform 920-*cp*, such execution to be conducted by one or more compute elements 921-*c1*, 921-*c2*, 921-*cn* located within the computing platform 920-*cp*. The first compute element 940-*c1* is further configured to send 94-*sd* the executable instructions 94-*exe* from the first compute element 940-*c1* to the computing platform 920-*cp*, thereby facilitating joint execution of the at least two actions by computing platform 920-*cp*.

As used herein, the term "jointly" means that one action is carried out immediately after the other, or that the action are allocated to separate elements such that they carried out substantially simultaneously or at least with some overlap in time, or that execution of the actions are interleaved such that the first action is partially executed followed by partial execution of the second action followed by more execution of the first action followed by more execution of the second action, etc., or some combination of the foregoing.

By its execution of the executable code 94-*exe* on the first data 712-D1, the computing platform 920-*cp* creates a result 712-D1-R. The computing platform 920-*cp* may hold this result 712-D1-R in the computing platform's 920-*cp* memory 54-*m1*, 54-*m2*, 54-*mk* or cache memory 9-*c1*, 9-*c2*, 9-*c3*. Alternatively, the computing platform 920-*cp* may send the result 712-D1-R to the first compute element 940-*c1* for storage in a memory of the first compute element 940-*c1* or for further processing by the first compute element 940-*c1*. In some embodiments, the computing platform 920-*cp* sends the result 712-D1-R directly from the computing platform 920-*cp* to an external element 94-*ext*. In some embodiments, the computing platform 920-*cp* sends the result 712-D1-R to the first compute element 920-*c1*, which, after either temporary storage and/or further processing of the result 712-D1-R sends the result to an external element 94-*ext*. The sending of the result 712-D1-R to an external element 94-*ext* may be in accordance with the requirements of a specific command 94-*sp* in the code sequence 94-*code*, or may be part of the executable instructions 94-*exe*, or may be called for at a later time after the first data set 712-D1 has been processed.

In some embodiments, the first compute element 940-*c1* compiles 94-*cmp* the certain command 94-*cer* and the computational command 94-*cc*-1 together into executable instructions 94-*exe*, without an intermediate step. In alternative embodiments, compilation 94-*cmp* includes an intermediate step in a two-step process. First, the first compute element 940-*c1* converts the certain command 94-*cer* and the computational command 94-*cc*-1 from a first high level programming language into an intermediary code 94-*int* in a second high level programming language. Second, the first compute element 940-*c1* compiles the intermediary code 94-*int* from the second high level programming language into the executable instructions 94-*exe*.

Multiple element numbers have been assigned for the computing platform's 920-*cp* memory 54-*m1*, 54-*m2*, 54-*mk*, cache memory 9-*c1*, 9-*c2*, 9-*cn*, and compute elements 921-*c1*, 921-*c2*, 921-*cn*. In each case, it is understood that there may be a single component, or two components, or three components as shown, or any number of components greater than three. Thus, there may be any number of components for the memory 54-*m1*, 54-*m2*, 54-*mk*, or for the cache memory 9-*c1*, 9-*c2*, 9-*cn*, or for the compute elements 921-*c1*, 921-*c2*, 921-*cn* of the computing platform 920-*cp*.

One embodiment is a system 940 operative to jointly obtain and process data. In one particular implementation of such embodiment, the system includes a computing platform 920-*cp*, which includes elements making up a memory 54-*m1*, 54-*m2*, 54-*mk*. The system 940 also includes a first compute element 940-*c1*. In some embodiments, the first compute element 940-*c1* is configured to identify, within a first code sequence 94-*code*, a certain command 94-*cer* that calls for obtaining, into memory 54-*m1*, 54-*m2*, 54-*mk*, a first data set 712-D1 that is currently not in memory, in which said identification is done in conjunction with the first data set 712-D1 being associated with a certain property. The first compute element 940-*c1* is further configured to identify, within the first code sequence 94-*code*, a computational command 94-*cc*-1 that calls for carrying out a certain computation in conjunction with the first data set 712-D1 that is still not in memory 54-*m*1, 54-*m*2, 54-*mk*. The first compute element 940-*c*1 is further configured to trigger 94-*trig*, as a result of the identified commands 94-*cer*, 94-*cc*-1, a compilation process 94-*cmp*, in which the certain command 94-*cer* and the computational command 94-*cc*-1 are compiled together into executable instructions 94-*exe* operative to perform jointly at least two actions in accordance with the certain command and the computational command. The at least two actions are: (i) obtaining 94-*obt* the first data set 712-D1 into the memory 54-*m*1, 54-*m*2, 54-*mk* or a cache memory 9-*c*1, 9-*c*2, 9-*cn*, and (ii) carrying out the certain computation on the first data set 712-D1 just obtained 94-*obt*. The first compute element 940-*c*1 is further configured to send the executable instructions 94-*exe* to the computing platform 920-*cp*, thereby facilitating joint execution of the two actions by the computing platform.

In a possible alternative to the system 940 just described, further the computing platform 920-*cp* is configured to receive the executable instructions 94-*exe*. The computing platform 920-*cp* is further configured to run the executable instructions, thereby executing the at least two actions, resulting in the computing platform obtaining 94-*obt* the first data set 712-D1 into its memory 54-*m*1, 54-*m*2, 54-*mk* or into its cache memory 9-*c*1, 9-*c*2, 9-*cn*, and carrying out the certain computation in conjunction with the first data set 712-D1 just obtained.

In a possible configuration of the possible alternative just described, further the first data set 712-D1 includes a plurality of data sets, the computing platform 920-*cp* includes a plurality of other compute elements 921-*c*1, 921-*c*2, 921-*cn*, and the at least two actions are optimized for joint execution distributively among the plurality of other compute elements 921-*c*1, 921-*c*2, 921-*cn*, such that each of the other compute elements 921-*c*1 or 921-*c*2 or 921-*cn*, handles the two actions jointly in conjunction with some of the plurality of data sets allocated to that other compute element.

In a possible variation of the possible configuration just described, further the memory 54-*m*1, 54-*m*2, 54-*mk* is distributed among the plurality of other compute elements 921-*c*1, 921-*c*2, 921-*cn*. This may be distributed respectively, 54-*m*1 to 921-*c*1, 54-*m*2 to 921-*c*2, and 54-*mk* to 921-*cn*. Or the order of distribution may be different, or one of the compute elements 921-*c*1, 921-*c*2, 921-*cn* may have two or more memories. Further, each of the other compute elements 921-*c*1, 921-*c*2, 921-*cn* is associated with a local cache memory 9-*c*1, 9-*c*2, 9-*cn*. Further, the executable instructions 94-*exe* are produced by the compilation process 94-*cmp* such as to perform jointly the at least two actions, in which the joint performance is achieved in any of three ways: (i) by combining the obtaining 94-*obt* of the plurality of data sets 712-D1 together with the carrying out of the certain computation 94-*cer*, such that the plurality of data sets 712-D1 are obtained into at least two of the local cache memories 9-*c*1, 9-*c*2, 9-*cn*, then the certain computation is done in conjunction with the plurality of data sets 712-D1 in the cache memory 9-*c*1, 9-*c*2, 9-*cn*, and only then a plurality of computed data sets constituting 712-D1-R are stored in the memory 54-*m*1, 54-*m*2, 54-*mk*; (ii) by carrying out the certain computation on those of the plurality of data sets 712-D1 that are already accessible for processing, while concurrently making other of the plurality of data sets 712-D1 accessible for processing; (iii) by any other method in which the at least two actions are combined together in conjunction with the plurality of data sets 712-D1.

Figure 6:
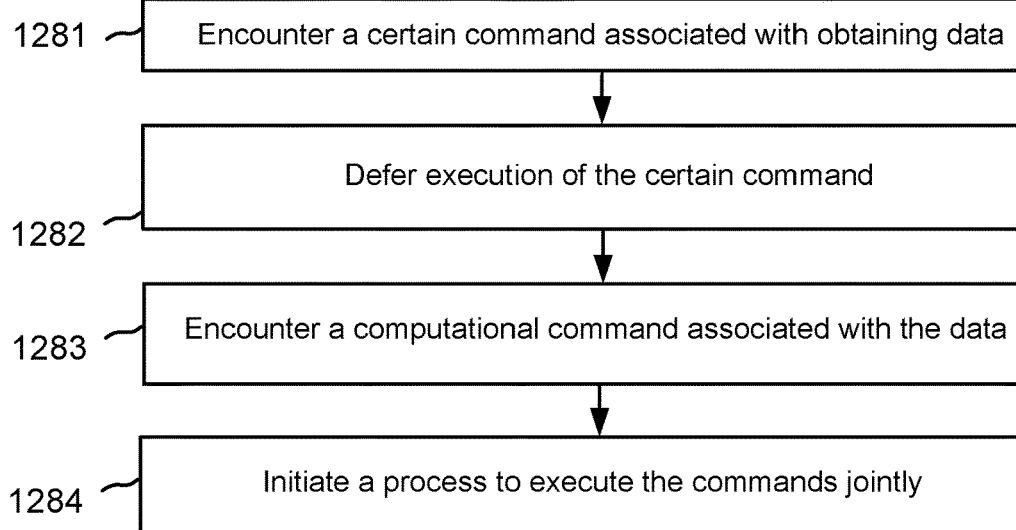
FIG. 6 illustrates one embodiment of a method for jointly obtaining and processing data.

FIG. 6 illustrates one embodiment of a method for jointly obtaining and processing data. In step 1281, a first computer element 940-*c*1, while executing a first code sequence 94-*code*, encounters a certain command 94-*cer* that calls for obtaining 94-*obt*, into memory, a first data set 712-D1 that is currently not in memory, in which the first data set 712-D1 is associated with a certain property. In step 1282, the first compute element 940-*c*1, based on the certain property, defers execution of the certain command 94-*cer*, thereby currently avoiding obtainment of the first data set 712-D1 into memory. In step 1283, the first compute element 940-*c*1, while continuing the execution of the first code sequence 94-*code*, encounters a computational command 94-*cc*-1 that calls for carrying out a certain computation in conjunction with the first data set 712-D1 that is still not in memory. In step 1284, the first compute element 940-*c*1, as an outcome of encountering the computational command 94-*cc*-1 or as an outcome of encountering a specific command 94-*sp* that needs a result 712-D1-R of the certain computation, initiates a process that includes at least two actions, in which the at least two actions are: (i) obtaining 94-*obt* the first data set 712-D1 into memory 54-*m*1, 54-*m*2, 54-*mk*, or into a cache memory 9-*c*1, 9-*c*2, 9-*cn*, and (ii) carrying out the certain computation on the first data set 712-D1 just obtained 94-*obt*, and in which said at least two actions are done jointly, thereby facilitating efficient manipulation of the first data set 712-D1. In some embodiments, the first and second actions are carried out by one or more compute elements 921-*c*1, 921-*c*2, 921-*cn*.

In a first possible alternative to the method just described for jointly obtaining and processing data, further the call to obtain the first data set 712-D1 into memory constitutes or includes a call to synthesize the first data set 72-D1 into memory, in which the synthesis is done based on a process selected form a group consisting of: (i) analytical process, (ii) mathematical process, (iii) pseudo random process, and (iv) any process operative to produce the first data set 712-D1 from a smaller data set or from an expression.

In a second possible alternative to the method described above for jointly obtaining and processing data, further the call to obtain the first data set 712-D1 into memory constitutes or includes a call to read the first data set 712-D1 from a source 94-*source* into memory, in which the source 94-*source* is selected from a group consisting of (i) a storage device, (ii) a communication device such as a network interface card (NIC), and (iii) any source capable of providing the first data set 712-D1 upon request.

In a third possible alternative to the method described above for jointly obtaining and processing data, further the at least two actions are done jointly by combining the obtaining 94-*obt* of the first data set 712-D1 together with the carrying out of the certain computation, such that the first data set is first obtained into the cache memory 9-*c*1, 9-*c*2, 9-*cn*, then the certain computation is done by compute elements 921-*c*1, 921-*c*2, 921-*cn* in conjunction with the first data set 712-D1 now in the cache memory 9-*c*1, 9-*c*2, 9-*cn*, and only then, as a result, a computed data set 712-D1-R is stored in the memory 54-*m*1, 5-*m*2, 54-*mk*. The consequence is that there is only one transaction involving the memory 54-*m*1, 54-*m*2, 54-*mk*, instead of the two transactions that would otherwise be necessary when obtaining the first data set separately from carrying out the certain computation.

In a fourth possible alternative to the method described above for jointly obtaining and processing data, further the at least two actions are done jointly by carrying out the certain computation on those of the plurality of data set that are already accessible for processing to compute elements 921-*c*1, 921-*c*2, 921-*cn*, while concurrently making, by the computing platform 920-*cp*, other of the plurality of data sets accessible for processing to compute elements 921-*c*1, 921-*c*2, 921-*cn*.

In a fifth possible alternative to the method described above for jointly obtaining and processing data, further the at least two actions are executed by the first compute element 940-*c*1.

In a sixth possible alternative to the method described above for jointly obtaining and processing data, further the at least two actions are executed by a computing platform 920-*cp*, according to a request from the first compute element 940-*c*1.

In a possible configuration of the sixth possible alternative just described, further the first data set 712-D1 includes a plurality of data sets, and the computing platform 920-*cp* includes a plurality of other compute elements 921-*c*1, 921-*c*2, 921-*cn*. Further, the at least two actions are optimized for joint execution distributively among the plurality of other compute elements 921-*c*1, 921-*c*2, 921-*cn*, such that each other compute element handles the two actions jointly by jointly obtaining and processing those one of the plurality of data sets that have been allocated to that particular compute element. This joint and parallel processing, simultaneously and by multiple other computer elements 921-*c*1, 921-*c*2, 921-*cn* of allocated data sets, further facilitates the efficient manipulation of the first data set 712-D1.

In a possible variation of the possible configuration just described, further prior to initiating the process including at least two actions, the first computer element 940-*c*1 triggers 94-*trig* a compilation process 94-*cmp*, in which the certain command 94-*cer* and the computational command 94-*cc*-1 are compiled together into executable instructions 94-*exe* operative to perform jointly the at least two actions. Further, the first compute element 940-*c*1 sends 94-*sd* the executable instructions 94-*exe* to the computing platform 920-*cp*, thereby facilitating the joint execution of the two actions distributively among the plurality of other compute elements 921-*c*1, 921-*c*2, 921-*cn*.

In a seventh possible alternative to the method described above for jointly obtaining and processing data, further the certain property is selected from a group consisting of: (i) a certain size of the first data set 712-D1, in which the deferring is done provided that the first data set 712-D1 is of a size greater than a certain threshold, (ii) a certain number of data sets included in the first data set 712-D1, in which the first data set 712-D1 includes a plurality of said data sets and the deferring is done provided that the number of data sets in the plurality of data sets is greater than a certain threshold, and (iii) a data type associated with the first data set 712-D1, in which the deferring is done provided that the first data set 712-D1 is of a certain type.

In an eighth possible alternative to the method described above for jointly obtaining and processing data, and as an additional outcome of encountering the computational command 94-*cc*-1 or as an additional outcome of encountering the specific command 94-*sp* that needs the result 712-D1-R of the certain computation, further the first computer element 940-*c*1 triggers 94-*trig* a compilation process 94-*cmp*, in which the certain command 94-*cer* and the computational command 94-*cc*-1 are compiled together into executable instructions 94-*exe* operative to perform jointly said at least two actions. Further, the at least two actions are carried out by executing the executable instructions 94-*exe*, and in which the execution of the executable instructions 94-*exe* constitutes initiation of the process including the at least two actions. The consequence is further facilitation of the efficient manipulation of the first data set 712-D1.

In a first possible configuration of the eight possible alternative just described, further the specific command 94-*sp* is a control flow statement whose execution by the first compute element 940-*c*1 results in a choice being made as to which of two or more branches should be followed in conjunction with the following of the code sequence 94-*code*, in which the choice being made by the first compute element 940-*c*1 is dependent upon the result 712-D1-R of the certain computation.

In a second possible configuration of the eight possible alternative described above, further wherein the specific command 94-*sp* is a conditional statement, in which a certain action, as described by the specific command 94-*sp*, is executed by the first compute element 940-*c*1 provided that the result 712-D1-R of the certain computation, or part of such result, is within a predetermined range of values.

In a third possible configuration of the eight possible alternative described above, further the specific command 94-*sp* includes a certain action, in which the certain action is a transport of the result 712-D1-R of the certain computation, or part of such result, to an external element 94-*ext*.

In a fourth possible configuration of the eight possible alternative described above, further the first data set 712-D1 includes a plurality of data sets. Further, the executable instructions 94-*exe* are produced by the compilation process 94-*cmp* such as to perform jointly the at least two actions, in which the joint performance is achieved by any of three ways: (i) by combining the obtaining of the plurality of data sets together with the carrying out of the certain computation, such that the plurality of data sets are obtained 94-*obt* into the cache memory 9-*c*1, 9-*c*2, 9-*cn*, after which the certain computation is done in conjunction with the plurality of data sets in the cache memory 9-*c*1, 9-*c*2, 9-*cn*, and only then a plurality of computed data sets are stored in the memory 54-*m*1, 54-*m*2, 54-*mk*. As a consequence there is only one transaction involving the memory 54-*m*1, 54-*m*2, 54-*mk* instead of two transactions that would otherwise be necessary when obtaining 94-*obt* the plurality of data sets separately from carrying out the computation; or (ii) by carrying out the certain computation on those of the plurality of data set that are already accessible for processing, while concurrently making other of the plurality of data sets accessible for processing; or (iii) by any other method in which the at least two actions are combined together in conjunction with the plurality of data sets.

In a ninth possible alternative to the method described above for jointly obtaining and processing data, further the execution of the first code sequence 94-*code* by the first compute element 940-*c*1, includes the first compute element 940-*c*1 using an interpretation process to execute each of a plurality of general commands 94-*gen* belonging to the first code sequence 94-*code*, in which each of the general commands 94-*gen* is interpreted and executed separately by the first compute element 940-*c*1.

In a possible configuration of the ninth possible alternative just described, further prior to the initiation of the process including at least two actions, the first compute element 940-*c*1 triggers 94-*trig* a compilation process 94-*cmp*, in which the certain command 94-*cer* and the computational command 94-*cc*-1 are compiled together into executable instructions 94-*exe* operative to perform jointly the at least two actions. Further, the compilation process 94-*cmp* is different from the interpretation process at least in that the certain command 94-*cer* and the computational command 94-*cc*-1 are compiled jointly, and not interpreted separately, into the executable instructions 94-*exe*, in which the execution of the executable instructions 94-*exe* is done instead of interpreting separately the certain command 94-*cer* and the computational command 94-*cc*-1, thereby avoiding altogether interpretation of the certain command 94-*cer* and the computational command 94-*cc*-4, thereby facilitating the efficient manipulation of the first data set 712-D1.

In a possible variation of the possible configuration just described, further the first code sequence 94-*code* is written in a first high level programming language. Further, the compilation process 94-*cmp* includes converting the certain command 94-*cer* and the computational command 94-*cc*-1 from the first high level programming language into an intermediary code 94-*int* in a second high level programming language, and further includes compiling the intermediary code 94-*int* from the second high level programming language into the executable instructions 94-*exe*.

In a possible option of the possible variation just described, further the first high level programming language is selected from a group consisting of: (i) Python, (ii) Matlab, (iii) R, (iv) Java or Java variant, and (v) any interpretable functional programming language.

In a possible form of the possible option just described, further the second high level programming language is selected from a group consisting of: (i) C or C variant, (ii) Pascal, and (iii) Fortran.

Described herein are systems and methods for coordinating execution of multiple computational commands and optimizing data fetch by synchronizing execution of multiple computational tasks whose execution was previously deferred.

Figure 7:
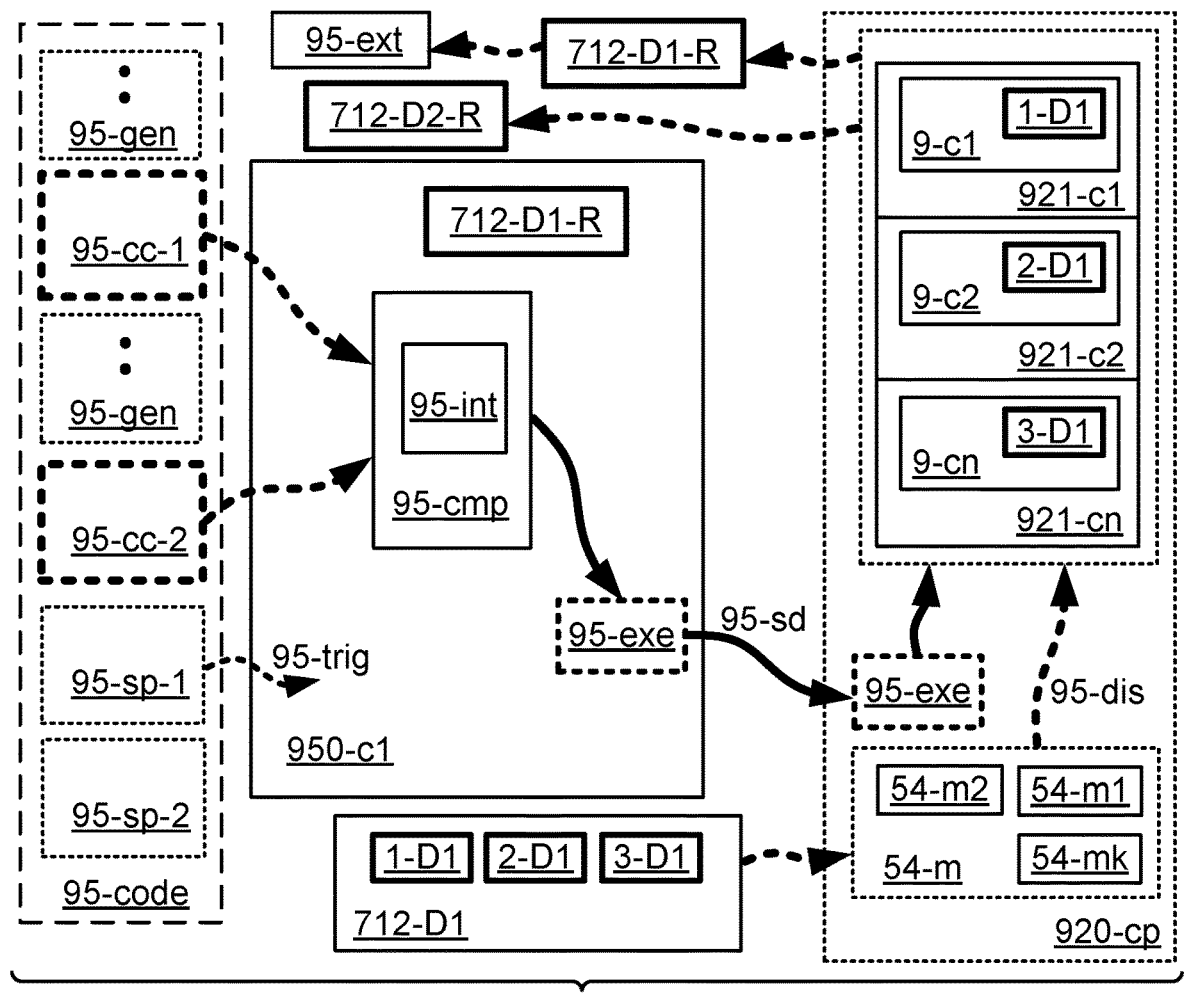
FIG. 7 illustrates one embodiment of a system operative to coordinate execution of multiple computational commands.

FIG. 7 illustrates one embodiment of a system 950 operative to coordinate execution of multiple computational commands. In various embodiments, there is a code sequence 95-*code* that includes a sequence of general commands 95-*gen*, a first computational command 95-*cc*-1 calling for computation on a first data set 712-D1 to produce a first result 712-D1-R, a second computational command 95-*cc*-2 calling for computation on the same first data set 712-D1 to produce a second result 712-D2-R, a first specific command 95-*sp*-1 instructing the system 950 to perform one or more certain actions in conjunction with the first result 712-D1-R, and a second specific command 95-*sp*-2 instructing the system 950 to perform one or more certain actions in conjunction with the second result 712-D2-R. FIG. 7 includes also a first compute element 950-*c*1 that initially defers execution of the computational commands 95-*cc*-1, 95-*cc*-2. However, when the first compute element 950-*c*1 encounters the first specific command 95-*sp*-1, deferral of execution ends, and joint execution of the computational commands 95-*cc*-1, 95-*cc*-2 is triggered 95-*trig*. Such triggering 95-*trig* may be the initiation, by the first compute element 950-*c*1, of a compilation process 95-*cmp* in which the computational commands 95-*cc*-1, 95-*cc*-2 are compiled together into executable instructions 95-*exe* operative to jointly execute the computational commands 95-*cc*-1, 95-*cc*-2. In some embodiments, compilation 95-*cmp* occurs directly from the computational commands 95-*cc*-1, 95-*cc*-2 into the executable instructions 95-*exe*. In other embodiments, compilation 95-*cmp* occurs with an intermediate step in which the first compute element 950-*c*1 converts the computational commands 95-*cc*-5, 95-*cc*-2 from a first high level programming language into an intermediate code 95-*int* in a second high level programming language, and then compiles the intermediary code 95-*int* from the second high level programming language into the executable instructions 95-*exe*.

The joint execution of computational commands 95-*cc*-1, 95-*cc*-2 is achieved when the first compute element 950-*c*1 sends 95-*sd* a request to a computing platform 920-*cp* to start executing the executable instructions 95-*exe*. The computing platform 920-*cp* includes a memory 54-*m*, which may include one or more memory units of random access memory (RAM) 54-*m*1, 54-*m*2, 54-*mk*, and multiple other compute elements 921-*c*1, 921-*c*2, 921-*cn*, which are separate and distinct from the first compute element 950-*c*1, where each of the other compute elements 921-*c*1, 921-*c*2, 921-*cn* includes a cache memory, 9-*c*1, 9-*c*2, 9-*cn*, respectively. Further, the first data set 712-D1 may be a single data set, or may be multiple data sets 1-D1, 2-D2, 3-D1. If the former, then the single data set may be stored initially in a location separate from the computing platform 920-*cp*, or conversely may be stored within either the memory 54-*m* of the computing platform 920-*cp* or within one of the RAM memories 54-*m*1, 54-*m*2, 54-*mk* of the memory 54-*m*. If the latter, then the multiple data sets 1-D1, 2-D1, 3-D1 may be stored initially in a location separate from the computing platform 920-*cp*, or conversely within the computing platform 920-*cp*, in which all of the multiple data sets 1-D1, 2-D1, 3-D1 could be stored in memory 54-*m*, or they could all be stored in one of the RAM memories 54-*m*1, 54-*m*2, m5-*mk*, or they could be distributed among two or more of the RAM memories 54-*m*1, 54-*m*2, 54-*mk*.

By executing the executable instructions 95-*exe*, the computing platform 920-*cp* fetches the first data set 712-D1, which may include a first plurality of data sets 1-D1, 2-D1, 3-D1, and distributes 95-*dis* the data sets 1-D1, 2-D1, 3-D1 into the cache memories 9-*c*1, 9-*c*2, 9-*cn* of the other compute elements 921-*c*1, 921-*c*2, 921-*cn*. The fetch and distribution 95-*dis* may be performed by the computing platform 920-*cp*, or may be performed specifically by one or more of the other compute elements 921-*c*1, 921-*c*2, 921-*cn* within the computing platform 920-*cp*. The individual data sets 1-D1, 2-D1, 3-D1 are processed by the other compute elements 921-*c*1, 921-*c*2, 921-*cn* according to the executable instructions 95-*exe*, producing both the first result 712-D1-R commanded by the first computational command 95-*cc*-1 and the second result 712-D2-R commanded by the second computational command 95-*cc*-2.

Joint execution of the computational commands 95-*cc*-1, 95-*cc*-2 requires that the computational tasks associated with such commands be executed jointly. Joint execution of the computational tasks means that the tasks are executed simultaneously by various ones of the other compute elements 921-*c*1, 921-*c*2, 921-*cn*, or that the tasks are executed substantially simultaneously by one or more of the other compute element 921-*c*1, 921-*c*2, 921-*cn* with or without an overlap in time, or that they are executed sequentially by one or more of the other compute elements 921-*c*1, 921-*c*2, 921-*cn* but in a manner such that the commonly processed data sets 1-D1, 2-D1, 3-D1 are fetched only once.

After joint execution of the computational commands 95-*cc*-1, 95-*cc*-2, either or both of the results 712-D1-R, 712-D2-R may be sent by the computing platform 920-*cp* either to the first compute element 950-*c*1 for further processing in conjunction with the specific commands 95-*sp*-1, 95-*sp*-2, or to an external element 95-*ext*, such as, for example, an additional processor, a storage device, or a network interface.

One embodiment is a system 950 operative to coordinate execution of a plurality of computational commands 95-*cc*-

1, 95-*cc*-2. In one particular implementation of such embodiment, the system 950 includes a first compute element 950-*c*1 having access to a code sequence 95-*code* that includes general commands 95-*gen*, a first computational command 95-*cc*-1, and a second computational command 95-*cc*-2, in which the first computational command is configured to operate on a first plurality of data sets 1-D1, 2-D1, 3-D1 to produce a first result 712-D1-R, while the second computational command is configured to operate on the same first plurality of data sets 1-D1, 2-D1, 3-D1 to produce a second result 712-D2-R. This particular implementation includes also a computing platform 920-*cp* that includes multiple other compute elements 921-*c*1, 921-*c*2, 921-*cn*. The first compute element 950-*c*1 is configured to execute the general commands 95-*gen*, but defer execution of the computational commands 95-*cc*-1, 95-*cc*-2. The first compute element 950-*c*1 is also configured to initiate execution of the previously deferred computational commands 95-*cc*-1, 95-*cc*-2 by sending 95-*sd* a request to the computing platform 920-*cp*. The computing platform 920-*cp* is configured to receive the request sent 95-*sd* by the first compute element 950-*c*1, and consequently to execute, in conjunction with the first plurality of data sets 1-D1, 2-D1, 3-D1, the first computational command 95-*cc*-1 in coordination with the second computational command 95-*cc*-2, in part by distributing the first plurality of data sets 1-D1, 1-D2, 1-D3, among the plurality of other compute elements 921-*c*1, 921-*c*2, 921-*cn*. The result of processing the first plurality of data sets 1-D1, 2-D1, 3-D1 according to multiple computational commands 95-*cc*-1, 95-*cc*-2 is the production of both the first resulting data set 712-D1-R and the second resulting data sets 712-D2-R.

In one possible alternative to the system 950 just described, the computing platform 920-*cp* further includes multiple cache memories 9-*c*1, 9-*c*2, 9-*cn* associated, respectively, with the plurality of other compute elements 921-*c*1, 921-*c*2, 921-*cn*. In this alternative, the computing platform 920-*cp* further includes a memory 54-*m* configured to store the first plurality of data sets 1-D1, 2-D1, 3-D1. Also, the computing platform 920-*cp* is further configured to achieve coordination and distribution by distributing 95-*dis* the first plurality of data sets 1-D1, 2-D1, 3-D1 to the plurality of cache memories 921-*c*1, 921-*c*2, 921-*cn* located within the other compute elements 921-*c*1, 921-*c*2, 921-*cn*, respectively. The computing platform 920-*cp* is further configured to achieve coordination and distribution in that each of the other compute elements 921-*c*1, 921-*c*2, 921-*cn* within the computing platform 920-*cp* use both the first computational command 95-*cc*-1 (or a derivation thereof) and the second computational command 95-*cc*-2 (or a derivation thereof) to operate on those specific data sets (for example, 1-D1) of the first plurality of data sets 1-D1, 2-D1, 3-D1 that are now located in the cache memory (here, 1-D1 in 9-*c*1), thereby producing, respectively, at least a part of the first result 712-D1-R and at least a part of the second result 712-D2-R.

In a first possible configuration of the possible alternative just described, further each of the other compute elements, for example 921-*c*1, is configured to achieve the coordination by executing the second computational command 95-*cc*-2 substantially immediately after executing the first computational command 95-*cc*-1, thereby guaranteeing a substantially continuous presence of relevant data sets, in this example, 1-D1, in the cache memory, in this example, 9-*c*1, throughout execution of the two commands 95-*cc*-1, 95-*cc*-2. The guarantee of the substantially continuous presence of relevant data sets has become possible only because of the deferral of execution of the computational commands 95-*cc*-1, 95-*cc*-2. Conversely, if each computational command 95-*cc*-1, 95-*cc*-2 were processed immediately when encountered by the first compute element 950-*c*1, there could be gaps in the presence of relevant data set, depending on the particular mix of general commands 95-*gen*, computational commands 95-*cc*-1, 95-*cc*-2, and specific commands 95-*sp*-1, 95-*sp*-2 in the code sequence 95-*code*.

In a second possible configuration of the possible alternative described above, further each of the other compute elements, for example 921-*c*1, is configured to achieve the coordination by executing the second computational command 95-*cc*-2 substantially simultaneously with executing the first computational command 95-*cc*-1, thereby guaranteeing a substantially continuous presence of relevant data sets, in this example, 1-D1, in the cache memory, in this example, 9-*c*1, throughout execution of the two commands 95-*cc*-1, 95-*cc*-2. The guarantee of the substantially continuous presence of relevant data sets has become possible only because of the deferral of execution of the computational commands 95-*cc*-1, 95-*cc*-2. Conversely, if each computational command 95-*cc*-1, 95-*cc*-2 were processed immediately when encountered by the first compute element 950-*c*1, there could be gaps in the presence of relevant data set, depending on the particular mix of general commands 95-*gen*, computational commands 95-*cc*-1, 95-*cc*-2, and specific commands 95-*sp*-1, 95-*sp*-2 in the code sequence 95-*code*.

In a second possible alternative to the system 950 operative to coordinate a plurality of computational commands 95-*cc*-1, 95-*cc*-2, as described above, the first compute element 950-*c*1 is further configured to compile 95-*cmp* the first computational command 95-*cc*-1 and the second computations command 95-*cc*-2 into an executable instructions 95-*exe* operative to achieve the coordination and distribution. Further, the executable instructions 95-*exe* are sent 95-*sd* by the first compute element 950-*c*1 to the computing platform 920-*cp* in conjunction with the request. Such executable instructions 95-*exe* are consequently executed by the computing platform 920-*cp*, thereby achieving the coordination and distribution.

Figure 8:
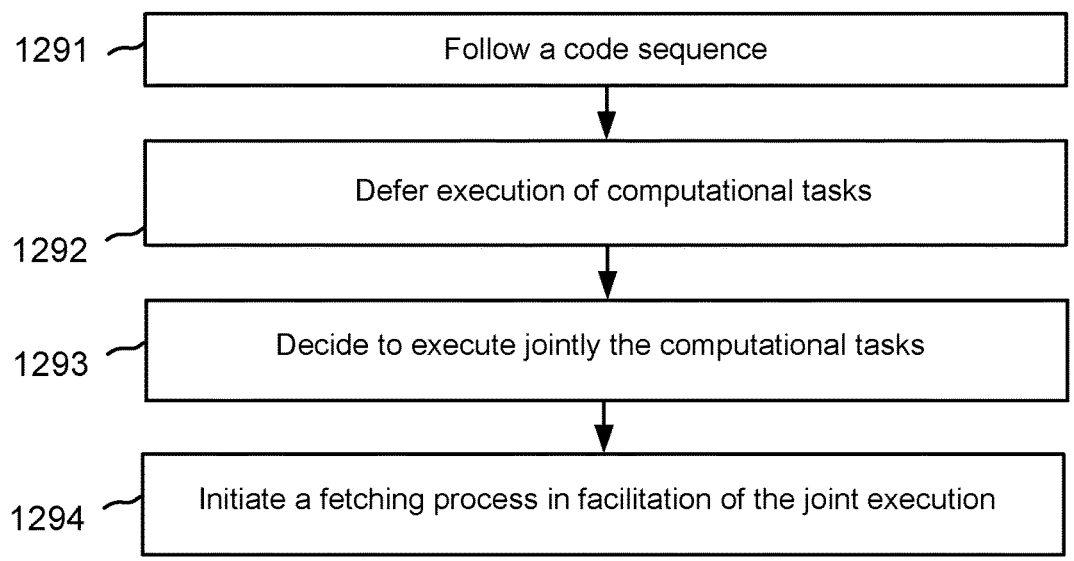
FIG. 8 illustrates one embodiment of a method for optimizing data fetch by synchronizing execution of multiple computational tasks whose execution was previously deferred.

FIG. 8 illustrates one embodiment of a method for optimizing fetch by synchronizing execution of a plurality of deferred computational tasks. In step 1291, a first compute element 950-*c*1 follows a code sequence 95-*code* operative to perform general tasks and a plurality of computational tasks, in which the plurality of computational tasks are configured to operate on a first data set 712-D1 to produce a plurality of resulting data sets 712-D1-R, 712-D2-R, each resulting data set corresponding to, respectively, a computational task. In step 1292, the first compute element 950-*c*1 defers execution of those of the computational tasks for which the respective resulting data sets are not yet needed in conjunction with performing certain actions. In step 1293, the first compute element 950-*c*1 decides, at a specific time or based on one or more certain criteria, to start executing jointly the computational tasks whose execution was previously deferred. In step 1294, based on the decision of the first compute element 950-*c*1, a computing platform 920-*cp* starts executing jointly the computational tasks whose execution was previously deferred, by initiating a process in which the first data set 712-D1 is fetched and then made available 95-*dis* for execution of the computational tasks whose execution was previously deferred.

In a first possible alternative to the method just described for optimizing fetch by synchronizing execution of a plurality of deferred computational tasks, further the code sequence 95-*code* includes computational commands 95-*cc*-1, 95-*cc*-2. Also, at least one of computational tasks whose execution was deferred is described, at least in part, by at least one of the computational commands 95-*cc*-1, 95-*cc*-2, in which the computational task is operative to produce one of the resulting data sets 712-D1-R, 712-D2-R. Also, the code sequence 95-*code* further comprises a specific command, in one example, 95-*sp*-1, associated with the computational command, in this example, 95-*cc*-1, in which the specific command 95-*sp*-1 instructs the performing of one of the certain actions in conjunction with the resulting plurality of data sets, in this example, 712-D1-R. Also, the deferring of execution of the computational task is done at a time when the first compute element 950-*c*1 encounters the computational command, in this example, 95-*cc*-1, which is before the first compute element 950-*c*1 encounters the specific command, in this example, 95-*sp*-1.

In a first possible configuration of the first alternative method just described, further the decision to start executing jointly the computational tasks is triggered 95-*trig* as a result of the first compute element 950-*c*1 encountering the specific command, in this example, 95-*sp*-1. In this case, the certain criterion is the encountering by the first computer element 950-*c*1 of the specific command.

In a second possible configuration of the first alternative method described above, further the decision to start executing jointly the computational tasks occurs before the first compute element 950-*c*1 encounters the specific command, in this example, 95-*sp*-1. In this case, execution starts according to some time stamp, or according to some condition other than the encounter by the first compute element 950-*c*1 of the specific command, in this example, 95-*sp*-1.

In a third possible configuration of the first alternative method described above, further another of the computational tasks whose execution was deferred is described, at least in part, by at least another of the computational commands, in this example, 95-*cc*-2, in which the another computational task is operative to produce one of the other resulting data sets, in this example, 712-D2-R. Also, the code sequence 95-*code* further includes another specific command, in this example, 95-*sp*-2, associated with the another computational command, in this example, 95-*cc*-2, in which the another specific command, in this example, 95-*sp*-2, instructs the performing of another of the certain actions in conjunction with the other resulting data set, in this example, 712-D2-R. Also, the deferring of execution of the another computational task is done at a time when the first compute element 950-*c*1 encounters the another computational command, in this example, 95-*cc*-2, which is before the compute element encounters the another specific command, in this example, 95-*sp*-2.

In a possible variation of the third possible configuration just described, further the first computational command 95-*cc*-1 appears in the code sequence 95-*code* before the another computational command 95-*cc*-2, such that the deferring is achieved by (i) first deferring execution of the computational task, at a time of the first compute element 950-*c*1 encountering the first computational command 95-*cc*-1, and (ii) then deferring execution of the another computational task, at a later time, when the first compute element 950-*c*1 encounters the another computational command 95-*cc*-2.

In a fourth possible configuration of the first alternative method described above, further the first computational command 95-*cc*-1 is applied in conjunction with a first parameter, thus constituting the computational task operative to produce the resulting data set 712-D1-R. Also, another of the computational tasks whose execution was deferred is described by the same computational command 95-*cc*-1, but applied in conjunction with a second parameter, thus producing one of the other resulting data sets 712-D2-R. In other words, the single computational command, here 95-*cc*-1, describes multiple computational tasks, all operating on the same data set 712-D1, but in which each of the computational tasks requires use of a different parameter. In essence, the command 95-*cc*-1 may be a part of an iterative loop, in which each computational task uses a different parameter and thereby produces a unique result. However, since execution of the computational command 95-*cc*-1 is deferred, consequently all of the iterations involving the computational command 95-*cc*-1 are also deferred.

In a fifth possible configuration of the first alternative method described above, further the specific command 95-*sp*-1 is selected form a group consisting of: (i) a control flow statement whose execution by the first compute element 950-*c*1 results in a choice being made as to which of two or more branches should be followed in conjunction with the following of the code sequence 95-*code*, and in which the certain action is the choice of branch being made by the first compute element 950-*c*1, (ii) a conditional statement, in which the certain action is described by the specific command 95-*sp*-1 and is executed by the first compute element 950-*c*1 provided that the resulting data set 712-D1-R, or a certain part of the resulting data set 712-D1-R, is within a predetermined range of values, and (iii) a write command, in which the certain action is a transport of the resulting data set 712-D1-R, or a certain part of the resulting data set 712-D1-R, to an external element 95-*ext*.

In a second possible alternative to the method described above for optimizing fetch by synchronizing execution of a plurality of deferred computational tasks, further each certain criterion is selected from the group consisting of: (i) the first compute element 950-*c*1 encountering a specific command, for example, 95-*sp*-1, associated with performing at least one of the specific actions, (ii) the first compute element 950-*c*1 deferring a certain number of the computational tasks, (iii) the availability of computational resources, in which a sudden availability of the computational resources triggers 95-*trig* the decision to execute jointly the computational tasks whose execution was previously deferred, and (iv) the passage of time.

In a third possible alternative to the method described above for optimizing fetch by synchronizing execution of a plurality of deferred computational tasks, further the first compute element 950-*c*1 decides to start executing jointly the computational tasks by initiating a compilation process 95-*cmp* in which computational commands 95-*cc*-1, 95-*cc*-2 associated with the plurality of computational tasks are complied jointly into executable instructions 95-*exe*. Further, the executable instructions 95-*exe* are operative to cause the computing platform 920-*cp*, or other compute elements 921-*c*1, 921-*c*2, 921-*cn* within the computing platform 920-*cp*, to fetch the first data set 712-D1 and to make available the individual data sets 1-D1, 2-D1, 3-D1 within the first data set 712-D1 for execution of the computational tasks whose execution was previously deferred.

In a first possible configuration of the third possible alternative just described, further the following of the code sequence 95-*code* by the first compute element 950-*c*1 includes executing, by the first compute element 950-*c*1, using an interpretation process, each of a plurality of general commands 95-*gen* associated with the general tasks, in which each of the general commands 95-*gen* is interpreted and executed separately by the first compute element 950-*c*1.

In a possible variation of the first possible configuration just described, further the compilation process 95-*cmp* is different from the interpretation process at least in that the computational commands 95-*cc*-1, 95-*cc*-2 are compiled jointly, and not interpreted separately, into the executable instructions 95-*exe*, in which the execution of the executable instructions 95-*exe* is done instead of interpreting separately the computational commands 95-*cc*-1, 95-*cc*-2. Thus, the compilation process 95-*cmp* avoids altogether interpretation of the computational commands 95-*cc*-1, 95-*cc*-2.

In a possible option of the possible variation, further the code sequence 95-*code* is written in a first high level programming language. Also, the compilation process 95-*cmp* includes converting the computational commands 95-*cc*-1, 95-*cc*-2 from the first high level programming language into an intermediary code 95-*int* in a second high level programming language, and then compiling the intermediary code 95-*int* from the second high level programming language into the executable instructions 95-*exe*.

In a possible form of the possible option just described, further the first high level programming language is selected from the group consisting of: (i) Python, (ii) MATLAB, (iii) R, (iv) Java or Java variant, and (v) any interpretable functional programming language.

In a possible arrangement of the possible form just described, further the second high level programming language is selected from a group consisting of: (i) C or C variant, (ii) Pascal, (iii) Fortran, and (iv) any programming language for which an optimizing compiler exists.

In a second possible configuration of the third possible alternative described above, further the first compute element 950-*c*1 sends to a computing platform 920-*cp* the executable instructions 95-*exe* just compiled, thereby enabling the computing platform to (i) perform the process in which the first data set 712-D1 is fetched and made available 95-*dis* to execute the computational tasks whose execution was previously deferred and (ii) execute the computational tasks using the first data set 712-D1 fetched and distributed 95-*dis*, thereby facilitating the production of the pluralities of resulting data sets 712-D1-R, 712-D2-R. Also, the first compute element 950-*c*1 receives from the computing platform 920-*cp*, the plurality of resulting data sets 712-D1-R, 712-D2-R produced by the computing platform 920-*cp* using the executable instruction 95-*exe* sent 95-*sd*.

In a possible variation of the second possible configuration just described, further the computing platform 920-*cp* includes a plurality of other compute elements 921-*c*1, 921-*c*2. 921-*cn*. Also, the first data set 712-D1 includes a plurality of data sets 1-D1, 2-D1. 3-D1. Also, the compilation process 95-*cmp* is optimized such as to facilitate a process in which the fetching and distribution 95-*dis* of the plurality of first data sets 712-D1 is achieved by fetching, by each of the other compute elements, for example, 921-*c*1, one of the plurality of data sets, in this example, 1-D1, into a cache memory, in this example, 9-*c*1, of that other compute element 921-*c*1. Further, the compilation process 95-*cmp* includes also the execution by each of the other compute elements, for example, 921-*c*1, the plurality of computational tasks on the respective one of the plurality of data sets, in this example 1-D1, in the cache memory, in this example, 9-*c*1, The result of the fetch/distribute 95-*dis*, and execution process, facilitated by the compilation process 95-*cmp*, is the joint execution of the computational tasks associated with the plurality of computational commands 95-*cc*-1, 95-*cc*-2.

In a possible option of the possible variation just described, further the fetching and distribution 95-*dis* by each of the other compute elements, for example, 921-*c*1, of one of the plurality sets, in this example, 1-D1, into the cache, in this example, 9-*c*1, is done from a memory 54-*m*, in which the memory is selected from a group consisting of: (i) a random access memory such as a dynamic random access memory (DRAM), and (ii) a distributed random access memory 54-*m*1. 54-*m*2. 54-*mk*, in which the distributed random access memory is distributed among the plurality of other compute elements 921-*c*1, 921-*c*2, 921-*cn* or among additional compute elements. As a result of this process, the first data set 712-D1 is fetched from the memory 54-*m* only once, and distributed 95-*dis* into the other compute elements 921-*c*1, 921-*c*2, 921-*cn*, only once, while being processed many times in the execution of the computational tasks, where such execution of multiple computational tasks has been effectively synchronized by the previous deferral of execution by the first compute element 950-*c*1.

Described herein are systems and methods for updating distributively mathematical models.

Figure 9:
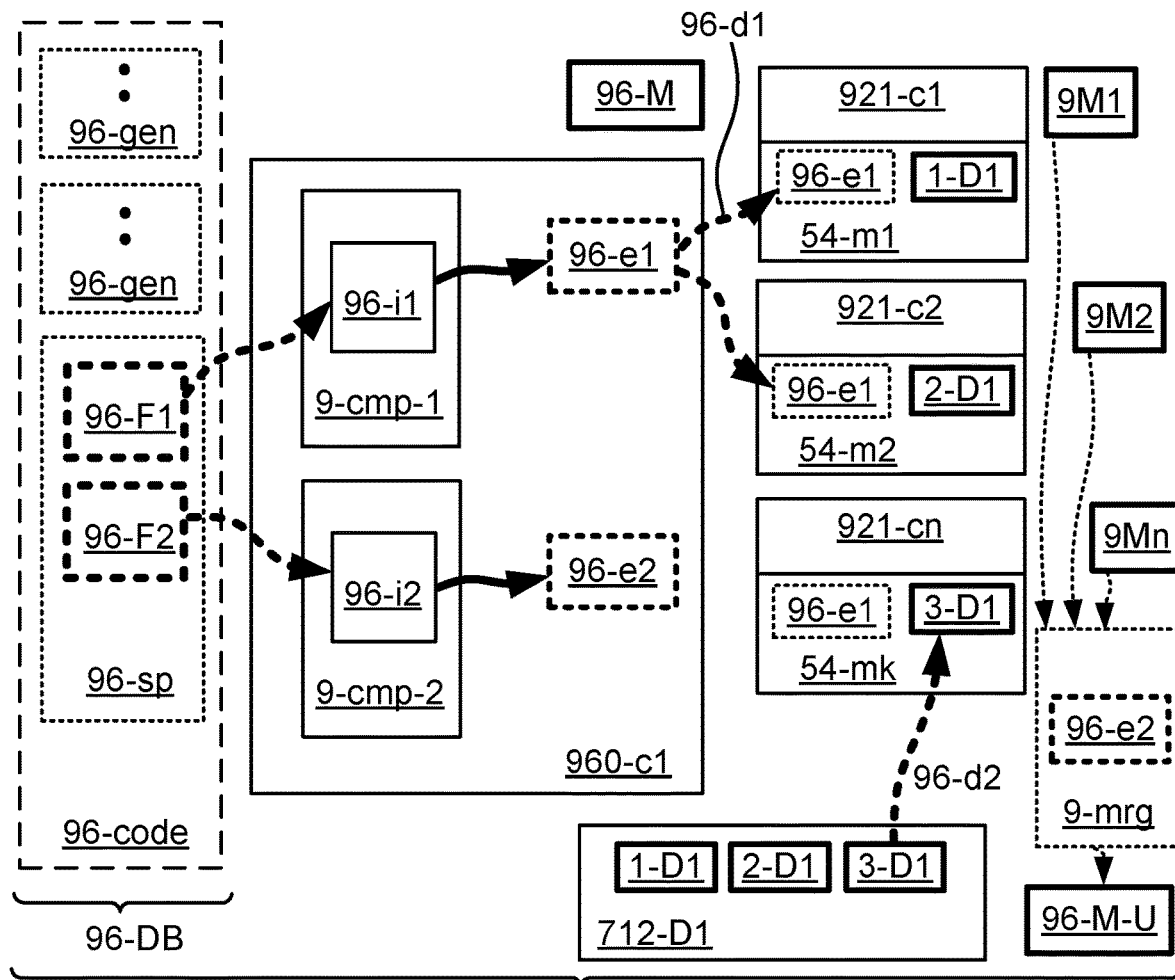
FIG. 9 illustrates one embodiment of a system operative to update distributively a mathematical model.

FIG. 9 illustrates one embodiment of a system 960-*cp* operative to update distributively a mathematical model. In this sense, "mathematical model" may be any model which is used to predict an output from a given input, based on previous input-output relations, in which such model may be employed in conjunction with neural networks, machine learning procedures, or statistical analysis, but in all cases it is a model in which certain data input may be used to train the model.

In various embodiments, there is a code sequence 96-*code* that includes a sequence of general commands 96-*gen*, and a specific command 96-*sp* calling to update an original mathematical model 96-M. The specific command 96-*sp* has a first function 96-F1 which describes a procedure for updating the mathematical model 96-M.

Within the system 960-*cp*, there is a first compute element 960-*c*1 that executes the general commands 96-*gen* as they come up. However, when the first compute element 960-*c*1 encounters the specific command 96-*sp*, it does not execute the specific command, but rather converts the first function 96-F1 from a first high level programming language into an intermediary code 96-*i*1 and then into a first set of executable instructions 96-*e*1. Such conversion may be a compilation process 9-*cmp*-1, and such intermediary code 96-*i*1 may be a second high level programming language. The result of the conversion process 9-*cmp*-1 is that the first function 96-F1 has been converted into the first set of executable instructions 96-*e*1. The system 960-*c*1 distributes 96-*d*1 the first set of executable instructions 96-*e*1 among a plurality of compute elements 921-*c*1, 921-*c*2, 921-*cn* other than the first compute element 960-*c*1. Each of such compute elements 921-*c*1, 921-*c*2, 921-*cn* includes a memory, 54-*m*1 with 921-*c*1, 54-*m*2 with 921-*c*2, 54-*mk* with 921-*cn*. Each memory 54-*m*1, 54-*m*2, 54-*mk* will hold the entire first set of executable instructions 96-*e*1. The system includes also an input data 712-D1, which may be a data set, a series of data elements, instructions for importing or exporting data, or other. Such input data 712-D1 includes a plurality of data sets 1-D1, 2-D1, 3-D1, each of which constitutes a portion of the input data 712-D1. The system 96-*cp* distributes 96-*d*2 the plurality of data sets 1-D1, 2-D1, 3-D1 among the various other compute elements 921-*c*1, 921-*c*2, 921-*cn*, such that after the distribution 96-*d*2 there is a data set resident in the associated memory of each compute element, 1-D1 in memory 54-*m*1 of 921-*c*1, 2-D2 in memory 54-*m*2 of 921-*c*2, 3-D1 in memory 54-*mk* of 921-*cn*.

Each of the other compute elements 921-*c*1, 921-*c*2, 921-*cn*, accesses the original mathematical model 96-M, and uses the data set stored in its memory to execute the first set of executable instructions 96-*e*1 in order to create an updated mathematical model. For example, compute element 921-*c*1 accesses its instance of 96-M, accesses data set 1-D1 stored in memory 54-*m*1, and then executes the first set of executable instructions 96-*e*1 in conjunction with 1-D1 and 96-M, to create updated mathematical model 9M1. Similarly, compute element 921-*c*2 accesses its instance of 96-M, accesses data set 2-D1 stored in memory 54-*m*2, and then executes the first set of executable instructions 96-*e*1 in conjunction with 2-D1 and 96-M, to create updated mathematical model 9M2. Similarly, compute element 921-*cn* accesses its instance of 96-M, accesses data set 3-D1 stored in memory 54-*mk*, and then executes its instance of the first set of executable instructions 96-*e*1 in conjunction with 3-D1 and 96-M, to create updated mathematical model 9Mn. The result, in some embodiments, is a plurality of updated mathematical models 9M1, 9M2, 9Mn. In this sense, an "updated mathematical model" is one that is based on the original mathematical model 96-M but which produces a new or slightly different result per the same input data.

In various embodiments, the specific command 96-*sp* includes also a second function 96-F2, which describes a procedure for merging 9-*mrg* updated mathematical models 9M1, 9M2, 9Mn. The first compute element 960-*c*1 reads the first code sequence 96-*code* stored in the data base 96-DB, executes the general commands 96-*gen*, but does not execute the specific command 96-*sp* with the second function 96-F2. Rather, when the first compute element 960-*c*1 encounters the specific command 96-*sp*, it converts the second function 96-F2 from a first high level programming language into an intermediary code 96-*i*2 and then into a second set of executable instructions 96-*e*2. Such conversion may be a compilation process 9-*cmp*-2, and such intermediary code 96-*i*2 may be a second high level programming language. The result of the conversion process 9-*cmp*-2 is that the second function 96-F2 has been converted into a second set of executable instructions 96-*e*2. After the original mathematical model 96-M has been updated into a plurality of updated mathematical models 9M1, 9M2, 9Mn, the system 960-*cp* executes the second set of executable instructions 96-*e*2 in order to merge 9-*mrg* the plurality of updated mathematical models 9M1, 9M2, 9Mn, into a single updated mathematical function 96-M-U. The second set of executable instructions 96-*e*2 may be executed by the first compute element 960-*c*1, one of the other compute elements 921-*c*1, 921-*c*2, 921-*cn*, or by another compute element or other processor located either inside or outside of the system 960-*cp*. In every embodiment, the second set of executable instructions 96-*e*2 can be executed only after the system 960-*cp* has created the plurality of updated mathematical models 9M1, 9M2, 9Mn. In some embodiments, the result of the merger 9-*mrg* is a single updated mathematical model 96-M-U that factors in all of the plurality of updated mathematical models 9M1, 9M2, 9Mn. In alternative embodiments, the result of the merger 9-*mrg* is that two or more of the plurality of updated mathematical models 9M1, 9M2, 9Mn are merged, but one or more of the plurality of mathematical models 9M1, 9M2, 9Mn are not merged and either remain separate or become part of a second merged mathematical model (not shown in FIG. 9).

In one embodiment, there are two embedded functions, 96-F1 and 96-F2 within a specific command 96-*sp* that is itself embedded in a first code sequence 96-*code* which is part of data base 96-DB. In some alternative embodiments, not illustrated in FIG. 9, there is only a first function 96-F1, and the end of the process is the creation of a plurality of updated mathematical models 9M1, 9M2, 9Mn. In some alternative embodiments, not illustrated in FIG. 9, there is only one function embedded in specific command 96-*sp*, but this one function describes both the updating of mathematical model 96-M to create the plurality of updated mathematical models 9M1, 9M2, 9Mn, and also the merger 9-*mrg* of such updated mathematical models 9M1, 9M2, 9Mn into a new updated mathematical model 96-M-U. In some alternative embodiments, not illustrated in FIG. 9, the functions, whether a single function 96-F1, or two functions 96-F1 and 96-F2, or single function embodying both updating and merging of updated mathematical models, are not embedded in first specific command 96-*sp*, but are rather:

a. embedded in a second specific command (not shown in FIG. 9) that is embedded in a first code sequence 96-*code*, or alternatively b. are embedded in a second specific command (not shown in FIG. 9) that is embedded in another portion of the data base 96-DB, or alternatively c. are embedded in a second specific command (not shown in FIG. 9) that is not embedded in the data base 96-DB but is rather embedded in another part of the system 960-*cp* or alternatively are external to the system 960-*cp*, or alternatively d. are standalone functions that are not embedded in a specific command but are rather pointed to by a specific command, and may be located at a different location within the data base 96-DB, or a different location within the system 960-*cp*, or outside the system 960-*cp* (but none of these embodiments are shown in FIG. 9).

One embodiment is a system 960-*cp* operative to distributively update a mathematical model 96-M. In one particular implementation of such embodiment, the system 960-*cp* includes a first compute element 960-*c*1, a plurality of other compute elements 921-*c*1, 921-*c*2, 921-*cn*, and a plurality of memories 54-*m*1, 54-*m*2, 54-*mk* associated respectively with the plurality of compute elements 921-*c*1, 921-*c*2, 921-*cn*. The system 960-*cp* also includes a data base 96-DB operative to store a first code sequence 96-*code*, in which the first code sequence comprises general commands 96-*gen* and a specific command 96-*sp* calling for an update of a mathematical model 96-M, in which the specific command 96-*sp* includes a reference to a first function 96-F1 operative to update the mathematical model 96-M. The first compute element 960-*c*1 is configured to identify the first function 96-F1 associated with the specific command 96-*sp*. The first compute element 960-*c*1 is further configured, upon said identification, to initiate, in the system 960-*cp*, a selective compilation process 9-*cmp*-1 operative to selectively compile the first function 96-F1 into a first set of executable instruction 96-*e*1. The system 960-*cp* is configured to distribute 96-*d*1 a plurality of instances, that is copies, of the first set of executable instruction 96-*e*1 among, respectively, the plurality of memories 54-*m*1, 54-*m*2, 54-*mk*. Each of the plurality of compute elements (for example, 921-*c*1) is configured to access from its respective memory (for example, 921-*c*1 accesses from 54-*m*1), and then execute, the respective instance of the first set of executable instructions 96-*e*1, using as an input (i) a certain portion of input data 712-D1 (for example, 921-*c*1 uses 1-D1) and (ii) an instance, that is copy, of the first mathematical model 96-M.

The result is that the plurality of compute elements 921-*c*1, 921-*c*2, 921-*cn*, create collectively, a plurality of updated mathematical models 9M1, 9M2, 9Mn, (wherein 921-*c*1 creates 9M1, 921-*c*2 creates 9M2, and 921-*cn* creates 9Mn) thereby executing collectively the specific command 96-*sp*, at least in part.

In a first possible alternative embodiment to the system 960-*cp* described above to update distributively a mathematical model 96-M, the specific command 96-*sp*, further includes a reference to a second function 96-F2 operative to merge 9-*mrg* the plurality of updated mathematical models 9M1, 9M2, 9Mn, and the system 960-*cp* is further configured to merge 9-*mrg* the plurality of updated mathematical models 9M1, 9M2, 9Mn into a single updated mathematical model 96-M-U using the second function 96-F2 or a derivative of the second function 96-F2, which may be a second set of executable instructions 96-*e*2 derived from the second function 96-F2.

In a second possible alternative embodiment to the system 960-*cp* described above to update distributively a mathematical model 96-M, the first compute element 960-*c*1 is further configured to read and execute, in the first compute element 960-*c*1, each of the general commands 96-*gen*, using an interpretation process. Also, the system 960-*cp* is further configured to avoid execution of the specific command 96-*sp* in the first compute element 960-*c*1 via the interpretation process, thereby facilitating the collective execution of the specific command 96-*sp* in conjunction with the plurality of other compute elements 921-*c*1, 921-*c*2, 921-*cn* and with the selective compilation process 9-*cmp*-1.

In a third possible alternative embodiment to the system 960-*cp* described above to update distributively a mathematical model 96-M, the system 960-*cp* is further configured to distribute 96-*d*2, among the plurality memories 54-*m*1, 54-*m*2, 54-*mk*, respectively, a plurality of data sets 1-D1, 2-D1, 3-D1, in which the plurality of data sets 1-D1, 2-D1, 3-D1 constitutes the input data 712-D1. Further, each of the data sets (for example, 1-D1) constitutes one of the portions of the input data 712-D1. Further, each of the other compute elements (for example 921-*c*1) has a local access, via the respective memory (for example, 54-*m*1 for 921-*c*1), to both the instance of the first set of executable instructions 96-*e*1 and the respective data set (for example, 1-D1 in 54-*m*1) constituting the certain portion of input data 712-D1, in which the collective execution by the other compute elements 921-*c*1, 921-*c*2, 921-*cn*, is done efficiently as a result of the local access.

In a fourth possible alternative embodiment to the system 960-*cp* described above to update distributively a mathematical model 96-M, further each of the plurality of memories 54-*m*1, 54-*m*2, 54-*mk* is a memory element selected from a group consisting of: (i) a random access memory (RAM), (ii) a dynamic random access memory (DRAM), and (iii) a FLASH memory.

In a fifth possible alternative embodiment to the system 960-*cp* described above to update distributively a mathematical model 96-M, further the data base 96-DB is a storage or a memory element selected form a group consisting of: (i) a random access memory (RAM), (ii) a dynamic random access memory (DRAM), (iii) a FLASH memory, (iv) a hard disk, (v) an optical disk, and (vi) any non-transitory machine readable medium.

Figure 10:
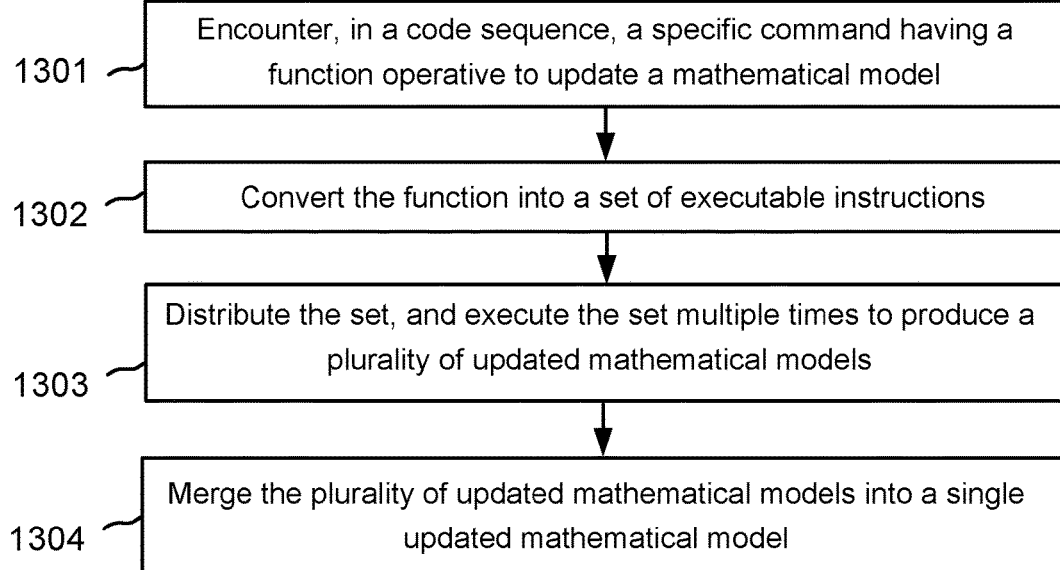
FIG. 10 illustrates one embodiment of a method for updating distributively a mathematical model.

FIG. 10 illustrates one embodiment of a method for updating distributively a mathematical model. In step 1301, a first compute element 960-*c*1 belonging to a computing platform 960-*cp* executes a first code sequence 96-*code* including general commands 96-*gen*, until the first compute element 960-*c*1 encounters, in the first code sequence 96-*code*, a specific command 96-*sp* calling for an update of a mathematical model 96-M in which the specific command 96-*sp* includes (i) a reference to a first function 96-F1 operative to update the mathematical model 96-M, and (ii) a reference to a second function 96-F2 operative to merge a plurality of updated mathematical models 9M1, 9M2, 9Mn. In step 1302, as a result of such encounter, the computing platform 960-*cp* converts 9-*cmp*-1 the first function 96-F1 to a first set of executable instructions 96-*e*1. In step 1303, the computing platform 960-*cp* distributes a plurality of instances of the first set of executable instructions 96-*e*1 among, respectively, a plurality of compute elements 921-*c*1, 921-*c*2, 921-*cn* that belong to the computing platform 960-*cp*, and the computing platform causes each of the plurality of compute elements (for example, 921-*c*1) to execute its respective instance, that is copy, of the first set of executable instructions from its respective memory (for example, 921-*c*1 executes its instance of 96-*e*1 from memory 54-*m*1). To do this, each compute element (for example, 921-*c*1) uses as an input an instance, that is a copy, of the first mathematical model 96-M, that is to say the original mathematical model 96-M before updating, and a certain portion of the input data (for example, the data set 1-D1 for compute element 921-*c*1) thereby creating an updated mathematical model (for example, 921-*c*1 creates the updated mathematical model 9M1). Therefore, all of the plurality of other compute elements, 921-*c*1, 921-*c*2, 921-*cn*, acting together, create a plurality of updated mathematical models, 9M1, 9M2, 9Mn, respectively. In step 1304, the computing platform 96-*cp* uses the second function 96-F2 or a derivative 96-*e*2 of the second function 96-F2 to mere 9-*mrg* the plurality of updated mathematical models 9M1, 9M2, 9Mn into a single updated mathematical model 96-M-U.

In a first possible alternative embodiment to the method described above for updating distributively a mathematical model, further the execution of the first code sequence 96-*code* is an interpretation process, in which each of the general commands 96-*gen* is interpreted and executed separately by the first compute element 960-*c*1 and in the first compute element 960-*c*1. Further, the conversion 9-*cmp*-1 of the first function 96-F1 to the first set of executable instructions 96-*e*1 is a compilation process, in which the compilation process is different from the interpretation process at least in that the compilation process produces the first set of executable instructions 96-*e*1 to be executed by the plurality of other compute elements 921-*c*1, 921-*c*2, 921-*cn*, and not by the first compute element 960-*c*1.

In a first possible configuration of the first possible alternative embodiment just described, further the first code sequence 96-*code* and the first function 96-F1 are written in a first high level programming language. Further, the compilation process 9-*cmp*-1 includes converting the first function 96-F1 from the first high level programming language into an intermediary code 96-*i*1 in a second high level programming language, and compiling the intermediary code 96*4*1 from the second high level programming language into the first set of executable instructions 96-*e*1.

In a first possible variation of the first possible configuration just described, further the first high level programming language is selected from a group consisting of: (i) Python, (ii) Matlab, (iii) R, (iv) Java or Java variant, and (v) any interpretable functional programming language.

In a possible option of the first possible variation just described, further the second high level programming language is selected from a group consisting of: (i) C or C variant, (ii) Pascal, (iii) Fortran, and (iv) any programming language for which an optimizing compiler exists.

In a second possible variation of the first possible configuration described above, further the first function 96-F1 is embedded in the first code sequence 96-*code*.

In a possible option of the second possible variation just described, further the first function 96-F1 is embedded in the specific command 96-*sp*.

In a third possible variation of the first possible configuration described above, further the first function 96-F1 is embedded in a second code sequence (such second code sequence not shown in FIG. 9).

In a second possible configuration of the first possible alternative embodiment described above, further the first code sequence 96-*code*, including the specific command 96-*sp*, is written in a first high level programming language, the first function 96-F1 is written in a second high level programming language, and the compilation process includes compiling the first function 96-F1 from the second high level programming language into the first set of executable instructions 96-*e1*.

In a second possible alternative embodiment to the method described above for updating distributively a mathematical model, further as a result of such encounter, the computer platform 960-*cp* distributes, among the plurality of compute elements 921-*c1*, 921-*c2*, 921-*cn*, respectively, a plurality of instances (copies) of the first mathematical model 96-M, such that each of the plurality of compute elements has local access to the instance (copy) of the first set of executable instructions 96-*e1* and also to the instance (copy) of the first mathematical model 96-M, where both the mathematical model 96-M and the first set of executable instructions 96-*e1* are required for a compute element (for example 921-*c1*) to create its respective updated mathematical model (for example, 9M1). Thus distribution of both the first mathematical model 96-M and the first sect of executable instructions 96-*e1* must be made to all of the compute elements 921-*c1*, 921-*c2*, 921-*cn*, in order from such compute elements to create all the updated mathematical models 9M1, 9M2, 9Mn. The distribution of instances, in other words copies, of the first mathematical model 96-M to the compute elements 921-*c1*, 921-*c2*, 921-*cn*, is not shown in FIG. 9.

In a third possible alternative embodiment to the method described above for updating distributively a mathematical model, further the computing platform 960-*cp* distributes 96-*d2*, among the plurality of compute elements 921-*c1*, 921-*c2*, 921-*cn*, respectively, a plurality of data sets 1-D1, 2-D1, 3-D1, in which the plurality of data sets 1-D1, 2-D1, 3-D1 constitute the input data 712-D1, and each of the data sets constitute one of the portions of the input data 712-D1.

In a first possible configuration of the third possible alternative embodiment just described, further the mathematical model 96-M is a prediction model used in a machine learning process, the plurality of data sets 1-D1, 2-D1, 3-D1 are new samples operative to train the prediction model in conjunction with the machine learning process, and the first function 96-F1 is a specific procedure operative to describe how to use the new samples, or a portion thereof, to train the prediction model in conjunction with the machine learning process.

In a possible variation of the third possible configuration just described, further the prediction model is selected from a group consisting of: (i) a regression model, (ii) a classification model, (iii) a neural network model, and (iv) a deep learning model.

In a second possible configuration of the third possible alternative embodiment described above, further the mathematical model 96-M is a statistical model, and the plurality of data sets 921-*c1*, 921-*c2*, 921-*cn* is new statistical information.

In a fourth possible alternative embodiment to the method described above for updating distributively a mathematical model, further the computing platform 960-*cp* converts 9-*cmp*-2 the second function 96-F2 into a second sec of executable instructions 96-*e2*, the computing platform 960-*cp* executes the second set of executable instructions 96-*e2*, thereby achieving the merging 9-*mrg* of the plurality of updated mathematical models 9M1, 9M2, 9Mn into a single updated mathematical model 96-M-U.

In a possible configuration of the fourth possible alternative embodiment just described, further the second function 96-F2 is a specific procedure operative to describe how to perform the merging 9-*mrg*, in which the specific procedure is associated with a merging concept selected from a group consisting of: (i) averaging parameters associated with the plurality of updated mathematical models 9M1, 9M2, 9Mn, (ii) selecting parameters associated with the plurality of updated mathematical models 9M1, 9M2, 9Mn, (iii) integrating parameters associated with the plurality of updated mathematical models 9M1, 9M2, 9Mn, (iv) filtering parameters associated with the plurality of updated mathematical models 9M1, 9M2, 9Mn, and (v) any combination of (i), (ii), (iii) and (iv).

In a fifth possible alternative embodiment to the method described above for updating distributively a mathematical model, further the computing platform 960-*cp* causes each of the plurality of compute elements (for example, 921-*c1*) to execute its respective instance (copy) of the first set of executable instructions (for example, 921-*c1* executes 96-*e1* in memory 54-*m1*) using as an input an instance (copy) of the single updated mathematical model 96-M-U and a certain portion of additional input data (which is not shown in FIG. 9), thereby creating, by the plurality of compute elements 921-*c1*, 921-*c2*, 921-*cn*, respectively, a plurality of additional updated mathematical models (which are not shown in FIG. 9). Further, the computing platform 960-*c1* merges (not shown in FIG. 9) the plurality of additional updated mathematical models (which are not shown in FIG. 9) into an additional single updated mathematical model (which is not shown in FIG. 9) using the second function 96-F2 or a derivative thereof 96-*e2*. The result of these steps is the that computing platform 960-*cp* uses, iteratively, the first function 96-F1 and the second function 96-F2 in order to perform incrementally the updates, in which each iteration uses new input data (not shown in FIG. 9) and takes as an input previously updated mathematical model create by the latest merger of individual updated mathematical models created by the plurality of compute elements 921-*c1*, 921-*c2*, 921-*cn*.

Described herein are methods in which there are two embedded functions, 96-F1 and 96-F2 within a specific command 96-*sp* that is itself embedded in a first code sequence 96-*code* which is part of data base 96-DB. In some alternative embodiments, not illustrated in FIGS. 9 and 10, there is only a first function 96-F1, and the end of the process is the creation of a plurality of updated mathematical models 9M1, 9M2, 9Mn. In some alternative embodiments, not illustrated in FIGS. 9 and 10, there is only one function embedded in specific command 96-*sp*, but this one function describes both the updating of mathematical model 96-M to create the plurality of updated mathematical models 9M1, 9M2, 9Mn, and also the merger 9-*mrg* of such updated mathematical models 9M1, 9M2, 9Mn into a new updated mathematical model 96-M-U. In some alternative embodiments, not illustrated in FIGS. 9 and 10, the functions, whether a single function 96-F1, or two functions 96-F1 and 96-F2, or single function embodying both updating and merging of updated mathematical models, are not embedded in first specific command 96-*sp*, but are rather:

a. embedded in a second specific command (not shown in FIGS. 9 and 10) that is embedded in a first code sequence 96-*code*, or alternatively b. are embedded in a second specific command (not shown in FIGS. 9 and 10) that is embedded in another portion of the data base 96-DB, or alternatively c. are embedded in a second specific command (not shown in FIGS. 9 and 10) that is not embedded in the data base 96-DB but is rather embedded in another part of the system 960-*cp* or alternatively are external to the system 960-*cp*, or alternatively d. are standalone functions that are not embedded in a specific command but are rather pointed to by a specific command, and may be located at a different location within the data base 96-DB, or a different location within the system 960-*cp*, or outside the system 960-*cp* (but none of these embodiments are shown in FIGS. 9 and 10).

Figure 11:
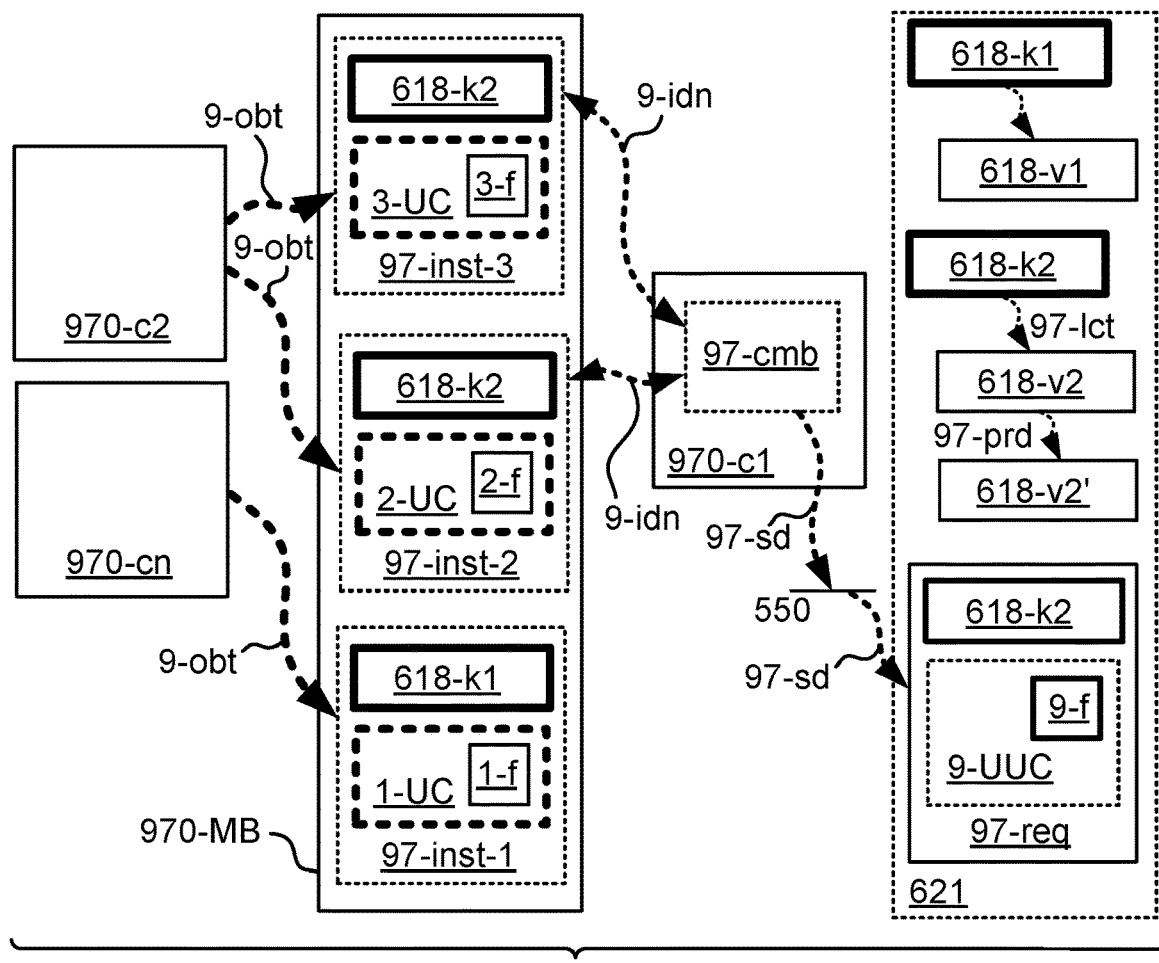
FIG. 11 illustrates one embodiment of a system operative to buffer and unify key-value transactions.

Described herein are systems and methods for unifying key-value transactions in conjunction with updating a key-value store. FIG. 11 illustrates one embodiment of a system 970 operative to unify key-value transactions. In various embodiments, the system 970 includes a first compute element 970-*c*1 that communicates with other compute elements 920-*c*2, 970-*cn*, a memory buffer 970-MB, and a key-value store 621. The first compute element 970-*c*1 obtains 9-*obt* from the other compute elements 970-*c*2, 970-*cn*, or from another place, optionally into the memory buffer 970-MB, a plurality of keys 618-*k*1, 618-*k*2, in which each key is associated with a value (for example, 618-*k*1 is associated with 618-*v*1, and 618-*k*2 with 618-*v*2). Further, the first compute element 970-*c*1 obtains 9-*obt* the keys together with an update command (for example, key 618-*k*1 is obtained with update command 1-UC), in which the update command is operative to instruct the key-value store 621 how to update the value (in this example, update command 1-UC tells key-value store 621 how to update value 618-*v*1). Any update command 1-UC, 2-UC, 3-UC may provide a new value in place of the value to be updated. For example, update command 1-UC may say, "Update 618-*v*1 from whatever it is now to 5.25". Alternatively, the update command may include some kind of mathematical expression to be performed on the old value in order to produce an updated value. For example, update command 1-UC may include mathematical expression 1-*f*, which says, "Take the old value 618-*v*1 and multiple it by 2 in order to create the updated value". In some embodiments, the first compute element 970-*c*1 obtains 9-*obt* a plurality of instructions, for example 97-*inst*-1, which itself contains the key used to obtain a value (here 618-*k*1, used to update value 618-*v*1), an update command (here 1-UC), and a mathematical expression (here 1-*f*) by which the value (here 618-*v*1) will be updated.

FIG. 11 represents an exemplary embodiment of the objects obtained by the first compute element 970-*c*1, although many alternative embodiments are permitted, provided that the first compute element 970-*c*1 obtains 9-*obt* at least a key and an update command for that specific key. In the particular embodiment illustrated in FIG. 11, the first compute element 970-*c*1 obtains 9-*obt* from another compute element 970-*cn*, into the memory buffer 970-MB, a first instruction 97-*inst*-1, which includes a first key 618-*k*1 associated with a first value 618-*v*1, and a first update command 1-UC which itself includes a first mathematical expression 1-*f* by which the first value 618-*v*1 will be updated. Further, the first compute element 970-*c*1 obtains 9-*obt* from a second compute element 970-*c*2, into the memory buffer 970-MB, a second instruction and a third instruction 97-*inst*-2, 97-*inst*-3. The second instruction 97-*inst*-2 includes a second key 618-*k*2 associated with a second value 618-*v*2, and a second update command 2-UC which itself includes a second mathematical expression 2-*f* by which the second value 618-*v*2 will be updated. The third instruction 97-*inst*-3 includes again the second key 618-*k*2 associated with the second value 618-*v*2, and a third update command 3-UC which itself includes a third mathematical expression 3-*f* by which the second value 618-*v*2 will be updated presumably again. It is noted here that both the second and third instructions 97-*inst*-2, 97-*inst*-3 include the same key 618-*k*2 associated with the same value 618-*v*2 to be updated, but the instructions 97-*inst*-2, 97-*inst*-3 include separate mathematical expressions, 2-*f* in instruction 97-*inst*-2, and 3-*f* in instruction 3-*f*. These two mathematical expressions may be different. For example, 2-*f* says "increase the value by 5.0", and 3-*f* says "square the value". If the original value, 618-*v*2, is 4.0, then by 2-*f* the original value will be updated to 4.0+5.0=9.0, and by 3-*f* the updated value will be updated again to 9.0×9.0=81 as the final value. As a mathematical formula, including both mathematical expressions, we may say that $y=3\text{-}f(2\text{-}f(x))$, or in other words, the updated value is the original value updated first by 2-*f*, and then that update is further updated by 3-*f*.

In some embodiments, 2-*f* is the same mathematical expression as 3-*f*, but again the combined result is derived from $y=3\text{-}f(2\text{-}f(x))$. For example, if the original value is 4.0, and 2-*f* says, "multiply the value by itself", then in this example 3-*f* also says "multiply the value by itself", and the results is $y=3\text{-}f(2\text{-}f(x))=3\text{-}f(4.0\times4.0)=16.0\times16.0=256.0$.

In some embodiments, the first compute element 970-*c*1 identifies 9-*idn* that at least two of the instructions 97-*inst*-2, 97-*inst*-3 are associated with the same key, here 618-*k*2, and hence with the same value to be updated, here 618-*v*2. Consequently, the first compute element combines 97-*cmb* the two update commands 2-UC, 3-UC associated with the two instructions 97-*inst*-2, 97-*inst*-3 that were identified to be associated with the same key 681-*k*2. The combination of 2-UC and 3-UC results in a unified update command 9-UUC. The first compute element 970-*c*1 sends 97-*sd* to the key-value store 621 an update request 97-*req* which includes the key 618-*k*2 that has been obtained multiple times by the first compute element 970-*c*1, the unified update command 9-UUC, and a third mathematical expression 9-*f* which is to be performed on the original value 618-*v*2, and which is the combination of the first and second mathematical expressions 2-*f*, 3-*f*. For example, if 2-*f* is y=x+5.0, and 3-*f* is y=(x times x), then 9-*f* is y=(x+5.0) times (x+5.0). This sending 97-*sd* of the update request 97-*req* may be done, optionally, through a communication network 550 which communicatively connects the first compute element 970-*c*1 and the key-value store 621. Such communication network 550 may be a switching network, with any kind of hardware or software configurations permitted for switching networks.

In some embodiments, the key-value store 621 uses the key 618-*k*2 associated with the unified update command 9-UUC in order to locate 97-*lct* the value to be updated 618-*v*2 by the unified update command 9-UUC. The key-value store 621 then applies, on the located value 618-*v*2, the third mathematical expression 9-*f* to produce 97-*prd* a second value 618-*v2'* which is an update of the original value 618-*v1*. The key-value store 621 then stores this second value 618-*v2'* in conjunction with the single key 618-*k2*. The locating 97-*lct* of the value 618-2 to be updated, the production 970-*prd* of the second value 618-*v2'*, and storing of this second value 618-*v2'* constitute, together, a single key-value transaction executed on original value 618-*v2*, in which the single key-value transaction comes instead of performing separately the two instructions 97-*inst*-2, 97-*inst*-3 as two separate key-value transactions, thereby reducing load on both the key-value store and the communication network 550.

Throughout this description, and as illustrated in FIG. 11, there has been presented two instructions 97-*inst*-2, 97-*inst*-3, two update commands 2-UC, 3-UC, and two mathematical expressions 2-*f*, 3-*f*, associated with a single key 618-*k2* and a single original value 618-*v2*. It is understood, however, that there may be any higher number of instructions, commands, and mathematical expressions applicable to a single key and a single original value, and in fact in some cases there may be hundreds, thousands, or even more instructions, commands and mathematical expressions applicable to a single key and its associated value.

FIG. 11 shows an embodiment in which the first compute element 970-*c1* obtains 9-*obt* instructions 97-*inst*-1, 97-*inst*-2, 97-*inst*-3 from other compute elements 970-*c2*, 970-*cn*. It is understood that obtaining 9-*obt* the instructions 97-*inst*-1, 97-*inst*-2, 97-*inst*-3 may be an active action of the first compute element 970-*c1* (i.e., pulling), or it may be an active action of the other compute elements 970-*c2*, 970-*cn* (i.e., pushing). In alternative embodiments not shown, the instructions 97-*inst*-1, 97-*inst*-2, 97-*inst*-3 are generated in the compute element 970-*c1* itself, and in that case the obtaining 9-*obt* of the instructions 97-*inst*-1, 97-*inst*-2, 97-*inst*-3 is an internal action of the first compute element 970-*c1*.

One embodiment is a system 970 operative to buffer and unify key-value transactions. In one particular implementation of such embodiment, the system 970 includes a compute element 970-*c1*, a memory buffer 970-MB accessible to the first compute element 970-*c1*, and a key-value store 621 communicatively connected with the first compute element 970-*c1*, in which the key-value store is configured to (i) store a plurality of values 618-*v1*, 618*v2* associated with, respectively, a plurality of keys 618-*k1*, 618-*k2*, and (ii) access each of the plurality of values (such as, for example, 618-*v1*) using the respective key (in this example, 618-*k1*) to locate the value (here 618-*v1*) within the key-value store 621. The first compute element 970-*c1* is configured to obtain 9-*obt* a plurality of instructions 97-*inst*-1, 97-*inst*-2, 97-*inst*-3, in which each instruction (for example, 97-*inst*-1) includes a key (in this example, 618-*k1*) and a respective update command (in this example, 1-UC), where such an update command is operative to instruct the key-value store 621 on how to update the value (in this example, 618-*v1*) associated with the key (in this example, 618-*k1*). The first compute element is further configured to store, in the memory buffer 970-MB, each of the plurality of instructions 97-*inst*-1, 97-*inst*-2, 97-*inst*-3 after they have been obtained 9-*obt*, such that eventually all the instructions 97-*inst*-1, 97-*inst*-2, 97-*inst*-3 are stored in the memory buffer 970-MB. The first compute element is further configured to identify 9-*idn*, in conjunction with the plurality of instructions 97-*inst*-1, 97-*inst*-2, 97-*inst*-3 now stored in the memory buffer 970-MB, at least two instructions (for example, 97-*inst*-2, 97-*inst*-3) associated with a single key (in this example, 618-*k2*, which appears in both of the two instructions). The first compute element 970-*c1* is further configured to combine 97-*cmb* the at least two update commands 2-UC, 3-UC associated with, respectively, the at least two instructions identified 97-*inst*-2, 97-*inst*-3, into a unified update command 9-UUC. The first compute element 970-*c1* is further configured to send, 97-*sd* to the key-value store 621, an update request 97-*req* that includes the single key 618-*k2* and the unified update command 9-UUC, thereby allowing the key-value store 621 to use a single key-value transaction, as described by the unified update command 9-UUC, to update the value 618-*v2* of the single key 618-*k2*.

In a first possible alternative embodiment to the system 970 described above to buffer and unify key-value transactions, the key-value store 621 is further configured to receive the update request 97-*req*, and extract from the update request 97-*req* the single key 618-*k2* and the unified update command 9-UUC. The key value store 621 is further configured to use the single extracted key 618-*k2* to locate 97-*lct* the respective value 618-*v2* in the key-value store 621, and to apply an update operation on the value located 618-*v2*, as specified in the unified update command 9-UUC, thereby producing 97-*prd* a second value 618-*v2'*. The key-value store 621 is further configured to store, within the key-value store 621, the second value 618-*v2'* in conjunction with the single key 618-*k2*, in which said locating 97-*lct* of the value, said producing 97-*prd* of the second value 618-*v2*,' and said storing of the second value 618-*v2'*, constitute, together, the single key-value transaction.

In a first possible configuration of the first possible alternative embodiment just described, further the update request 97-*req* sent 97-*sd* by the first compute element 970-*c1* includes the unified update command 9-UUC, and is sent instead of sending a sequence of at least two separate update requests (not shown) associated with, respectively, the at least two update commands 2-UC, 3-UC associated with, respectively, the at least two instructions identified 97-*inst*-2, 97-*inst*-3. By sending the one unified update command 9-UUC, the first compute element 970-*c1* thereby facilitates the single key-value transaction instead of multiple key-value transactions. One result is that the processing load on the key-value store 621 is reduced. A second result is that the communication load between the first compute element 970-*c1* and the key-value store 621 is reduced. A third result is that the storage load on the key-value store 621 is reduced.

In a first possible option of the first possible configuration just described, further, the key-value store 621 achieves the locating 97-*lct* by applying on the single key extracted 618-*k2* a hash function or a hash table, and such application is done once instead of applying multiple times the hash function or the hash table on multiple instances of the single key as would be required in conjunction with a sequence of at least two separate update requests. One result is that the number of hash calculations in the key-value store 621 is reduced, thereby further reducing the processing load on the key-value store 621.

In a second possible alternative embodiment to the system 970 described above to buffer and unify key-value transactions, further the first compute element 970-*c1* achieves the obtaining 9-*obt* and storing of the plurality of instruction 97-*inst*-1, 97-*inst*-2, 97-*inst*-3 by being configured to receive, from within the system 970, an ongoing stream comprising the plurality of instructions 97-*inst*-1, 97-*inst*-2, 97-*inst*-3, and add each of the incoming instructions 97-*inst*-1, 97-*inst*-2, 97-*inst*-3 to the memory buffer 970-MB while still receiving the stream of instructions 97-*inst*-1, 97-*inst*-2, 97-*inst*-3. One result is that the first compute element 970-*c1* accomplishes the buffering in preparation for the combining 97-*cmb* of the update commands 2-UC, 3-UC.

In a first possible configuration of the second possible alternative embodiment just described, the system 970 further includes other compute elements 970-*c2*, 970-*cn*, and the receiving of the ongoing stream comprising the plurality of instructions 97-*inst*-1, 97-*inst*-2, 97-*inst*-3, is from the other compute elements 970-*c2*, 970-*cn*, in which it is the other compute elements 970-*c2*, 970-*cn*, rather than the first compute element 970-*c1*, that generate the plurality of instructions 97-*inst*-1, 97-*inst*-2, 97-*inst*-3.

In a second possible configuration of the second possible alternative embodiment described above, the receiving of the ongoing stream comprising the plurality of instructions 97-*inst*-1, 97-*inst*-2, 97-*inst*-3, is from the first compute element 970-*c1*, in which it is the first compute element 970-*c1*, rather than the other compute elements 970-*c2*, 970-*cn*, that generates the plurality of instructions 97-*inst*-1, 97-*inst*-2, 97-*inst*-3.

In a third possible alternative embodiment to the system 970 described above to buffer and unify key-value transactions, the system 970 further includes a switching network 550 that communicatively connects the compute element 970-*c1* and the key-value store 621. Further, the update request 97-*req* is sent over the switching network 550. Further, the sending 97-*sd* of the update request 97-*req* includes the unified update command 9-UUC. In this alternative embodiment, the unified command 9-UUC is sent and not two or more separate update requests associated with, respectively, the at least two update commands 2-UC, 3-UC and the at least two instructions identified 97-*inst*-2, 97-*inst*-3. The sending of a single unified update command 9-UUC rather than multiple separate update commands facilitates the single key-value transaction instead of multiple key-value transactions. One result is that the communication load on the switching network 550 is reduced.

Figure 12:
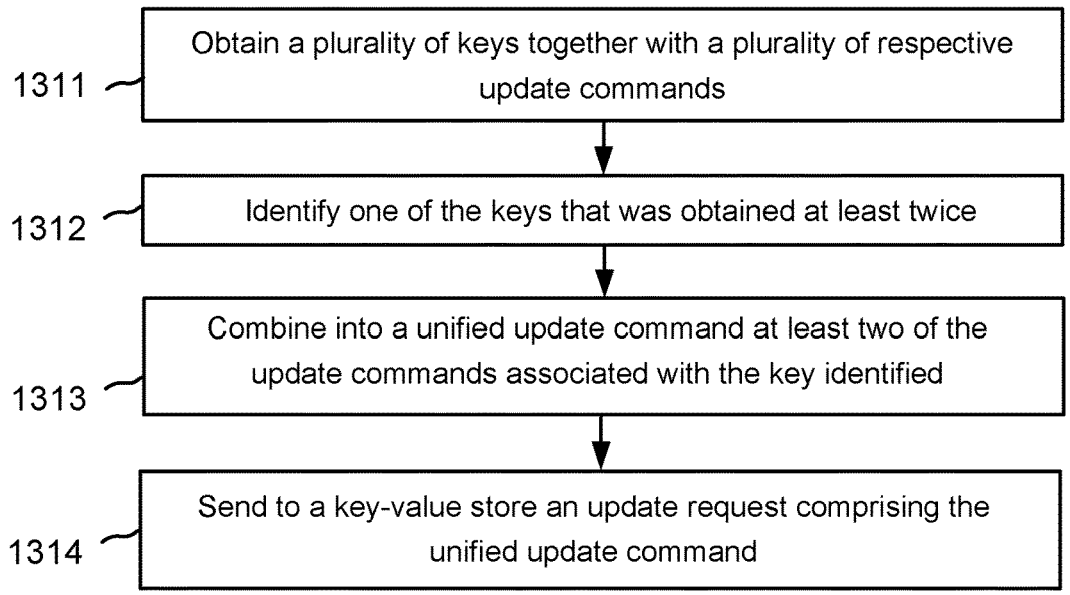
FIG. 12 illustrates one embodiment of a method for unifying key-value transactions in conjunction with updating a key-value store.

FIG. 12 illustrates one embodiment of a method for unifying key-value transactions in conjunction with updating a key-value store 621. In step 1311, a first compute element 970-*c1* obtains 9-*obt* a plurality of keys 618-*k1*, 618-*k2* associated with, respectively, a plurality of values 618-*v1*, 618-*v2*, in which each of the plurality of keys (for example, 618-*k1*) is obtained together with an update command (in this example, 1-UC), and such update command is operative to instruct a key-value store 621 on how to update the value (in this example, 618-*v1*) of the key (in this example, 618-*k1*). In step 1312, the first compute element 970-*c1* identifies, within the keys obtained 618-*k1*, 618-*k2*, one of the keys 618-*k2* that (i) was obtained 9-*obt* a first time in conjunction with a first of the update commands 2-UC, and (ii) was obtained 9-*obt* a second time in conjunction with a second of the update commands 3-UC. In step 1313, the first compute element 970-*c1* combines 97-*cmb* the first update command 2-UC and the second update command 3-UC into a unified update command 9-UUC associated with the key identified 618-*k2*. In step 1314, the first compute element 970-*c1* sends 97-*sd*, to the key-value store 621, an update request 97-*req* that includes the key identified 618-*k2* and the unified update command 9-UUC, thereby allowing the key-value store 621 to use a single key-value transaction, as described by the unified update command 9-UUC, to update the value 618-*v2* (into 618-*v2'*) of the key identified 618-*k2*.

In a first possible alternative embodiment to the method just described for unifying key-value transactions in conjunction with updating a key-value store 621, further the first update command 2-UC includes a first mathematical expression 2-*f* to be performed on the value 618-*v2* associated with the key identified 618-*k2*, the second update command 3-UC includes a second mathematical expression 3-*f* to be performed on the value 618-*v2* associated with the key identified 618-*k2*, and the unified update command 9-UUC includes both the first mathematical expression 2-*f* and the second mathematical expression 3-*f*, to be performed respectively as a sequence of two operations on the value 618-*v2* associated with the key identified 618-*k2*. By including both mathematical expressions 2-*f*, 3-*f*, the unified update command 9-UUC thereby facilitates unification of the key-value transactions.

In a possible configuration of the first possible alternative just described, further the key-value store 621 receives the update request 97-*req*, and extracts from the update request 97-*req* the key identified 618-*k2*, the first mathematical 2-*f* expression, and the second mathematical expression 3-*f*. Further, the key-value store 621 uses the key identified 618-*k2* to locate 97-*lct*, in the key-value store 621, the respective value 618-*v2*. Further, the key-value store 621 applies the first mathematical expression 2-*f* on the value 618-*v2* located, thereby a producing a first intermediate value. Further, the key-value store 621 applies the second mathematical expression 3-*f* on the first intermediate value, thereby producing a second value 618-*v2'*. Further, the key-value store 621 stores the second value 618-*v2'* in conjunction with the key identified 618-*k2*, in which the locating 97-*lct*, applying mathematical expressions 2-*f*, 3-*f*, and storing, together, constitute the single key-value transaction, and in which the applying of the first mathematical expression 2-*f* and the applying of the second mathematical expression 3-*f*, together, constitute the sequence of two operations.

In a second possible alternative embodiment to the method described above for unifying key-value transactions in conjunction with updating a key-value store 621, further the first update command 2-UC includes a first mathematical 2-*f* expression to be performed on the value 618-*v2* associated with the key identified 618-*k2*. Further, the second update command 3-UC includes a second mathematical expression 3-*f* to be performed on the value 618-*v2* associated with the key identified 618-*k2*. Further, the unified update command 9-UUC includes a third mathematical expression 9-*f* to be performed on the value 618-*v2* associated with the key identified 618-*k2*, in which the third mathematical expression 9-*f* is a combination of the first mathematical expression 2-*f* and the second mathematical expression 3-*f*.

In a first possible configuration of the second alternative embodiment just described, further the key-value store 621 receives the update request 97-*req*, and extracts from it the key identified 618-*k2* and the third mathematical expression 9-*f*. Further, the key-value store 621 uses the key identified 618-*k2* to locate 97-*lct* the respective value 618-*v2*. Further, the key-value store 621 applies on the value located 618-*v2* the third mathematical expression 9-*f*, thereby producing a second value 618-*v2'*. Further, the key-value store 621 stores the second value 618-*v2'* in conjunction with the key identified 618-*k2*. The locating 97-*lct*, applying the third mathematical expression 9-*f*, and the storing, together, constitute said single key-value transaction.

In a second possible configuration of the second alternative embodiment described above, further the third mathematical expression 9-*f* is the second mathematical expression 3-*f* having as an argument the first mathematical 2-*f* expression, where the first mathematical expression 2-*f* has as an argument the value 618-*v2* associated with the key identified 618-*k*2. The result is that unification of the two mathematical expressions 2-*f*, 3-*f* is achieved in the third mathematical expression 3-*f*.

In a third possible alternative embodiment to the method described above for unifying key-value transactions in conjunction with updating a key-value store 621, further the first update command 2-UC includes a first new value associated with the key identified 618-*k*2, the second update command 3-UC includes a second new value associated with the key identified 618-*k*2, and the unified update command 9-UUC includes only the second new value which is to be stored by the key-value store 621 with the key identified 618-*k*2, instead of the value 618-*v*2 currently associated with the key identified 618-*k*2. For example, the first update command 2-UC may say, "Update 618-*v*1 from whatever it is now to 5.25" (the first new value), and the second update command 3-UC may say "Update 618-*v*1 from whatever it is now to 8.15" (the second new value). Consequently, the unified update command 9-UUC will simply say "Update 618-*v*1 from whatever it is now to 8.15", thereby effectively ignoring the first update to 5.25, as this first update is no longer relevant in view of the second update to 8.15.

In a fourth possible alternative embodiment to the method described above for unifying key-value transactions in conjunction with updating a key-value store 621, further the update request 97-*req* is an aggregated update request that includes a first part that includes the key identified 618-*k*2 together with the unified update command 9-UUC that replaces the first update command 2-UC and the second update command 3-UC, and a second part that includes the rest of the keys 618-*k*1 together respectively with the rest of the update commands 1-UC, excluding the first update 2-UC command and the second update command 3-UC.

Described herein are systems and methods to adapt incoming streams of data for distributed processing.

Figure 13:
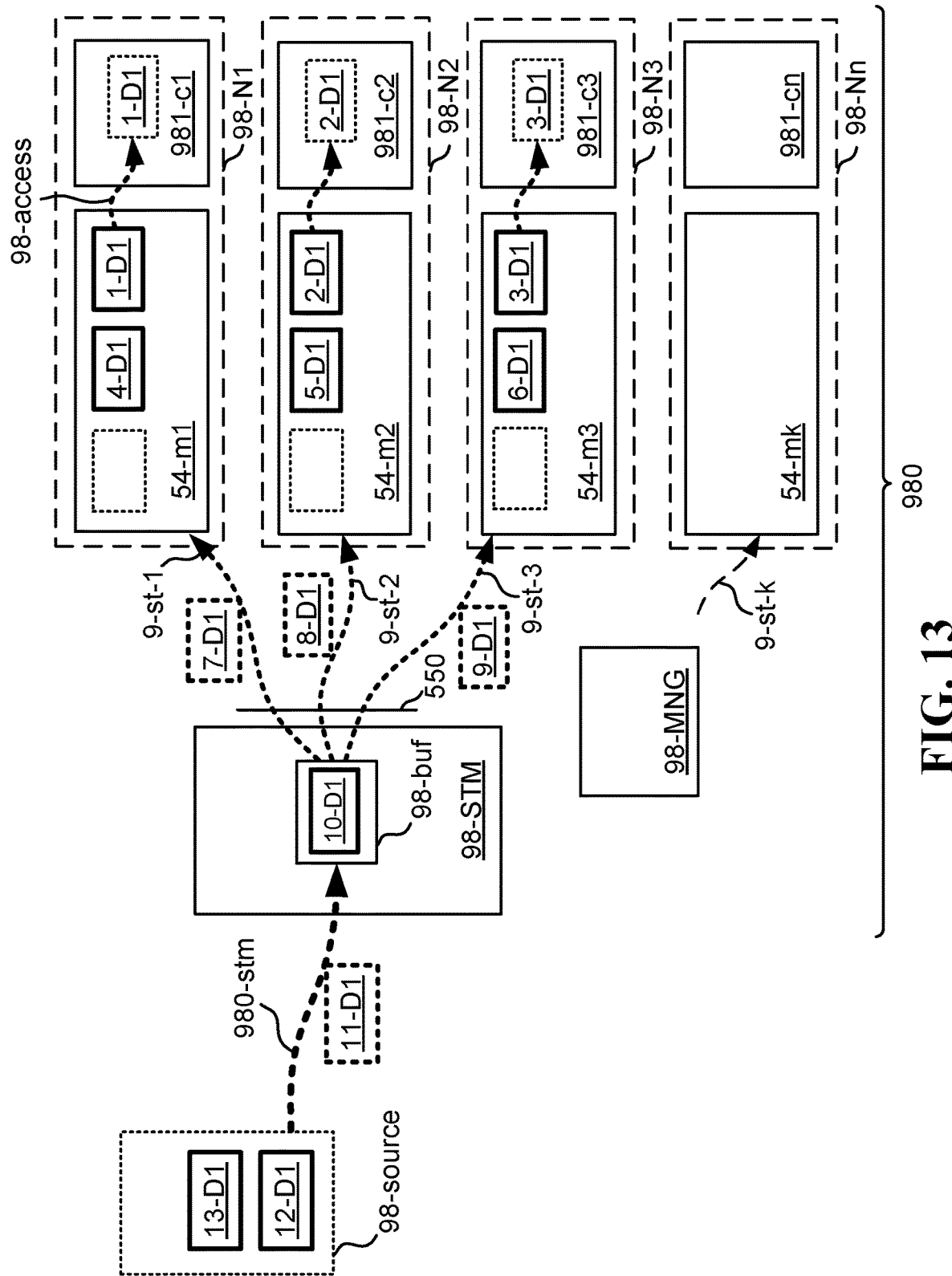
FIG. 13 illustrates one embodiment of a system operative to adapt an incoming stream of data for distributed processing.

FIG. 13 illustrates one embodiment of a system 980 operative to adapt an incoming stream of data for distributed processing. In various embodiments, the system 980 includes a streaming sub-system 98-STM, in which the streaming sub-system receives multiple data sets 1-D1, 2-D1, 3-D1, 4-D1, 5-D1, 6-D1, 7-D1, 8-D1, 9-D1, 10-D1, 11-D1, 12-D1, 13-D1, 14-D1 in a stream 980-*stm* from a data source 98-*source* that is external to the system 980. The streaming sub-system 98-STM adapts the incoming stream 980-*stm* into a specific number of sub-streams 9-*st*-1, 9-*st*-2, 9-*st*-3, wherein said specific number is at least two. The exact number of sub-streams is based upon some criterion or criteria associated with availability or allocation of processing resources. One possible criterion is the allocation of processing resources 981-*c*1, 981-*c*2, 981-*c*3, 981-*cn* belonging to storage- and processing nodes 98-N1, 98-N2, 98-*n*3, 98-Nn within the system 980, such that a decision is made to use two or more nodes with currently allocated processing resources, and to send a sub-stream to each such node with allocated processing resources. Another possible criterion is the availability of processing resources 981-*c*1, 981-*c*2, 981-*c*3, 981-*cn* of the storage-and-processing nodes, such that a decision is made to use two or more nodes with currently available processing resources, and to send a sub-stream to each such node with available processing resources. The data sets in the sub-streams 9-*st*-1, 9-*st*-2, 9-*st*-3 will be stored in the memories 54-*m*1, 54-*m*2 54-*m*3, 54-*mk* of the allocated nodes or available nodes, in which such memories constitute the primary storage space of system 980. However, a node that lacks processing availability or allocation, such as for example node 98-Nn, will not receive a sub-stream for storage, even if the local storage memory 54-*mk* has sufficient capacity to store the data sets of such sub-stream. Sub-streams are directed only to those nodes possessing available or allocated processing resources.

In some embodiments, the streaming sub-system 98-STM includes a buffer memory 98-*buf*, in which the buffer memory 98-*buf* is configured to store temporarily the plurality of data sets 1-D1 to 13-D1 received on-the-fly, in conjunction with (i) the reception of the incoming stream of data 980-*stm* and (ii) the adaptation of the incoming stream of data into the specific number of sub-streams 9-*st*-1, 9-*st*-2, 9-*st*-3.

In some embodiments, the multiple sub-streams 9-*st*-1, 9-*st*-2, 9-*st*-3 are streamed through a switching network 550, rather than directly from the streaming sub-system 98-STM to the nodes.

In some embodiments, there is a management sub-system 98-MNG, which may be external to the streaming sub-system 98-STM as shown in FIG. 13, or which may be an internal component of the streaming sub-system 98-STM. The management sub-system 98-MNG may allocated, on-the-fly, each data set to one of the available or allocated nodes.

In whatever way the number and identity of streams are determined, and whichever element of the system 980 makes the determination, and whichever element in the system 980 sends the stream, and whatever the manner in which the streams are sent, each sub-stream is directed to one storage-and-processing node, where each data set in the sub-stream is locally stored in the memory of such node, then locally accessed by the compute element of such node. For example, and as shown in FIG. 13, the first stream 9-*st*-1 is distributed to the first node 98-N1, which includes a first memory 54-*m*1 that receives the data sets before processing (as shown here, data sets 1-D1 and 4-D1), and which includes also a first compute element 981-*c*1 that locally accesses 98-*access* each data set from the associated memory 54-*m*1, and then processes each data set. Similarly, and as shown in FIG. 13, the second stream 9-*st*-2 is distributed to the second node 98-N2, which includes a second memory 54-*m*2 that receives the data sets before processing (as shown here, data sets 2-D1 and 5-D1), and which includes also a second compute element 981-*c*2 that locally accesses each data set from the associated memory 54-*m*2, and then processes each data set. Similarly, and as shown in FIG. 13, the third stream 9-*st*-3 is distributed to the third node 981-3, which includes a third memory 54-*m*3 that receives the data sets before processing (as shown here, data sets 3-D1 and 6-D1), and which includes also a third compute element 981-*c*3 that locally accesses each data set from the associated memory 54-*m*3, and then processes each data set. The distribution of sub-streams to storage-and-process nodes as shown in FIG. 13 is only one of very many possible embodiments; the main criteria are selection of nodes to receive sub-streams, and then the sending of at least one sub-stream to each such node for local storage and then local processing. Within those criteria, any specific configuration is allowed, and is within the intention of this description.

One embodiment is a system 980 operative to adapt an incoming stream of data for distributed processing of such stream. In one particular implementation of such embodiment, the system 980 includes a plurality compute elements 981-*c*1, 981-*c*2, 981-*c*3, 981-*cn* associated with, respectively, a plurality of memories 54-*m*1, 54-*m*2, 54-*m*3, 54-*mk*, thereby forming respectively a plurality of storage-and-processing nodes 98-N1, 98-N2, 98-N3, 98-Nn. The system 980 also includes a streaming sub-system 98-STM operative to receive, from at least one source 98-*source* outside the system 980, an incoming stream of data 980-*stm* comprising a plurality of data sets 1-D1 to 13-D1. Further the system 980 is configured to determine, for each of the storage-and-processing nodes 98-N1, 98-N2, 98-N3, 98-Nn, the current availability of the storage and processing node for storing and processing the data sets. (For example, assume that three storage-and-processing nodes 98-N1, 98-N2, 98-N3 were determined to be available). Further, the streaming sub-system 98-STM is configured to adapt, according to the current availabilities determined, the incoming stream of data 980-*stm* into at least two sub-streams 9-*st*-1, 9-*st*-2, 9-*st*-3 that together contain the plurality of data sets 1-D1 to 13-D1. The system 980 is further configured to direct the at least two sub-streams 9-*st*-1, 9-*st*-2, 9-*st*-3 into, respectively, at least two of the memories 54-*m*1, 54-*m*2, 54-*m*3 associated with the storage-and-processing nodes 98-N1, 98-N2, 98-N3 determined to be currently available, thereby forming a distributed storage of the plurality of data sets 1-D1 to 13-D1 in conjunction with the storage-and-processing nodes determined. The compute elements 981-*c*1, 981-*c*2, 981-*c*3 that are associated with the storage-and-processing nodes 98-N1, 98-N2, 98-N3 determined to be currently available, are configured to locally access 98-access the respective data sets 1-D1 to 13-D1 from the respective memories 54-*m*1, 54-*m*2, 54-*m*3 and to process the respective data sets locally accessed, thereby facilitating efficient distributive processing of the incoming stream of data 980-*stm*.

One embodiment is a system 980 operative to adapt an incoming stream of data 980-*stm* for distributed processing. In one particular implementation of such embodiment, the system 980 includes multiple storage-and-processing nodes 98-N1, 98-N2, 98-N3, 98-Nn, in which each of the storage-and-processing nodes (for example, 98-N1) comprises at least a compute element (in this example, 981-*c*1) and a memory (54-*m*1) associated with the compute element. The system 980 also includes a streaming sub-system 98-STM operative to receive, from at least one source 98-*source* outside the system 980, an incoming stream of data 980-*stm* comprising a plurality of data sets 1-D1 to 13-D1. Further, the system 980 is configured to allocate, out of the plurality of storage-and-processing nodes 98-N1, 98-N2, 98-N3, 98-Nn and according to a certain criterion, a certain number of the storage-and-processing nodes (for example, three processing nodes 98-N1, 98-N2, 98-N3) for participation in processing of the incoming stream of data 980-*stm*. Further, according to the allocation, the streaming sub-system 98-STM is configured to adapt the incoming stream of data 980-*stm* into a specific number of sub-streams (in this example, three sub-streams 9-*st*-1, 9-*st*-2, 9-*st*-3) which together contain the multiple data sets 1-D1 to 13-D1, in which the specific number of sub-streams is equal to the certain number of storage-and-processing nodes just allocated (in this example, three). The system 980 is further configured to direct the specific number of sub-streams 9-*st*-1, 9-*st*-2, 9-*st*-3 into, respectively, the memories 54-*m*1, 54-*m*2, 54-*m*3 of the storage-and-processing nodes 98-N1, 98-N2, 98-N3 just allocated, thereby accumulating the plurality of data sets 1-D1 to 13-D1 in conjunction with the storage-and-processing nodes just allocated. Each of the compute elements (for example, 981-*c*1) of the storage-and-processing nodes allocated, is configured to access locally 98-access and process the data sets currently accumulated (in this example, first 1-D1, then 4-D1, then 7-D1, then 10-D1, and then 13-D1) in the memory associated therewith (54-*m*1), thereby facilitating efficient distributed processing of the incoming stream of data 980-*stm*.

In a first alternative embodiment to the system 980 described above to adapt an incoming stream of data for distributed processing, further the certain criterion is associated with a certain rate at which the incoming stream of data 980-*stm* is received, and further the allocation of the certain number of the storage-and-processing nodes 98-N1, 98-N2, 98-N3 is done such as to provide, collectively, a sufficient processing power for the distributed processing of the incoming stream of data 980-*stm*. The result is the system 980 thereby facilitates substantially real-time processing of the incoming stream of data 980-*stm*.

In a first possible configuration of the first alternative embodiment just described, further wherein the certain rate is measured in bits-per-second, such that a higher rate of receiving the streaming data 980-*stm* results in a higher number of storage-and-processing nodes allocated to receive sub-streams.

In a possible variation of the first possible configuration just described, also the additional criterion is further associated with a certain variance in the rate at which the incoming stream of data 980-*stm* is received by the streaming sub-system 980-STM, in which a higher variance in rate requires a still higher number of storage-and-processing nodes allocated.

In a second possible configuration of the first alternative embodiment described above, further the multiple data sets 1-D1 to 13-D1 are associated with, respectively, multiple data packets, and the certain rate is measured in packets-per-second, such that a higher certain rate results in a higher rate at which the data packets are received, which results in a higher number of storage-and-processing nodes allocated in order to handle substantial real-time processing of the data packets received.

In a second alternative embodiment to the system 980 described above to adapt an incoming stream of data for distributed processing, further the certain criterion is associated with a specific type of data associated with the incoming stream of data, and the allocation of the certain number of the storage-and-processing nodes 98-N1, 98-N2, 98-N3 is done such as to provide, collectively, a sufficient processing power for the distributed processing of the incoming stream of data 980-*stm* that includes the specific type of data. In this way, the system 980 facilitates the substantially real-time processing of the incoming stream of data 980-*stm*.

In a possible configuration of the second alternative embodiment just described, further the specific type of data is associated with a specific type of processing needed to process the specific type of data, in which specific types of processing require higher processing power and thereby require that a higher number of storage-and-processing nodes be allocated.

In a third alternative embodiment to the system 980 described above to adapt an incoming stream of data for distributed processing, further distributed processing is a distributed updating of a mathematical model, in which the incoming stream of data 980-*stm* is a real-time input to be used in conjunction with the distributed updating of the mathematical model.

In a first possible configuration of the third alternative embodiment just described, further the mathematical model is a prediction model in use by a machine learning process, and the multiple data sets 1-D1 to 1-D13 are new real-time samples operative to train the prediction model in conjunction with the machine learning process.

In one possible variation of the first possible configuration just described, further the prediction model is selected from a group consisting of (i) a regression model, (ii) a classification model, (iii) a neural network, and (iv) a deep learning model.

In a second possible configuration of the third alternative embodiment just described, further the mathematical model is a statistical model, and the multiple data sets 1-D1 to 1-D13 is new real-time statistical information.

In a fourth alternative embodiment to the system 980 described above to adapt an incoming stream of data for distributed processing, further the at least one source 98-*source* is a single source, the incoming stream of data 980-*stm* is a single stream of data, and the adaptation of the incoming stream of data 980-*stm* is a real-time split of the single stream of data 980-*stm* into a specific number of sub-streams 9-*st*-1, 9-*st*-2, 9-*st*-3.

In a fifth alternative embodiment to the system 980 described above to adapt an incoming stream of data for distributed processing, further the at least one source 98-*source* is multiple separate sources, the incoming stream of data 980-*stm* is multiple incoming streams of data generated respectively by the plurality of separate sources, and the adaptation of the incoming stream of data 980-*stm* is real-time rearrangement of the multiple incoming streams of data into the specific number of sub-streams 9-*st*-1, 9-*st*-2, 9-*st*-3.

In a sixth alternative embodiment to the system 980 described above to adapt an incoming stream of data for distributed processing, further the streaming sub-system 98-STM is operative to perform the adaptation while substantially avoiding accumulation of the multiple data sets 1-D1 to 13-D1 in the streaming sub-system 98-STM, such that any of the multiple data sets entering the streaming sub-system substantially immediately leaves the streaming sub-system in conjunction with one of the sub-streams 9-*st*-1, 9-*st*-2, 9-*st*-3, thereby reducing latency in conjunction with the distributed processing of the incoming stream of data 980-*stm*.

In a possible configuration of the sixth alternative embodiment just described, further as a result of the accessing locally 98-access the data sets 1-D1 to 1-D13 by the compute elements 981-*c*1, 981-*c*2, 981-*c*3, the system 980 is further configured to substantially avoid inter-memory transport of the data sets from one of the memories 54-*m*1 to another of the memories 54-*m*2, 54-*m*3, 54-*mk* during the course of the distributed processing, thereby facilitating the efficient distributed processing.

In a possible variation of the possible configuration just described, further the combined effect of (i) the substantial avoidance of accumulation of the multiple data sets 1-D1 to 13-D1 in the streaming sub-system 98-STM, and (ii) the substantial avoidance of inter-memory transport of the data sets from one of the memories 54-*m*1 to another of the memories 54-*m*2, 54-*m*3, 54-*mk* during the course of the distributed processing, is that the overall latency of the receiving and distributed processing of the incoming stream of data 980-*stm* is reduced.

In a possible option for the possible variation just described, the system 980 further includes a switching network 550 that is operative to communicatively interconnect the multiple storage-and-processing nodes 98-N1, 98-N2, 98-N3, 98-Nn and the streaming sub-system 98-STM, and the switching network 550 is further operative to transport the sub-streams 9-*st*-1, 9-*st*-2, 9-*st*-3, such that said combined effect is made more substantial as a latency associated with the switching network 550 is increased.

In a seventh alternative embodiment to the system 980 described above to adapt an incoming stream of data for distributed processing, further as a result of the accessing locally the data sets 1-D1 to 13-D1 by the compute elements 981-*c*1, 981-*c*2, 981-*c*3, the system 980 is further configured to substantially avoid inter-memory transport of the data sets 1-D1 to 13-D1 from one of the memories 54-*m*1 to another of the memories 54-*m*2, 54-*m*3, 54-*mk* during the course of the distributed processing, thereby avoiding additional accumulation of the data sets 1-D1 to 13-D1. Consequently, the accumulation of multiple data sets 1-D1 to 13-D1 in conjunction with the storage-and-processing nodes 98-N1, 98-N2, 98-N3 is substantially the only accumulation of the data sets 1-D1 to 13-D1 in the system 980 prior to the distributed processing of such data sets, thereby substantially reducing a latency associated with the distributed processing of the incoming stream of data 980-*stm*.

In an eighth alternative embodiment to the system 980 described above to adapt an incoming stream of data for distributed processing, further the streaming sub-system 98-STM includes a buffer memory 98-*buf*, and the buffer memory 98-*buf* is configured, in conjunction with (i) the reception of the incoming stream of data 980-*stm* and (ii) the adaptation of the incoming stream of data into the specific number of sub-streams 9-*st*-1, 9-*st*-2, 9-*st*-3, to store on-the-fly, and temporarily, the plurality of data sets 1-D1 to 13-D1.

In a possible alternative to the eighth alternative embodiment just described, further the streaming sub-system 98-STM is operative to perform the adaptation in conjunction with the buffer memory 98-*buf* while substantially avoiding accumulation of the multiple data sets 1-D1 to 13-D1 in the streaming sub-system 98-STM, such that any of the multiple data sets entering the streaming sub-system and stored temporarily in the buffer memory, substantially immediately leaves the streaming sub-system in conjunction with one of the sub-stream 9-*st*-1, 9-*st*-2, 9-*st*-3, thereby eliminating a need for a large buffer memory, and such that the memories 54-*m*1, 54-*m*2, 54-*m*3, 54-*mk* associated with the multiple storage-and-processing nodes 98-N1, 98-N2, 98-N3, 98-Nn have an aggregated storage capacity which is at least 100 times (one hundred times) higher than a storage capacity of the buffer memory 98-*buf* associated with the streaming sub-system 98-STM.

Figure 14A:
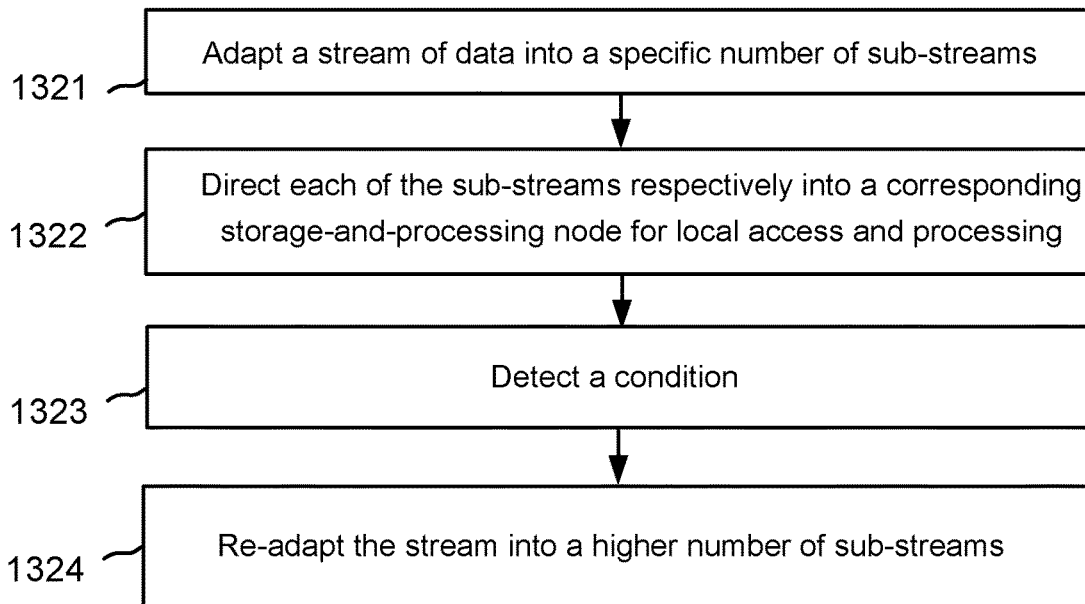
FIG. 14A illustrates one embodiment of a method for dynamically adapting an incoming stream of data for distributed processing.

FIG. 14A illustrates one embodiment of a method for dynamically adapting an incoming stream of data 980-*stm* for distributed processing. In step 1321, a streaming sub-system 98-STM adapts an incoming stream of data 980-*stm* comprising multiple data sets 1-D1 to 13-D1, into a specific number of sub-streams 9-*st*-1, 9-*st*-2, 9-*st*-3. In step 1322, the streaming sub-system 98-STM directs the specific number of sub-streams 9-*st*-1, 9-*st*-2, 9-*st*-3 into, respectively, a certain number of memories 54-*m*1, 54-*m*2, 54-*m*3 that are associated with, respectively, a certain number of storage-and-processing nodes 98-N1, 98-N2, 98-N3, and in which the specific number of sub-streams is equal to the certain number of storage- and processing nodes. In this way, the system 980 accumulates multiple data sets 1-D1 to 13-D1 in conjunction with the certain number of storage-and-processing nodes 98-N1, 98-N2, 98-N3, and processes distributively the data sets 1-D1 to 13-D1 accumulated in the certain number of storage-and-processing nodes, such that each of the data sets (for example, 1-D1) is processed by the storage-and- processing node (in this example, 98-N1) in which the data set has been accumulated. In step 1323, the system detects a condition in which a rate of the accumulation is higher than the rate of processing. This detection may be by the streaming sub-system 98-STM, or by a management sub-system that is either part of the streaming sub-system 98-STM or external to it, or by another unit in the system 980. In step 1324, after and as a result of such detection, the streaming sub-system re-adapts the incoming stream of data 980-*stm* into a higher number of sub-streams 9-*st*-1, 9-*st*-2, 9-*st*-3.

In a possible alternative embodiment to the method just described for dynamically adapting an incoming stream of data 980-*stm* for distributed processing, further the streaming sub-system 98-STM directs the higher number of sub-streams 9-*st*-1, 9-*st*-2, 9-*st*-3, 9-*st*-k into, respectively, a certain higher number of memories 54-*m*1, 54-*m*2, 54-*m*3, 54-*mk* associated with, respectively, a certain higher number of storage-and-processing nodes 98-N1, 98-N2, 98-N3, 98-Nn, in which the higher number of sub-streams is equal to the certain higher number of storage-and-processing nodes. As a result, the multiple data sets 1-D1 to 13-D1 are accumulated in conjunction with the certain higher number of storage-and-processing nodes 98-N1, 98-N2, 98-N3, 98-Nn, and these accumulated data sets are processed distributively in the certain higher number of storage-and-processing nodes, such that each of the data sets is processed by the storage-and-processing node in which the data set is accumulated. In this way, a desired state is reached in which the rate of the accumulation is lower than the rate of the processing, thereby resolving the formerly detected condition in which the accumulation was higher than the rate of processing.

Figure 14B:
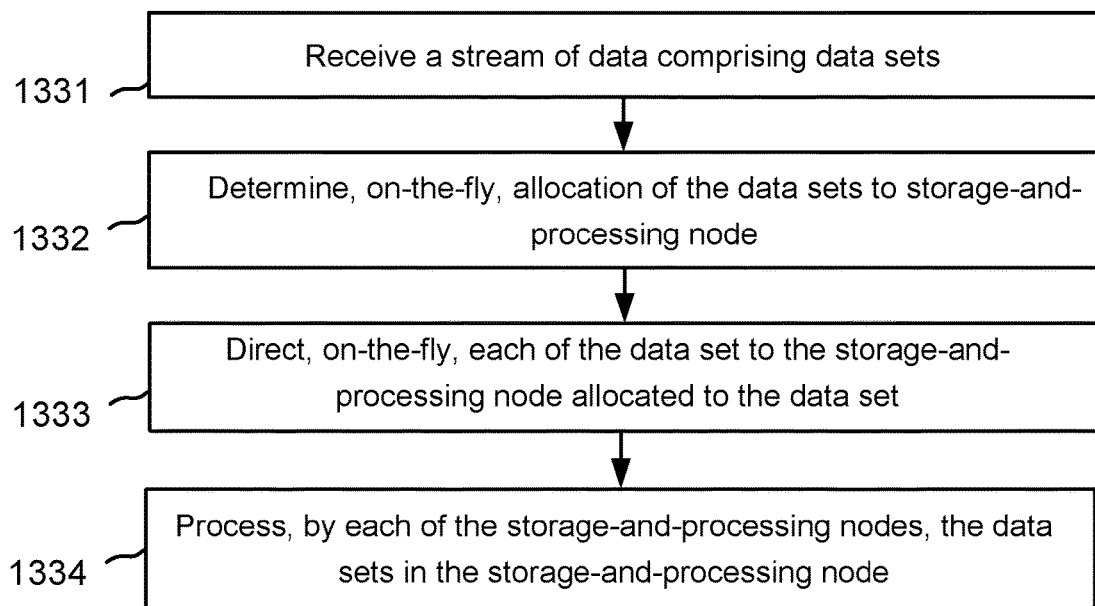
FIG. 14B illustrates one embodiment of a method for dynamically adapting an incoming stream of data for distributed processing.

FIG. 14B illustrates one embodiment of a method for dynamically adapting an incoming stream of data 980-*stm* for distributed processing. In step 1331, a streaming sub-sub-system 98-STM receives an incoming stream of data 980-*stm* that includes multiple data sets 1-D1 to 13-D13. In step 1332, a management sub-system 98-MNG, determines in accordance with a certain criterion, allocation of the data sets 1-D1 to 13-D13 on-the-fly and as received at the streaming sub-system 98-STM, to storage-and-processing nodes 98-N1, 98-N2, 98-N3, in which each such node (for example, 98-N1) includes at least a compute element (in this example, 981-*c*1) and a memory (in this example 54-*m*1) associated with the node. In step 1333, the streaming sub-system 98-STM, in accordance with the determination of allocating the data sets 1-D1 to 1-D13, directs each of the data sets 1-D1 to 1-D13 on-the-fly as received, to one of the storage-and-processing nodes 98-N1, 98-N2, 98-N3 that was just allocated to that data set, thereby creating multiple sub-streams 9-*st*-1, 9-*st*-2, 9-*st*-3, in which each of the sub-streams includes the data sets that were allocated to a specific one of the storage-and-processing nodes. The result is that the data sets 1-D1 to 1-D13 are accumulated in the respective memories 54-*m*1, 54-*m*2, 54-*m*3 of the storage-and-processing nodes 98-N1, 98-N2, 98-N3. In step 1334, the compute elements 981-*c*1, 981-*c*2, 981-*c*3 associated with the nodes 98-N1, 98-N2, 98-N3, respectively, process distributively each of the data sets 1-D1 to 1-D13 accumulated in the nodes, such that each of the data sets (for example, 1-D1) is processed by the storage-and-processing node (in this example, 98-N1) in which the data set was accumulated.

Described herein are systems and methods to group heterogeneous computational resources into multiple computational clusters.

Figure 15A:
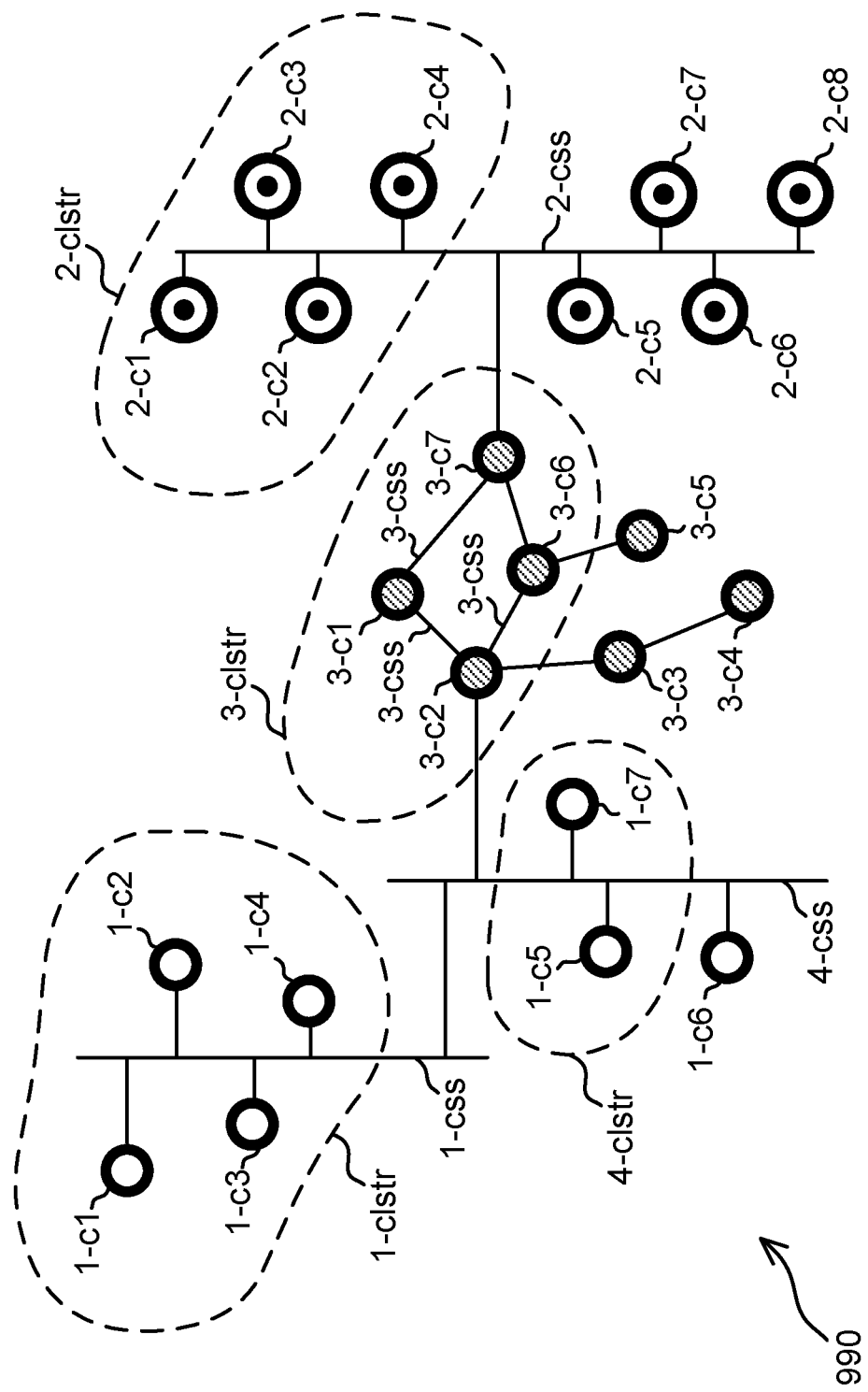
FIG. 15A illustrates one embodiment of a system of heterogeneous compute elements in which the various compute elements have been grouped in clusters, where each cluster includes substantially the same kind of compute element.

FIG. 15A illustrates one embodiment of a system 990 operative to group heterogeneous computational resources into multiple computational clusters. The system 990 includes multiple compute elements representing different kinds of compute elements. For example, compute elements 1-*c*1, 1-*c*2, 1-*c*3, 1-*c*4, 1-*c*5, 1-*c*6, and 1-*c*7, might represent DSPs, whereas 2-*c*1, 2-*c*2, 2-*c*3, 2-*c*4, 2-*c*5, 2-*c*6, 2-*c*7, and 2-*c*8 might represent CPUs, and 3-*c*1, 3-*c*2, 3-*c*3, 3-*c*4, 3-*c*5, 3-*c*6, and 3-*c*7 might represent controllers. Various ones of the compute elements may be grouped into clusters, where each such cluster includes elements of only one type. For example, as shown in FIG. 15A, a first cluster 1-*clstr* might include DSPs 1-*c*1, 1-*c*2, 1-*c*2, and 1-*c*4, whereas a second cluster 2-*clstr* may include CPUs 2-*c*1, 2-*c*2, 2-*c*3, and 2-*c*4, a third cluster 3-*clstr* may include controllers 3-*c*1, 3-*c*2, 3-*c*6, and 3-*c*7, and a fourth cluster 4-*clstr* may include DSPs 1-*c*5 and 1-*c*7. Not all of the compute elements in the system 990 need be clustered, as shown in FIG. 15A, for example, elements 1-*c*6, 2-*c*5, 2-*c*6, 2-*c*7, 2-*c*8, 3-*c*3, 3-*c*4, and 3-*c*5, are not included within any cluster. Elements may be selected for clustering according to various criteria. In all cases, the elements in a single cluster are of a single type. In addition, the elements in a cluster might be in locational proximity to each other, or they may allow a certain kind of communication, or they may allow a certain quantity of communication (throughput) among themselves or with the rest of the system 990, or they may allow a certain quality of communication as measured by Bit Error Rate, latency, or some other measurement, or they may be clustered because of other criteria such as storing or accessing together a certain type of information, or some combination of the foregoing criteria.

Within each cluster, a communication network is operative to communicatively interconnect the various compute elements within the cluster. For example, as shown in FIG. 15A, network 1-*css* interconnects the elements in the first cluster 1-*clstr*, network 2-*cs* interconnects the elements in the second cluster 2-*clstr*, network 3-*css* interconnects the elements in the third cluster 3-*clstr*, and network 4-*css* interconnects elements 1-*c*5 and 1-*c*7 within the fourth cluster 4-*clstr*. The communication network may be an Intranet, an Ethernet bus, a series of wireless hops, or any other conventional kind of communication between compute elements. The communication may be direct between each pair of elements in the cluster. Alternatively, the communication topology may be such that communication is indirect.

The clustering of compute elements in the system 990 may occur when the system 990 is initially created, or may occur when the system 990 becomes operational, or may occur on a temporary basis, or may occur on an ad hoc basis for each specific computational task or only for some computational tasks according to various criteria. The specific clustering topology may be altered over time, or due to the placement or removal of compute elements, or for any other criteria selected for the system 990.

At all times, all of the compute elements within a single cluster are of one type, and they are all connected by a communication network. At all times, all of the clusters, and all of the compute elements in the system 990 that are not part of a cluster, may be communicatively interconnected with the other clusters and other non-clustered compute elements in the system 990.

Figure 15B:
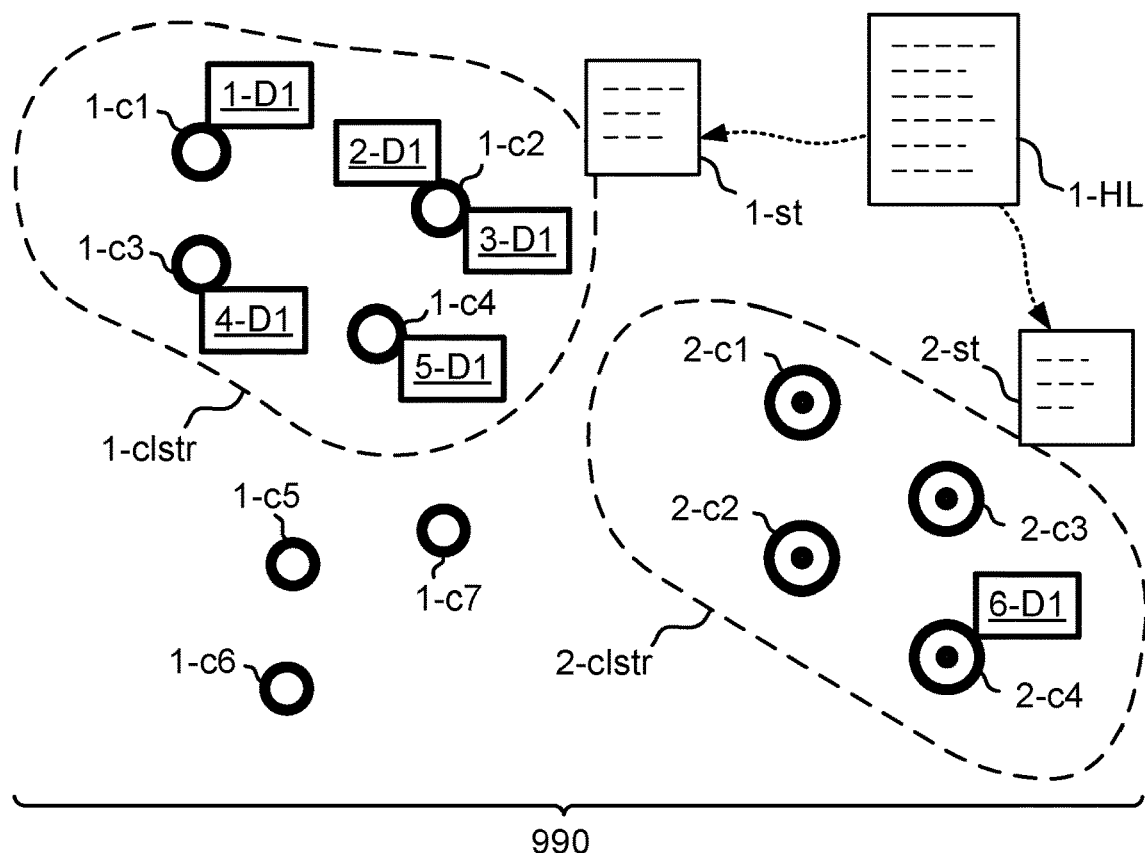
FIG. 15B illustrates one embodiment of a system including heterogeneous compute elements, and a high-level description of a specific computational task to be performed by the compute elements.

FIG. 15B illustrates one embodiment of a system 990 including heterogeneous compute elements, and a high-level description 1-HL of a specific computational task to be performed by the compute elements. In FIG. 15A, the clusters were formed on the basis of type of compute element and system topology as an example. In FIG. 15B, the clusters 1-*clstr*, 2-*clstr* are formed on the basis of type of compute element and specific data-placement pattern within the compute elements as another example.

In FIG. 15B, there are two clusters. The first cluster 1-*clstr* includes only one type of compute element, for example, only DSPs, in which there are four compute elements, 1-*c*1, 1-*c*2, 1-*c*3, and 1-*c*4, although this is illustrative only, and there may be any plurality of compute elements, provided they are all of the same type. Further, the compute elements in the first cluster 1-*clstr* hold a certain data sets which are relevant to performance of the specific computational task, where element 1-*c*1 holds relevant data set 1-D1, element 1-*c*2 holds multiple relevant data sets 2-D1, 3-D1, element 1-*c*3 holds relevant data set 4-D1, and 1-*c*4 holds relevant data set 5-D1. FIG. 15B shows also three additional compute elements of this first type, which are 1-*c*5, 1-*c*6, and 1-*c*7, but they are not included with the first cluster 1-*clstr* because they do not hold relevant data sets. As illustrated in FIG. 15B, not all of the data sets relevant to performance of the specific computational task are held within the first cluster 1-*clstr*. Rather, there is a second cluster that holds additionally relevant data sets 6-D1, which includes compute elements 2-*c*1, 2-*c*2, 2-*c*3, 2-*c*4 that are all of the same type, but this is a second type which is not the same as the compute elements in the first cluster 1-*clstr*. For example, whereas the first cluster 1-*clstr* might include only DSPs, the second cluster 2-*clstr* might include only CPUs, or only controllers, or only another kind of compute element different from DSPs. Any number of the compute elements in the second cluster 2-*clstr* may hold relevant data sets, although in the particular example illustrated in FIG. 15B, only the compute element 2-*c*4 holds a relevant data set 6-D1. The system 990 includes a high-level description 1-HL of the specific computational task to be performed, and includes also multiple sub-task descriptions 1-*st*, 2-*st*, in which each such sub-task is to be performed by a different cluster. In the particular example of FIG. 15B, the specific computational sub-task that is described by 1-*st* will be performed by the compute elements in the first cluster 1-*clstr* that hold relevant data sets, which are compute elements 1-*c*1, 1-*c*2, 1-*c*3, and 1-*c*4. Also, either at substantially same time as the performance of the first sub-task, or earlier than or later than the performance of the first sub-task, the compute elements 2-*c*1, 2-*c*2, 2-*c*3, 2-*c*4 in the second cluster 2-*clstr* will perform the second sub-task as describe in the second sub-task description 2-*st*. To say that one sub-task description is 1-*st* and the other sub-task description is 2-*st* does not necessarily suggest a time relationship between execution of the sub-tasks. Rather, sub-tasks may be performed substantially simultaneously, or seriatim in any order, or as quickly as the compute elements can execute the performance without regard to the timing of compute elements in other clusters. The completion of all of the sub-tasks, here the sub-tasks that are described in 1-*st* and 2-*st*, will complete also the specific computational task described in 1-HL. In all cases, each sub-task description is constructed so that the sub-task described will be most efficiently performed by the compute elements that will execute the performance. In the example posed here, sub-task description 1-*st* will describe a sub-task that will be efficiently performed by DSPs, and sub-task description 2-*st* will describe a sub-task that will be efficiently performed by CPUs.

One embodiment is a system 990 operative to group heterogeneous computational resources into at least two computational clusters. In one particular implementation of such embodiment, the system includes heterogeneous computational resources, including a multiple compute elements 1-*c*1, 1-*c*2, 1-*c*3, 1-*c*4, 1-*c*5, 1-*c*6, 1-*c*7 of a first type, and further including multiple compute elements 2-*c*1, 2-*c*2, 2-*c*3, 2-*c*4, 2-*c*5, 2-*c*6, 2-*c*7, 2-*c*8 of a second type. In some embodiments, there may be a third, fourth, or subsequent types of compute element. The system 990 also includes a communication sub-system with one or more communication networks 1-*css*, 2-*css*, 3-*css*, 4-*css*, operative to communicatively interconnect, either directly or indirectly, the various compute elements, thereby forming a certain network topology in conjunction with the various compute elements. The system 990 also includes a high-level description 1-HL of a specific computational task to be performed in conjunction with the heterogeneous computational resources. This high-level description 1-HL is typically in the form of a programming language. Further, the system 990 is configured to identify, according to the certain network topology, and in conjunction with the various compute elements, at least a first computational cluster 1-*clstr* including at least some of the compute elements of the first type (for example, 1-*c*1, 1-*c*2, 1-*c*3, and 1-*c*4) that are associated with each other, and at least a second computational cluster 2-*clstr* comprising at least some of the compute elements of the second type (for example, 2-*c*1, 2-*c*2, 2-*c*3, and 2-*c*4) that are associated with each other. The system 990 is further configured to form a first computational cluster 1-*clstr* using the compute elements identified as belonging to the first cluster, and also to form a second computational cluster 2-*clstr* using compute elements identified as belonging to the second cluster. The system 990 is further configured to construct, for each of the identified computational clusters 1-*clstr*, 2-*clstr*, and according to the high-level description 1-HL, a sub-task description, such as for example a job graph, which is specifically adapted to the type of compute elements of the computational cluster, and in which all of the sub-task descriptions constructed are operative to accomplish jointly the specific computational task. For example, a first sub-task description 1-*st* may be constructed for the compute elements of the first computational cluster 1-*clstr*, and a second sub-task description 2-*st* may be constructed for the second computational cluster 2-*clstr*, where the performing of 1-*st* by 1-*clstr* and of 2-*st* by 2-*clstr*, together realize 1-HL.

In a first possible alternative to the system 990 operative to group heterogeneous computational resources into at least two computational clusters, the system 990 further includes multiple data sets, 1-D1, 2-D1, 3-D1, 4-D1, 5-D1, 6-D1, in which such data sets are distributed, stored, generated, or received in conjunction with at least some of the various compute elements, thereby forming, in conjunction with the specific computational task, a specific data-placement pattern. Also, the identification of computational clusters 1-*clstr*, 2-*clstr*, is further achieved and guided according to this specific data-placement pattern. As one non-limiting example illustrated in FIG. 15B, sets 1-D1, 2-D1, 3-D1, 4-D1, and 5-D1, are located in conjunction with some of the first type compute elements 1-*c*1, 1-*c*2, 1-*c*3, and 1-*c*4, while data set 6-D1 is located in conjunction with the second type compute element 2-*c*4. Consequently, the first cluster 1-*clstr* is identified to include compute elements of the first type 1-*c*1, 1-*c*2, 1-*c*3, and 1-*c*4, but not element 2-*c*4 (which is located with a data set, but which is not of the first type of compute element), and also not compute elements 1-*c*5, 1-*c*6, and 1-*c*7 (which are of the first type of compute element, but which are not located with data set).

In a second possible alternative to the system 990 operative to group heterogeneous computational resources into at least two computational clusters, further the communication sub-system includes at least a first communication network 1-*css* and a second communication network 2-*css*. Further, the certain network topology includes at least some compute elements 1-*c*1, 1-*c*2, 1-*c*3, 1-*c*4 of the first group of compute elements communicatively connected directly to the first communication network 1-*css*, and at least some compute elements 2-*c*1, 2-*c*2, 2-*c*3, 2-*c*4 of the second group of compute elements communicatively connected directly to the second communication network 2-*css*. Further, the system is configured to perform, according to the certain network topology, the identifications by (i) determining that at least some of the compute elements 1-*c*1, 1-*c*2, 1-*c*3, 1-*c*4 of the first group are communicatively connected directly to the first communication network 1-*css*, thereby forming the first computational cluster 1-*clstr*, and (ii) determining that least some of the compute elements 2-*c*1, 2-*c*2, 2-*c*3, 2-*c*4 of the second group are communicatively connected directly to the second communication network 2-*css*, thereby forming the second computational cluster 2-*clstr*. The result is that the system 990 has achieved the identification in accordance with the certain network topology, and has thus minimized, for each of the identified computational clusters 1-*clstr*, 2-*clstr* that have been formed, a latency associated with transporting data among the compute elements within any particular computational cluster.

In a possible configuration of the second possible alternative described above, further the formation of at least one of the computational clusters, for example the second cluster 2-*clstr*, excludes at least one of the compute elements, for example 3-*c*7, from the computational cluster, here 2-*clstr*, because the excluded elements, here 3-*c*7, is of a different type than the type of compute elements in the cluster, here 2-*clstr*, which includes compute elements 2-*c*1, 2-*c*2, 2-*c*3, and 2-*c*4. In this example, as shown in FIG. 15A, the exclusion is performed even though the excluded element, here 3-*c*7, is communicatively connected in a direct manner to the cluster, here 2-*clstr*, by a particular communication network, here 2-*css*. The result is that the computational cluster, here 2-*clstr*, includes only elements 2-*c*1, 2-*c*2, 2-*c*3, and 2-*c*4 of a certain type, here the second type of compute element. Therefore, the sub-task description, in this example 2-*st*, of the computational cluster, here 2-*clst*, can be specifically adapted to the certain type, here the second type, of compute elements, here 2-*c*1, 2-*c*2, 2-*c*3, and 2-*c*4 of the computational cluster, here 2-*clstr*.

In a third possible alternative to the system 990 operative to group heterogeneous computational resources into at least two computational clusters, also the identification of the first computational cluster 1-*clstr* and the second computational clusters 2-*clstr* is further achieved and guided by the high-level description 1-HL, such that the number of compute elements in each of the computational clusters 1-*clstr*, 2-*clstr* is determined so as to effectively perform an expected sub-task description of the high-level description. For example, if effective execution of a sub-task description 1-*st* does not require more than four compute elements of a certain type, then the system 990 will identify a computational cluster 1-*clst* that includes the necessary four compute elements of the certain type, and that communicatively inter-connects these four compute elements.

In a fourth possible alternative to the system 990 operative to group heterogeneous computational resources into at least two computational clusters, further the multiple compute elements of the first type 1-*c*1, 1-*c*2, 1-*c*3, 1-*c*4, 1-*c*5, 1-*c*6, 1-*c*7 are DSPs located remotely from a data center, and the multiple compute elements of the second type 2-*c*1, 2-*c*2, 2-*c*3, 2-*c*4, 2-*c*5, 2-*c*6, 2-*c*7, 2-*c*8 are general purpose processors located in the data center. Further, the high-level description 1-HL is a description of a map-reduce computational task. Further, a first of the sub-task descriptions 1-*st* is constructed for the first computational cluster 1-*clstr*, in which the first sub-task description 1-*st* is the map portion of the map-reduce computational task, and in which each of a map operation of the map portion is allocated to one of the compute elements in the first computational cluster 1-*clstr*. Further, a second of the sub-task descriptions 2-*st* is constructed for the second computational cluster 2-*clstr*, in which the second sub-task description 2-*clst*er is the reduce portion of the map-reduce computational task.

In a possible configuration of the fourth possible alternative described above, further the first sub-task description 1-*st* is a job-graph specifically adapted for later execution by DSPs, and the second sub-task description is another job-graph specifically adapted for later execution by general processors.

In a fifth possible alternative to the system 990 operative to group heterogeneous computational resources into at least two computational clusters, further the multiple compute elements of the first type 1-*c*1, 1-*c*2, 1-*c*3, 1-*c*4, 1-*c*5, 1-*c*6, 1-*c*7 are micro-controllers placed as data gathering-and-processing elements in an internet-of-things (IoT) setup. Further, the multiple compute elements of the second type 2-*c*1, 2-*c*2, 2-*c*3, 2-*c*4, 2-*c*5, 2-*c*6, 2-*c*7, 2-*c*8 are general purpose processors. Further, the high-level description 1-HL is a description of a stream-and-merge algorithm operative to calculate and merge different mathematical models into a single mathematical model. Further, a first of the sub-task descriptions 1-*st* is constructed for the first computational cluster 1-*clstr*, in which the first sub-task description 1-*st* is a mathematical model calculation algorithm to be performed distributively by the micro-controllers 1-*c*1, 1-*c*2, 1-*c*3, 1-*c*4 according to data 1-D1, 2-D1, 3-D1, 4-D1, 5-D1 gathered by the micro-controllers 1-*c*1, 1-*c*2, 1-*c*3, 1-*c*4. Further, a second of the sub-task descriptions 2-*st* is constructed for the second computational cluster 2-*clstr*, in which the second sub-task description 2-*st* is a mathematical model merging algorithm to be performed on the mathematical model calculated by the first computational cluster 1-*clstr*, together with other mathematical model calculated by other computational clusters 2-*clstr*, and possibly additional clusters 3-*clstr*, 4-*clstr*, etc.

In a sixth possible alternative to the system 990 operative to group heterogeneous computational resources into at least two computational clusters, further the system 990 is an internet-of-things ("IoT") setup with several layers, in which a first layer is the multiple compute elements of the first type 1-*c*1, 1-*c*2, 1-*c*3, 1-*c*4, 1-*c*5, 1-*c*6, 1-*c*7 located in at least one edge of the IoT setup. Further, a second layer is multiple compute elements of the third type 3-*c*1, 3-*c*2, 3-*c*3, 3-*c*4, 3-*c*5, 3-*c*6, 3-*c*7 located at an intermediate location of the IoT setup. Further, a third layer is multiple compute elements of the second type 2-*c*1, 2-*c*2, 2-*c*3, 2-*c*4, 2-*c*5, 2-*c*6, 2-*c*7, 2-*c*8 located at a center or head of the IoT setup. Further, the system 990 identifies a third computational cluster 3-*clstr* having some of the compute elements of the third type 3-*c*1, 3-*c*2, 3-*c*3, 3-*c*4, 3-*c*5, 3-*c*6, 3-*c*7, for which a respective third sub-task description is constructed. Further, the system 990 identifies a fourth computational cluster 4-*clstr* including some of the compute elements of the first type 1-*c*1, 1-*c*2, 1-*c*3, 1-*c*4, 1-*c*5, 1-*c*6, 1-*c*7, for which a respective fourth sub-task description is constructed. Further, the high level description 1-HL is a data processing algorithm that is decomposed into four separate algorithms corresponding to, respectively, the four sub-task descriptions, in which data is first processed by the first and fourth computational clusters 1-*clstr*, 4-*clstr*, results are then passed to the third computational cluster 3-*clstr* for additional processing, and results are then passed to the second computational cluster 2-*clstr* for final processing. This is only one possible example of multi-layer processing—in other examples, different clusters are used, or the order of processing by the clusters may be different.

In a seventh possible alternative to the system 990 operative to group heterogeneous computational resources into at least two computational clusters, further the high-level description 1-HL is written in a high-level programming language.

In a possible configuration of the seventh possible alternative described above, at least one of the sub-task descriptions 1-*st*, or 2-*st*, or both 1-*st* and 2-*st*, is a job graph.

In a possible variation of the possible configuration described above, the system 990 further includes multiple job graphs, and each such job graph is compiled into an execution graph.

Figure 16:
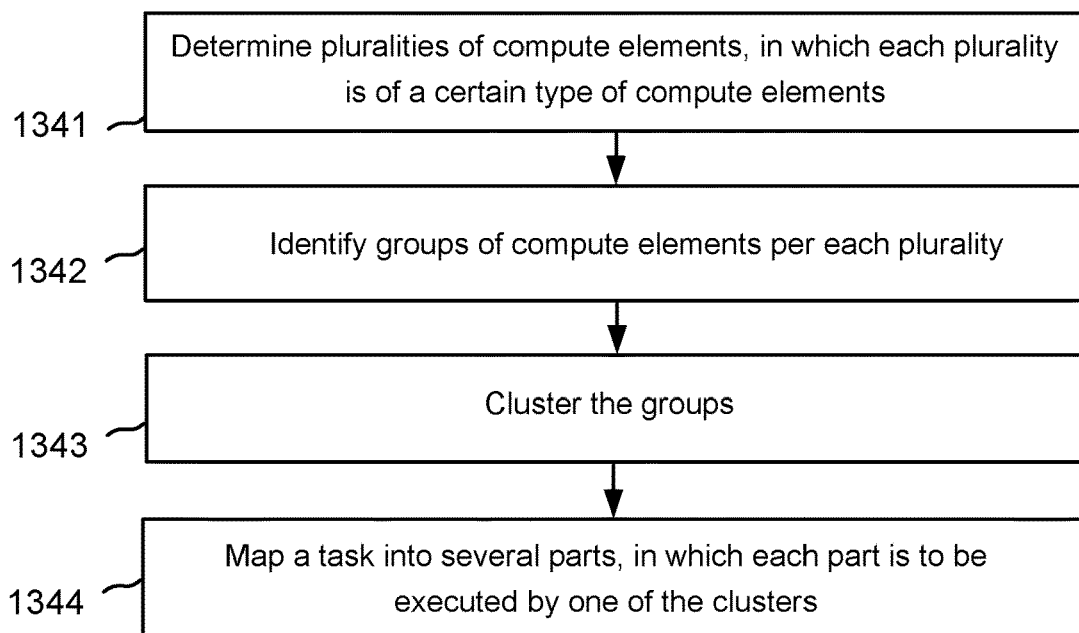
FIG. 16 illustrates one embodiment of a method for grouping heterogeneous compute elements into two or more computational clusters.

FIG. 16 illustrates one embodiment of a method for grouping heterogeneous computational resources into multiple computational clusters. In step 1341, a system 990 determines, out of multiple compute elements 1-*c*1, 1-*c*2, 1-*c*3, 1-*c*4, 1-*c*5, 1-*c*6, 1-*c*7, 2-*c*1, 2-*c*2, 2-*c*3, 2-*c*4, 2-*c*5, 2-*c*6, 2-*c*7, 2-*c*8 that are interconnected by at least one communication network 1-*css*, 2-*css*, 3-*css*, 4-*css*, at least multiple compute elements 1-*c*1, 1-*c*2, 1-*c*3, 1-*c*4, 1-*c*5, 1-*c*6, 1-*c*7 of a first type and at least multiple compute elements 2-*c*1, 2-*c*2, 2-*c*3, 2-*c*4, 2-*c*5, 2-*c*6, 2-*c*7, 2-*c*8 of a second type.

In step 1342, the system 990 identifies, for each type including the multiple compute elements previously determined, at least one group of compute elements that supports, or is expected to support, at least a certain level or quality of data exchange among the compute elements of the group. For example, the system 990 might identify elements 1-*c*1, 1-*c*2, 1-*c*3, and 1-*c*4 out the multiple elements 1-*c*1, 1-*c*2, 1-*c*3, 1-*c*4, 1-*c*5, 1-*c*6, 1-*c*7 of the first type previously determined, and might identify elements 2-*c*1, 2-*c*2, 2-*c*3, and 2-*c*4 out of the multiple elements 2-*c*1, 2-*c*2, 2-*c*3, 2-*c*4, 2-*c*5, 2-*c*6, 2-*c*7, 2-*c*8 of the second type previously determined.

In step 1343, the system 990 clusters each of the identified groups into a computational cluster, such that at least a first computational cluster 1-*clstr* is formed using at least some compute elements 1-*c*1, 1-*c*2, 1-*c*3, 1-*c*4 of the first type, and at least a second computational cluster 2-*clstr* is formed using at least some compute elements 2-*c*1, 2-*c*2, 2-*c*3, 2-*c*4 of the second type.

In step 1344, the system 990 maps a specific computational task 1-HL to be executed in multiple parts 1-*st*, 2-*st*, in which each of the multiple parts 1-*st*, 2-*st* is executed by one of the computational clusters 1-*clstr*, 2-*clstr* respectively, and in which such execution is done in conjunction with data exchange among the compute elements of the computational cluster (here, 1-*c*1, 1-*c*2, 1-*c*3, and 1-*c*4 in the first cluster 1-*clstr*, and 2-*c*1, 2-*c*2, 2-*c*3 and 2-*c*4 in the second cluster 2-*clstr*) using an execution method which is specifically adapted to the type of compute elements of the particular computational cluster (that is to say, one execution method will be adapted specifically to elements of the first type in the first cluster 1-*clstr*, and a different execution method will be adapted specifically to elements of the second type in the second cluster 2-*clstr*).

In one embodiment of the method for grouping heterogeneous computational resources into multiple computational clusters, said certain level or quality of data exchange is selected from a group comprising: (i) latency, in which certain quality of data exchange is a latency associated with the data exchange, and the latency is lower than a certain level, (ii) data throughput, in which the certain level of data exchange is a data throughput associated with the data exchange, and the data throughput is greater than a certain level, and (iii) jitter, in which the certain quality of data exchange is a jitter associated with the data exchange, and the jitter is lower than a certain level.

FIG. 16 also illustrates one embodiment of a different method for grouping heterogeneous computational resources into multiple computational clusters, in which the criteria for identification are different from the criteria used in the prior method. In this embodiment of the different method, in step 1341, similar to the corresponding step in the prior method, a system 990 determines, out of multiple compute elements 1-*c*1, 1-*c*2, 1-*c*3, 1-*c*4, 1-*c*5, 1-*c*6, 1-*c*7, 2-*c*1, 2-*c*2, 2-*c*3, 2-*c*4, 2-*c*5, 2-*c*6, 2-*c*7, 2-*c*8 that are interconnected by at least one communication network 1-*css*, 2-*css*, 3-*css*, 4-*css*, at least multiple compute elements 1-*c*1, 1-*c*2, 1-*c*3, 1-*c*4, 1-*c*5, 1-*c*6, 1-*c*7 of a first type and at least multiple compute elements 2-*c*1, 2-*c*2, 2-*c*3, 2-*c*4, 2-*c*5, 2-*c*6, 2-*c*7, 2-*c*8 of a second type.

In this embodiment of the different method, in step 1342, unlike the corresponding step in the prior method, the system 990 identifies, for each type including the multiple compute elements previously determined, at least one group of compute elements that is associated with a certain data placement pattern. For example, out of the group of compute elements 1-*c*1, 1-*c*2, 1-*c*3, 1-*c*4, 1-*c*5, 1-*c*6, 1-*c*7 that the system 990 has determined to include the first type of element, the system 990 determines that compute elements 1-*c*1, 1-*c*2, 1-*c*3, and 1-*c*4 possess some or all of the data sets 1-D1, 2-D1, 3-D1, 4-D1, 5-D1, and 6-D1.

In this embodiment of the different method, in step 1343, similar to the corresponding step in the prior method, the system 990 clusters each of the identified groups into a computational cluster, such that at least a first computational cluster 1-*clstr* is formed using at least some compute elements 1-*c*1, 1-*c*2, 1-*c*3, 1-*c*4 of the first type, and at least a second computational cluster 2-*clstr* is formed using at least some compute elements 2-*c*1, 2-*c*2, 2-*c*3, 2-*c*4 of the second type.

In this embodiment of the different method, in step 1344, similar to the corresponding step in the prior method, the system 990 maps a specific computational task 1-HL to be executed in multiple parts 1-*st*, 2-*st*, in which each of the multiple parts 1-*st*, 2-*st* is executed by one of the computational clusters 1-*clstr*, 2-*clstr* respectively, and in which such execution is done in conjunction with data exchange among the compute elements of the computational cluster (here, 1-*c*1, 1-*c*2, 1-*c*3, and 1-*c*4 in the first cluster 1-*clstr*, and 2-*c*1, 2-*c*2, 2-*c*3 and 2-*c*4 in the second cluster 2-*clstr*) using an execution method which is specifically adapted to the type of compute elements of the particular computational cluster (that is to say, one execution method will be adapted specifically to elements of the first type in the first cluster 1-*clstr*, and a different execution method will be adapted specifically to elements of the second type in the second cluster 2-*clstr*).

Described herein are systems and methods to adapt a data stream into a data structure particularly suited for executing certain mathematical functions.

Figure 17:
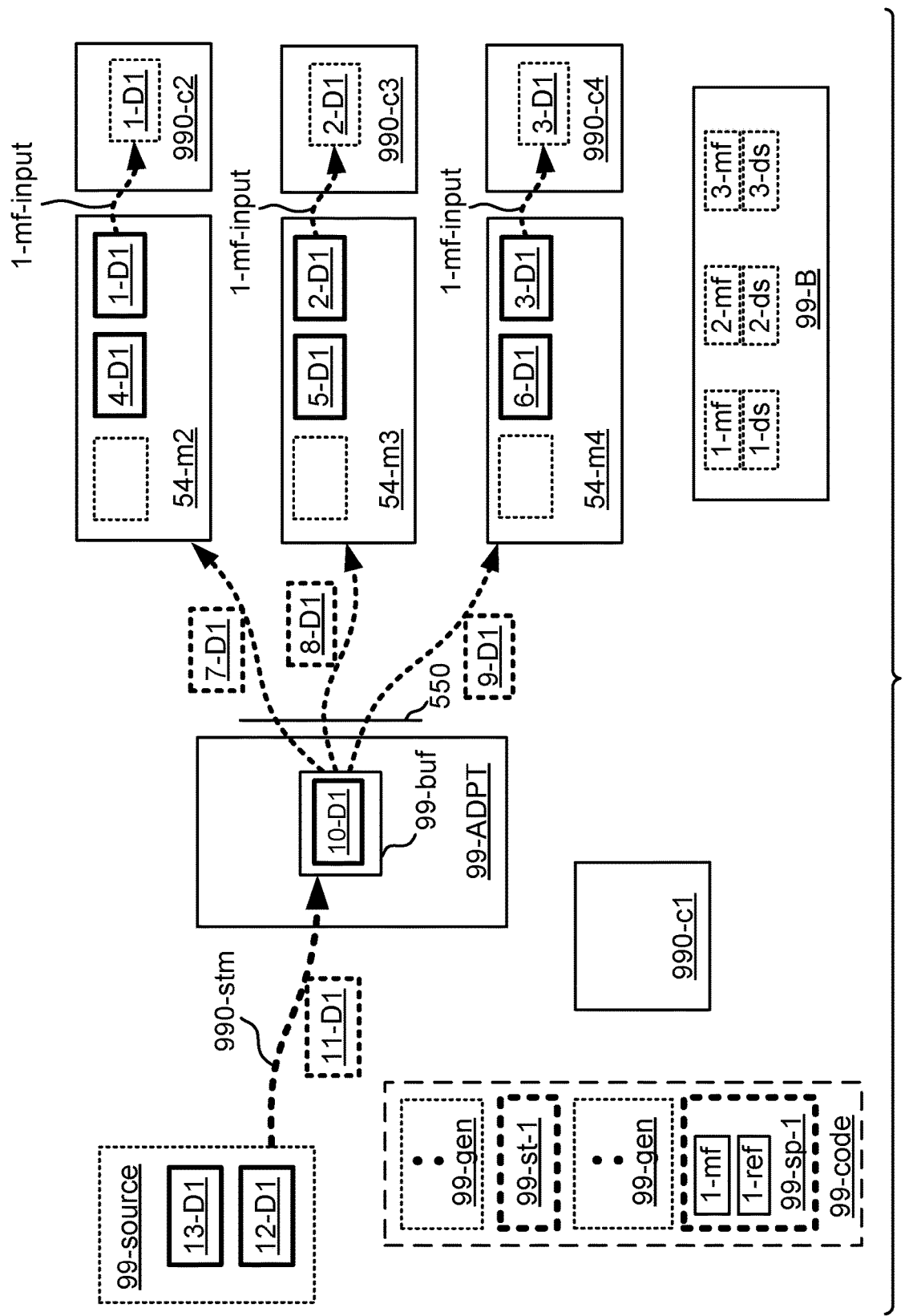
FIG. 17 illustrates one embodiment of a system for adapting a stream of data sets into a particular data structure selected specifically in view of a certain mathematical function.

FIG. 17 illustrates one embodiment of a system 99-*cp* operative to adapt a first stream of data sets into data arranged in a particular data structure that has been selected specifically in view of a certain mathematical function to be executed. The system 99-*cp* includes a first code sequence 99-*code* that itself includes one or more general commands 99-*gen*, and one or more specific commands 99-*sp*-1, in which each specific command 99-*sp*-1 is calling for execution of a certain mathematical function 1-*mf* in conjunction with at least a first stream 990-*stm* of data sets 1-D1 to 13-D1, in which the first stream of data sets is explicitly referenced 1-*ref* by the specific command 99-*sp*-1. The function 1-*ref* to be executed is not limited, but includes rather all of the mathematical functions that may be executed by a computer system, including, for example, addition, subtraction, multiplication, division, and matrix multiplication. In some embodiments, the first code sequence 99-*code* may include also a streaming command 99-*st*-1 operative to instruct the computing platform 99-*cp* to initiate reception of a first stream 990-*stm* of data sets 1-D1 to 13-D1. The data stream 990-*stm* includes data from a data source 99-*source*, which may be included with the system 99-*cp* or which may be located outside the system 99-*cp*.

The first code sequence 99-*code* is executed by a compute element 990-*c*1 within the system 99-*cp*. Such compute element 990-*c*1 may be a general purpose processor, a specialized processor, a compiler, or some other kind of structure capable of performing or facilitating the functions required by the system 99-*cp*. When this compute element 990-*c*1 encounters the streaming command 990-*st*-1, it initiates the data stream 990-*stm*. The data 1-D1 to 13-D1 is streamed to an adapter 99-ADPT, which may be a logical element within the system 99-*cp*, or it may be any processor or other compute element within the system 99-*cp*, and which may include a buffer 99-*buf* used to hold data received by the adapter 99-ADPT prior to the distribution of data to various memories 54-*m*2, 54-*m*3, 54-*m*4 within the system 99-*cp*. After the buffering process within the adapter 99-ADPT, specific data sets may be transported via a switching network 550, or by other means, to the various memories 54-*m*2, 54-*m*3, 54-*m*4. In the particular embodiment illustrated in FIG. 17, data sets 1-D1 and 4-D1 have been allocated to memory 54-*m*2 while data set 7-D1 is being sent to said memory, data sets 5-D1 and 2-D1 have been allocated to memory 54-*m*3 while data set 8-D1 is being send to said memory, and data sets 6-D1 and 3-D1 have been allocated to memory 54-*m*4 while data set 9-D1 is being sent to said memory. Further, data set 10-D1 is in the buffer 99-*buf*, data set 11-D1 is being streamed from the data source 99-*source* to the adapter 99-ADPT, and data sets 12-D1 and 13-D1 are still within the data source 99-*source*, but may be later streamed 990-*stm* to the adapter 99-ADPT where they may be buffered in the buffer 99-*buf* and later transported 550 to the various memories 54-*m*2, 54-*m*3, 54-*m*4. Clearly the number of data sets in FIG. 17, and their current positions at the point of time illustrated in FIG. 17, are illustrative only. There may be more or fewer data sets in the system 99-*cp* and their locations may vary from those shown in FIG. 17. Further, although only one adapter 99-ADPT is shown in FIG. 17, there may actually be two or more such adapters, any of which may be located either inside or outside the system 99-*cp*. Similarly, only one buffer 99-*buf* is shown, but there may be any number of buffers 99-*buf*, all or some of which may be located within the system 99-*cp* or all of part of which may be located outside the system 99-*cp*.

The entire configuration of data sets within the various memories, 1-D1 and 4-D1 in 54-*m*2, 2-D1 and 5-D1 in 54-*m*3, and 3-D1 and 6-D1 in 54-*m*4, is a kind of data structure that has been created automatically by the system 99-*cp* specifically for the purpose of easily and efficiently executing the specific command 99-*sp*-1, which means execution of mathematical function 1-*mf* on the referenced 1-*ref* data sets 1-D1 to 13-D1. The system knows into which specific data structure to adapt the stream of data sets 990-*stm* by examining the specific command 99-*sp*-1 and examining function 1-*mf* within this specific command, in which such examination may be done prior to initiating of the stream 990-*stm* and actual execution of both the specific command 99-*sp*-1 and the streaming command 99-*st*-1 (and in that case the selected data structure is already known to the system at the time of executing the stream initiation command 99-*st*-1), or in which said examination may be done after initiating of the stream 990-*stm*, possibly at the time of actually executing the specific command 99-*sp*-1. The execution of the function 1-*mf* is performed by compute elements 990-*c*2, 990-*c*3, 990-*c*4 within the system 99-*cp*. FIG. 17 shows three such compute elements 990-*c*2, 990-*c*3, 990-*c*4, but there may be any plurality of such compute elements. FIG. 17 shows all three compute elements performing some part of the mathematical function 1-*mf*. In FIG. 17, data set 1-D1 has been inputted 1-*mf-input* to compute element 990-*c*2 for execution, data set 2-D1 has been inputted 1-*mf-input* to compute element 990-*c*3 for execution, and data set 3-D1 has been inputted 1-*mf-input* to compute element 990-*c*3 for execution. Although each compute element is shown as having received a single data set, clearly two or more data sets maybe located and processed within a compute element, as, for example, 1-D1 and 1-D4 in 990-*c*2, 2-D1 and 5-D1 in 990-*c*3, and 3-D1 and 6-D1. Similarly, even though a data set may be stored in a particular memory, a compute element may not need that data set to perform its computational task required to execute the mathematical function 1-*mf*.

In some embodiments, there is a database or data bank 99-B of mathematical functions 1-*mf*, 2-*mf*, 3-*mf*, each of which is associated with a particular data structure with which such function may be easily and efficiently executed, data structure 1-*ds* with function 1-*mf*, data structure 2-*d*2 with function 2-*mf*, and data structure 3-*d*2 with function 3-*mf*. When the system 99-*cp* comes upon a certain mathematical function, for example 1-*mf*, that is to be executed against a particular data stream, for example 990-*stm*, the system 99-*cp* may compare that function, here 1-*mf*, against all of the mathematical functions in the data bank 99-B. When an exact match of functions is found, here 1-*mf* in first code sequence is found to be 1-*mf* in data bank 99-B, the system then identifies the particular data structure, here 1-*ds*, associated with the mathematical function, here 1-*mf*, that may be selected and implemented by the system 99-*cp* in order to easily and efficiently execute the mathematical function, here 1-*mf*.

In alternative embodiments, there does not need to be an exact match between the certain mathematical function found in first source code 99-*code* and a particular mathematical function appearing in the data bank 99-B in order to identify and apply a particular data structure listed in the data bank 99-B. In one instance, the data bank may include mathematical functions that are similar to, but not the same as, the function in first code 99-*code*.

The combinations of mathematical functions and data structures, stored in data bank 99-B, may be provisioned in advance, prior to operation of the system 99-*cp*. Alternatively, a system 99-*cp* may be operational, and a data bank 99-B may be added later. Further, in a functional system 99-*cp* with a data bank 99-B, the data bank 99-B may be updated in any number of ways. One possibility is that the system 99-*cp* learns from the experience of creating data structures, and adds to the data bank 99-B combinations of mathematical functions and data structures based on such experience. In addition to, or in place of, the addition of mathematical function-data structure combinations from internal learning, such combinations may be changed or updated or added from experience that is external to the system. If, for example, new equations are created for the implementation of new algorithms, these may be added to the data bank 99-B as new mathematical functions, and corresponding data structures will be added also. It is anticipated, for example, that new algorithms and implementations may be created to implement in the Internet of Things (IoT). Whether the new learning, and the new combinations added to the data bank 99-B of functions and data structures, comes from internal experience, or from external experience, or from both, the new combinations may be added by human operation, or by automated machine operation, or both.

The data bank 99-B may be located within the system 99-B. Alternatively, it may be located outside the system, but accessed as needed. The data bank 99-B illustrated in FIG. 17 has exactly three combinations of mathematical function and data structure. In fact, there must be at least two such combinations in the data bank 99-B, but there may also be any number of combinations greater than two. The data bank 99-B illustrated in FIG. 17 has an exact 1:1 match between mathematical functions and data structures, that is, for each mathematical function, there is only one data structure, and that data structure is stored only for that particular mathematical function. The 1:1 match is only one possible implementation. In alternative embodiments, multiple mathematical functions may share the same data structure. In other alternative embodiments, a single function may have multiple possible data structure depending on other criteria, including criteria, such as for example, total memory capacity of the system, total computing capacity of the system, volume of data to be processed in the data stream, etc.

One embodiment is a system 99-*cp* operative to adapt a first stream 990-*stm* of data sets 1-D1 to 13-D1 in a particular data structure selected specifically in view of a certain mathematical function 1-*mf*, in which the data structure is the particular placement of the data sets 1-D1 to 13-D1 in certain memories 54-*m*2, 54-*m*3, 54-*m*3 from which compute elements 990-*c*2, 990-*c*3, 990-*c*4 receive data inputs, 1-*mf-input*, to execute the mathematical function 1-*mf*. In one particular implementation of such embodiment, the system includes a computing platform 99-*cp* which includes multiple compute elements 990-*c*1, 990-*c*2, 990-*c*3, 990-*c*4, multiple memories 54-*m*2, 54-*m*3, 54-*m*4, and a first code sequence 99-*code*. The first code sequence 99-*code* includes general commands 99-*gen*, and also a specific command 99-*sp*-1 that calls for execution of a certain mathematical function 1-*mf* in conjunction with at least a first stream 990-*stm* of data sets 1-D1 to 13-D1, in which the first stream 990-*stm* of data sets 1-D1 to 13-D1 is explicitly referenced 1-*ref* by the specific command 99-*sp*-1. Further, the system 99-*cp* is configured to detect in the first code sequence 99-*code*, by one of the compute elements 990-*c*1, the specific command 99-*sp*-1 in conjunction with the certain mathematical function 1-*mf* and in conjunction with the explicit reference 1-*ref* to the first stream 990-*stm* of data sets 1-D1 to 13-D1. Further, the system 99-*cp* is configured to adapt by an adapter 99-ADPT, as a result of said detection, the first stream 990-*stm* of data sets 1-D1 to 13-D1 into data arranged in a particular data structure. As one non-limiting example of a possible data structure, 1-D1 and 4-D1 may be arranged in a certain format in one place such as 54-*m*1, 2-D1 and 5-D1 may be arranged in the certain format in another place such as 54-*m*2, and 3-D1 and 6-D1 may be arranged in the certain format in yet another place such as 54-*m*3. The particular data structure is selected specifically in view of the certain mathematical function 1-*mf*, and the stream is adapted on-the-fly as the data sets D1 to 13-D1 are received and in conjunction with the memories 54-*m*2, 54-*m*3, 54-*m*4 belonging to the computing platform 99-*cp*, thereby forming, in the memories 54-*m*2, 54-*m*3, 54-*m*4, the data sets D1 to 13-D1 arranged in the particular data structure and operative to act as an input 1-*mf-input* for execution of the certain mathematical function 1-*mf*. Further, the system 99-*cp* is configured to execute, in the computing platform 99-*cp* (that is to say, in the various compute elements 990-*c*2, 990-*c*3, 990-*c*4), the specific command 99-*sp*-1, thereby executing the certain mathematical function 1-*mf* and calculating the results, using as an input 1-*mf-input* from the memories 54-*m*2, 54-*m*3, 54-*m*4 the data D1 to 13-D1 arranged in the particular data structure.

In a first possible alternative embodiment to the system 99-*cp* operative to adapt a first stream 990-*stm* of data sets 1-D1 to 13-D1 in a particular data structure selected specifically in view of a certain mathematical function 1-*mf*, the system 99-*cp* is further configured to execute, in one of the compute elements 990-*c*1, the first code sequence 99-*code* that includes the general commands 99-*gen*, until such compute element 990-*c*1 encounters, in the first code sequence 99-*code*, the specific command 99-*sp*-1, in which the detection of the specific command 99-*sp*-1 occurs in conjunction with the encounter and during the execution of the first code sequence 99-*code*.

In a second possible alternative embodiment to the system 99-*cp* operative to adapt a first stream 990-*stm* of data sets 1-D1 to 13-D1 in a particular data structure selected specifically in view of a certain mathematical function 1-*mf*, the system 99-*cp* is further configured to analyze, in one of the compute elements 990-*c*1, the first code sequence 99-*code* that is scheduled for execution in the computing platform 99-*cp*, thereby concluding that the specific command 99-*sp*-1 in the first code sequence 99-*code* will be executed at some point in the future, in conjunction with the certain mathematical function 1-*mf* and in conjunction with the first stream 990-*stm* of data sets 1-D1 to 13-D1, in which the detection occurs in conjunction with the conclusion and prior to actual execution by various compute elements 990-*c*2, 990-*c*3, 990-*c*4 of the specific command 99-*sp*-1.

In a first possible configuration of the first possible alternative embodiment just described, further the detection of the specific command 99-*sp*-1 within the first code sequence 99-*code* occurs prior to, rather than during, the actual execution of the first code sequence 99-*code*.

In a second possible configuration of the first possible alternative embodiment described above, further the first code sequence 99-*code* includes also a streaming command 99-*st*-1, in which the streaming command 99-*st*-1 is operative to instruct the computing platform 99-*cp* to initiate reception the first stream 990-*stm* of data sets 1-D1 to 13-D1. The system is further configured to execute the streaming command 99-*st*-1 after the detection of the specific command 99-*sp*-1 but prior to execution of the specific command 99-*sp*-1, thereby initiating the first steam 990-*stm* of data sets 1-D1 to 13-D1 prior to the execution of the specific command 99-*sp*-1, thereby facilitating the adaptation by the adapter 99-ADPT prior to execution of the specific command 99-*sp*-1, and thereby facilitating the formation, in the memories 54-*m*2, 54-*m*3, 54-*m*4, of the data D1 to 13-D1 arranged in the particular data structure, prior to execution of the specific command 99-*s*-1. In this way, by the time of the execution of the specific command **99-*sp*-1, the data within data sets 1-D1 to 13-D1 is already arranged in the particular data structure and is ready to serve as an input 1-*mf-input* to execution of the certain mathematical function 1-*mf* in conjunction with execution of the specific command 99-*sp*-1**.

In a third possible alternative embodiment to the system **99-*cp* operative to adapt a first stream 990-*stm* of data sets 1-D1 to 13-D1 in a particular data structure selected specifically in view of a certain mathematical function 1-*mf*, further the first stream 990-*stm* of data sets 1-D1 to 13-D1 is received as a plurality of data streams, in which adaptation by the adapter 99-ADPT includes combining the plurality of data streams into the data sets D1 to 13-D1** arranged in the particular data structure.

In a fourth possible alternative embodiment to the system **99-*cp* operative to adapt a first stream 990-*stm* of data sets 1-D1 to 13-D1 in a particular data structure selected specifically in view of a certain mathematical function 1-*mf*, further the specific command 99-*sp*-1 includes a specific reference to a time window associated with the first stream 990-*stm* of data sets 1-D1 to 13-D1, and this time window is used to determine which part of the data within the data sets D1 to 13-D1 arranged in the particular data structure is to be used as an input 1-*mf-input* to execution of the certain mathematical function 1-*mf* by the compute elements 990-*c*2, 990-*c*3, 990-*c*4**.

In a fifth possible alternative embodiment to the system **99-*cp* operative to adapt a first stream 990-*stm* of data sets 1-D1 to 13-D1 in a particular data structure selected specifically in view of a certain mathematical function 1-*mf*, further the first code sequence 99-*code* does not contain any explicit command operative to perform the adaptation within the adapter 99-ADPT, in which the adaptation is done automatically by the computing platform 99-*cp* either at compilation time or during run time, thereby facilitating simple programming in conjunction with the first code sequence 99-*code*, and in which a programmer need not be aware of the particular data structure actually used by the system 99-*cp***.

Figure 18A:
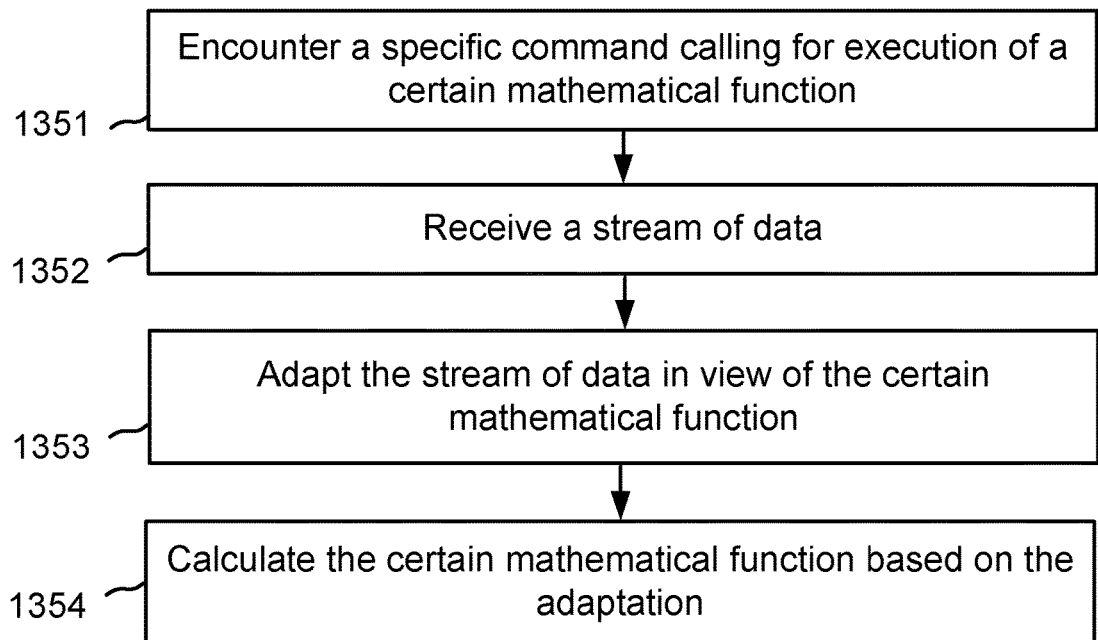
FIG. 18A illustrates one embodiment of a method for performing mathematical functions in conjunction with streams of data sets.

FIG. 18A illustrates one embodiment of a method for performing mathematical functions in conjunction with streams of data sets. In step 1351, a first compute element **990-*c*1 belonging to a computing platform 99-*cp*, executes a first code sequence 99-*code* that includes general commands 99-*gen*, until the first compute element 990-*c*1 encounters, in the first code sequence 99-*code*, a specific command 99-*sp*-1 that calls for execution of a certain mathematical function 1-*mf* in conjunction with at least a first stream 990-*stm* of data sets 1-D1 to 13-D1, and in which the first stream 990-*stm* of data sets 1-D1 to 13-D1 is explicitly referenced 1-*ref* by the specific command 99-*sp*-1. In step 1352, the computing platform 99-*cp* receives the first stream 990-*stm* of data sets 1-D1 to 13-D1, in which at least some of the data sets (for example, 1-D1 and 4-D1) are received before others of the data sets (for example, 13-D1). In step 1353, as a result of such encounter, an adapter 99-ADPT adapts the first stream 990-*stm* of data in the data sets 1-D1 to 13-D1 into a particular data structure (for example, 1-D1 and 4-D1 arranged in a certain format in one place 54-*m*1, 2-D1 and 5-D1 arranged in the certain format in another place 54-*m*2, and 3-D1 and 6-D1 arranged in the certain format in yet another place 54-*m*3). This data structure is selected specifically in view of the certain mathematical function 1-*mf*, and the stream 990-*stm* is adapted on-the-fly as the data sets 1-D1 to 13-D1 are received and in conjunction with memories 54-*m*2, 54-*m*3, 54-*m*4 belonging to the computing platform 99-*cp*, thereby forming, in the memories 54-*m*2, 54-*m*3, 54-*m*4, the data 1-D1 to 13-D1 arranged in the particular data structure and operative to act as an input 1-*mf-input* for execution of the certain mathematical function 1-*mf*. In step 1354, the computing platform 99-*cp* (perhaps, for example, compute elements 990-*c*2, 990-*c*3, 990-*c*4), executes the certain mathematical function 1-*mf*, after said forming of the data structure is done and calculates the results, using as an input 1-*mf-input* from the memories 54-*m*2, 54-*m*3, 54-*m*4 the data 1-D1 to 13-D1** arranged in the particular data structure.

In a first alternative embodiment to the method for performing mathematical functions in conjunction with the streams of data sets, further the certain mathematical function **1-*mf* is a matrix multiplication of a first matrix and a second matrix. Further, the particular data structure is a data structure associated with the first matrix (for example, 1-D1 and 4-D1 may be one vector in the matrix). Further, the data arranged in the particular data structure is associated with numerical values in the first matrix (for example, 1-D1 is one particular scalar value in vector 1-D1, 4-D1), in which the numerical values are associated with the data sets of the first stream 990-*stm***.

In one possible configuration of the first alternative embodiment just described, further the first matrix is a first vector.

In a second alternative embodiment to the method for performing mathematical functions in conjunction with the streams of data sets, further the certain mathematical function **1-*mf* is a mathematical function that is distributively computed by a plurality of compute elements 990-*c*2, 990-*c*3, 990-*c*4 belonging to the computing platform 99-*cp* as part of the calculating in step 1354. Further, the memories 54-*m*2, 54-*m*3, 54-*m*4 constitute a distributed memory associated with the plurality of compute elements 990-*c*2, 990-*c*3, 990-*c*4. Further, the particular data structure is a data structure adapted for storing the data 1-D1 to 13-D1** over the distributed memory.

In one possible configuration of the second alternative embodiment just described, further the adapting of the first data stream **990-*stm* in step 1353 includes distributing the data sets 1-D1 to 13-D1 from the first stream 990-*stm* into the distributed memory created by the memories 54-*m*2, 54-*m*3, 54-*m*4**.

In a third alternative embodiment to the method for performing mathematical functions in conjunction with the streams of data sets, further the memories **54-*m*2, 54-*m*3, 54-*m*4 constitute a distributed memory associated with the plurality of compute elements 990-*c*2, 990-*c*3, 990-*c*4. Further, the particular data structure is selected to be a data structure adapted for storing the data from the data sets 1-D1 to 13-D1 over the distributed memory, provided that the data arranged in the particular data structure, and used as an input, is above a certain threshold size. For example, a particular data structure might be selected and used only if there are at least 1,000 data entries from the data sets 1-D1 to 13-D1**.

Figure 18B:
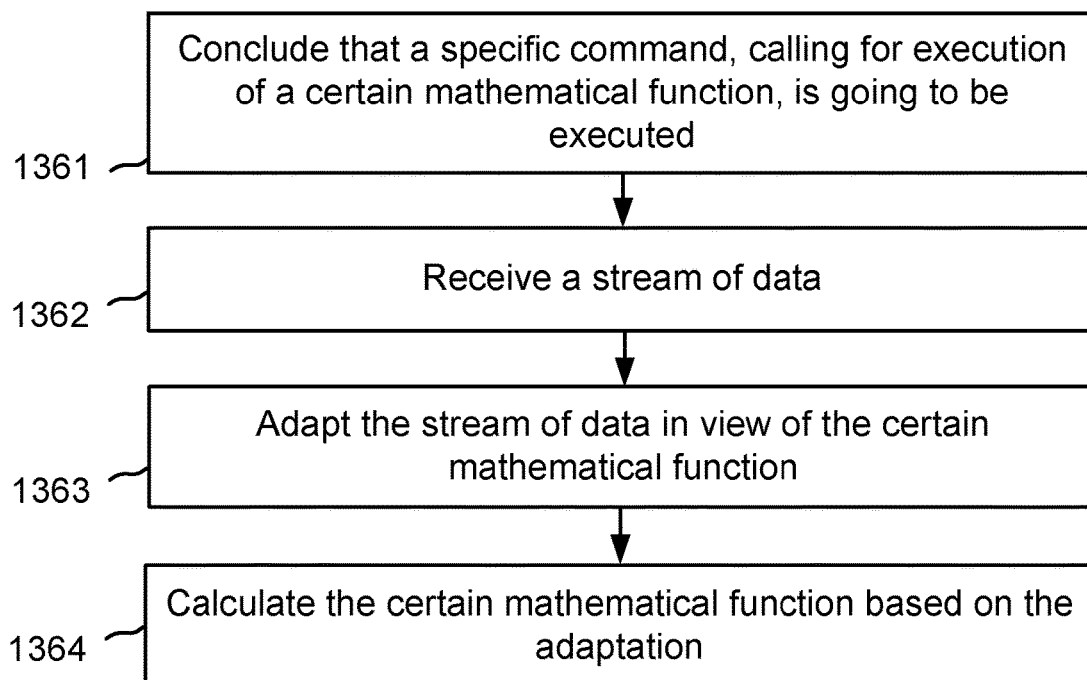
FIG. 18B illustrates one embodiment of a method for performing mathematical functions in conjunction with streams of data sets.

FIG. 18B illustrates one embodiment of a method for performing mathematical functions in conjunction with streams of data sets. In step 1361, a first compute element **990-*c*1 belonging to a computing platform 99-*cp*, analyzes a first code sequence 99-*code* that is scheduled for execution in the computing platform 99-*cp*, in which the first code sequence 99-*code* includes general commands 99-*gen* and a specific command 99-*sp*-1 that calls for execution of a certain mathematical function 1-*mf* in conjunction with at least a first stream 990-*stm* of data sets 1-D1 to 13-D1**, in which the first stream 990-*stm* of data sets 1-D1 to 13-D1 is explicitly referenced 1-*ref* by the specific command 99-*sp*-1, thereby concluding that the specific command 99-*sp*-1 will to be executed at some point in the future in conjunction with the first stream 990-*stm* of data sets 1-D1 to 13-D1. In step 1362, the computing platform 99-*cp* receives the first stream 990-*stm* of data sets 1-D1 to 13-D1, in which at least some of the data sets (for example, 1-D1 and 4-D1) are received before others of the data sets (for example, 13-D1). In step 1363, as a result of such encounter, an adapter 99-ADPT adapts the first stream 990-*stm* of data sets 1-D1 to 13-D1 into a particular data structure (for example, 1-D1 and 4-D1 arranged in a certain format in one place 54-*m*1, 2-D1 and 5-D1 arranged in the certain format in another place 54-*m*2, and 3-D1 and 6-D1 arranged in the certain format in yet another place 54-*m*3). This data structure is selected specifically in view of the certain mathematical function 1-*mf*, and the adaptation is done on-the-fly as the data sets 1-D1 to 13-D1 are received and in conjunction with memories 54-*m*2, 54-*m*3, 54-*m*4 belonging to the computing platform 99-*cp*, thereby forming, in the memories 54-*m*2, 54-*m*3, 54-*m*4, the data 1-D1 to 13-D1 arranged in the particular data structure and operative to act as an input 1-*mf-input* for execution of the certain mathematical function 1-*mf*. In step 1364, the computing platform 99-*cp* (perhaps, for example, compute elements 990-*c*2, 990-*c*3, 990-*c*4), executes the certain mathematical function 1-*mf*, after said forming of the data structure is done, and calculates the results, using as an input 1-*mf-input* from the memories 54-*m*2, 54-*m*3, 54-*m*4 the data 1-D1 to 13-D1 arranged in the particular data structure.

In a first possible alternative embodiment to the method for performing mathematical functions in conjunction with streams of data sets just described, further the specific selection of the particular data structure in view of the certain mathematical function 1-*mf* includes comparing the certain mathematical function 1-*mf* to a bank 99-B of multiple mathematical functions 1-*mf*, 2-*mf*, 3-*mf* associated with, respectively, multiple data structures 1-*ds*, 2-*ds*, 3-*ds*. Further, the computing platform 99-*cp* finds a closest match between the certain mathematical function 1-*mf* and one of the mathematical functions in the bank 99-B. Further, the computing platform 99-*cp* identifies, as the specific data structure to be selected and executed, the data structure 1-*ds* (or possibly a description of a data structure rather than the data structure itself), associated with the one of the mathematical functions found 1-*mf*.

In a second possible alternative embodiment to the method for performing mathematical functions in conjunction with streams of data sets described above, further the certain mathematical function 1-*mf* may be any of the following functions: (i) a linear algebra operator, in which case the specific data structure is selected to be a matrix or a vector, (ii) a filter, in which case the specific data structure is selected to be a sequence of numerals, (iii) a map operator, in which case specific data structure is selected to be a distributed data structure, (iv) a linear algebra operator to be distributively executed, in which case the specific data structure is selected to be a matrix or a vector that is distributed over the memory that is a distributed memory, (v) a reduce operator, and (v) a sorting function.

In a third possible alternative embodiment to the method for performing mathematical functions in conjunction with streams of data sets described above, further the certain mathematical function 1-*mf* appears explicitly in the specific command 99-*sp*-1 as a mathematical operator, and the stream 990-*stm* of data sets 1-D1 to 13-D1 is explicitly referenced 1-*ref* by the specific command 99-*sp*-1 as one of the operands in conjunction with the mathematical operator.

In a first possible configuration of the third possible alternative embodiment just described, further the mathematical operator may be one of the following: (i) a plus operator "+", (ii) a minus operator "−", (iii) a dot product operator "·", (iv) a matrix multiplication operator "*" or "×", (v) a matrix inversion operator "−1", and (vi) a matrix transpose operator "t" or "T".

In a fourth possible alternative embodiment to the method for performing mathematical functions in conjunction with streams of data sets described above, further the certain mathematical function 1-*mf* appears implicitly in the specific command 99-*sp*-1, in which the specific command 99-*sp*-1 is a call to a computer function or a subroutine, in which the particular name of the computer function or subroutine is used to determine the certain mathematical function, and in which the explicit reference 1-*ref* to the first stream 990-*stm* of data sets 1-D1 to 13-D1 is achieved by including the explicit reference 1-*ref* to the first stream 990-*stm* of data sets 1-D1 to 13-D1 as an argument to the computer function or subroutine.

Described herein are systems and methods to execute efficiently a plurality of machine learning processes.

Figure 19A:
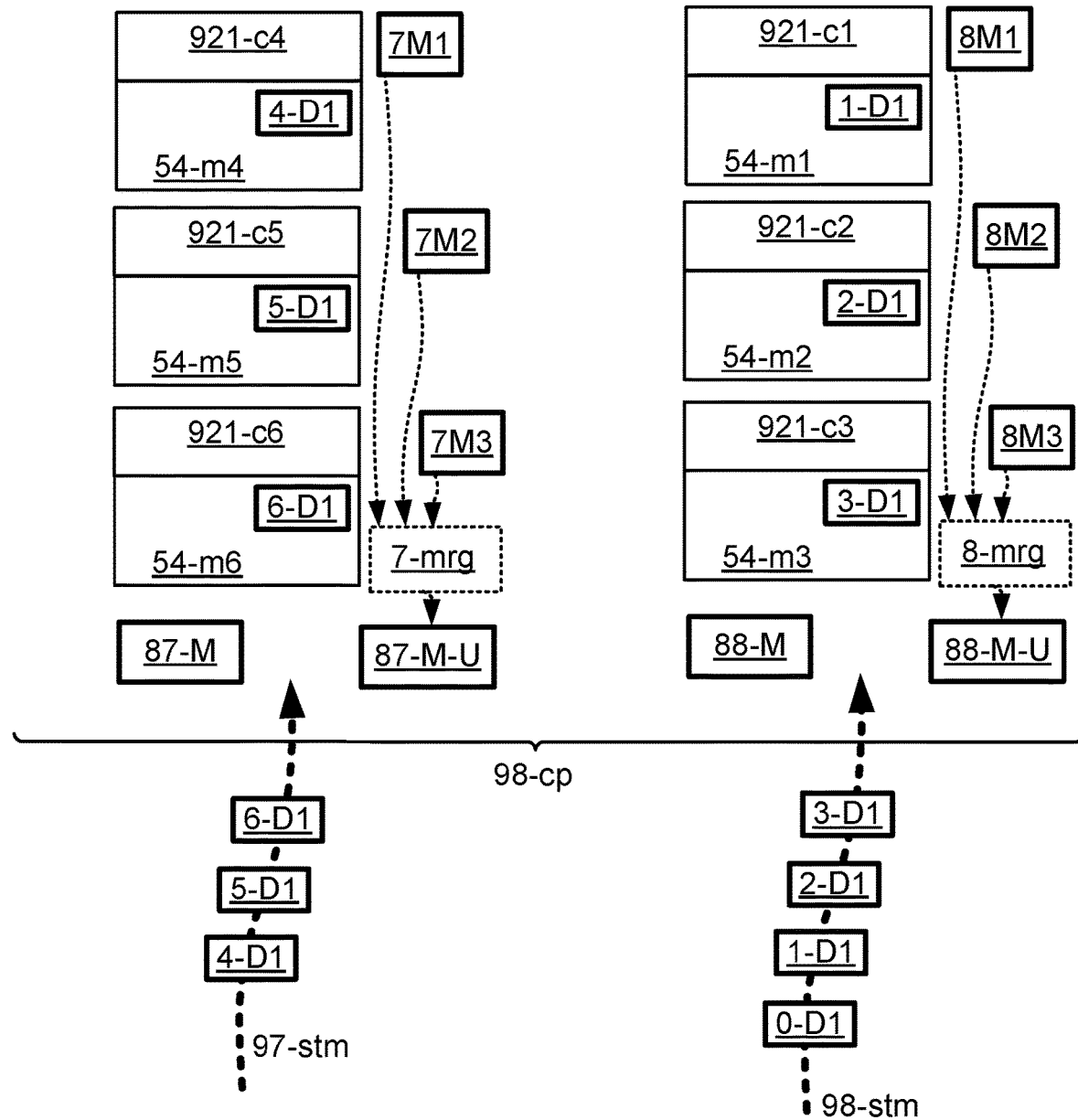
FIG. 19A illustrates one embodiment of a system for efficiently executing in real-time multiple machine learning processes, in which the system is shown prior to re-allocation of compute elements to meet the peak demand of a machine learning process.

FIG. 19A illustrates one embodiment of a system operative to execute in real-time a plurality of machine learning processes. The system includes a computing platform 98-*cp* with multiple compute elements 921-*c*1, 921-*c*2, 921-*c*3, 921-*c*4, 921-*c*6, 921-*c*6. Each compute element may be associated with its own memory, 921-*c*1 with 54-*m*1, 921-*c*2 with 54-*m*2, 921-*c*3 with 54-*m*3, 921-*c*4 with 54-*m*4, 921-*c*5 with 54-*m*5, 921-*c*6 with 54-*m*6. The system includes also multiple mathematical models 87-M, 88-M in a certain state at a particular point in time, prior to such models being "trained" or updated by a machine learning process.

FIG. 19A illustrates the state of a system at a particular point of time, prior to the re-allocation of compute elements from one machine learning process to another machine learning process. There are two streams of data associated with machine learning processes, data stream 97-*stm* associated with a first machine learning process, and data stream 98-*stm* associated with a second machine learning process. Data stream 97-*stm* includes data sets 4-D1, 5-D1, 6-D1, and data stream 98-*stm* includes data sets 0-D1, 1-D1, 2-D1, 3-D3, in which the data sets are located initially outside the computing platform 98-*cp*, but which are then streamed continuously first into the computing platform 98-*cp* and then into the specific memories associated with the compute elements of the computing platform 98-*cp*. As shown in FIG. 19A, data set 4-D1 has been streamed into memory 54-*m*4, 5-D1 into 54-*m*5, 6-D1 into 54-*m*6, 1-D1 into 54-*m*1, 2-D1 into 54-*m*2, and 3-*di* into 54-*m*3. The compute elements associated with the various memories will process the data sets held in the memories to produce updated mathematical models with such data set. As shown, compute element 921-*c*4 processes data set 4-D1 to produce updated mathematical model 7M1, 921-*c*5 uses 5D1 to produce 7M2, 921-*c*6 uses 6-D1 to produce 7M3, 921-*c*1 uses 1-D1 to produce 8M1, 921-*c*2 uses 2-D1 to produce 8M2, and 921-*c*3 uses 3-D1 to produce 8M3. The various updated mathematical models are then combined through a merger procedure to produce a single updated mathematical model which is the original mathematical model that has been updated by the individual mathematical models. As shown, 7M1, 7M2, and 7M3, are combined through merger procedure 7-*mrg* to produce the single updated mathematical model 87-M-U, which is an updated version of the original single mathematical model 87-M, which has now been updated by the data sets 4-D1, 5-D1, and 6-D1, to particular mathematical models 7M1, 7M2, 7M3, respectively, which were merged 7-*mrg* to produce the single updated mathematical model 87-M-U.

Similarly, and also as shown, 8M1, 8M2, and 8M3, are combined through merger procedure 8-*mrg* to produce the single updated mathematical model 88-M-U, which is an updated version of the original single mathematical model 88-M, which has now been updated by the data sets 1-D1, 2-D1, and 3-D1, to particular mathematical models 8M1, 8M2, 8M3, respectively, which were merged 8-*mrg* to produce the single updated mathematical model 88-M-U.

Figure 19B:
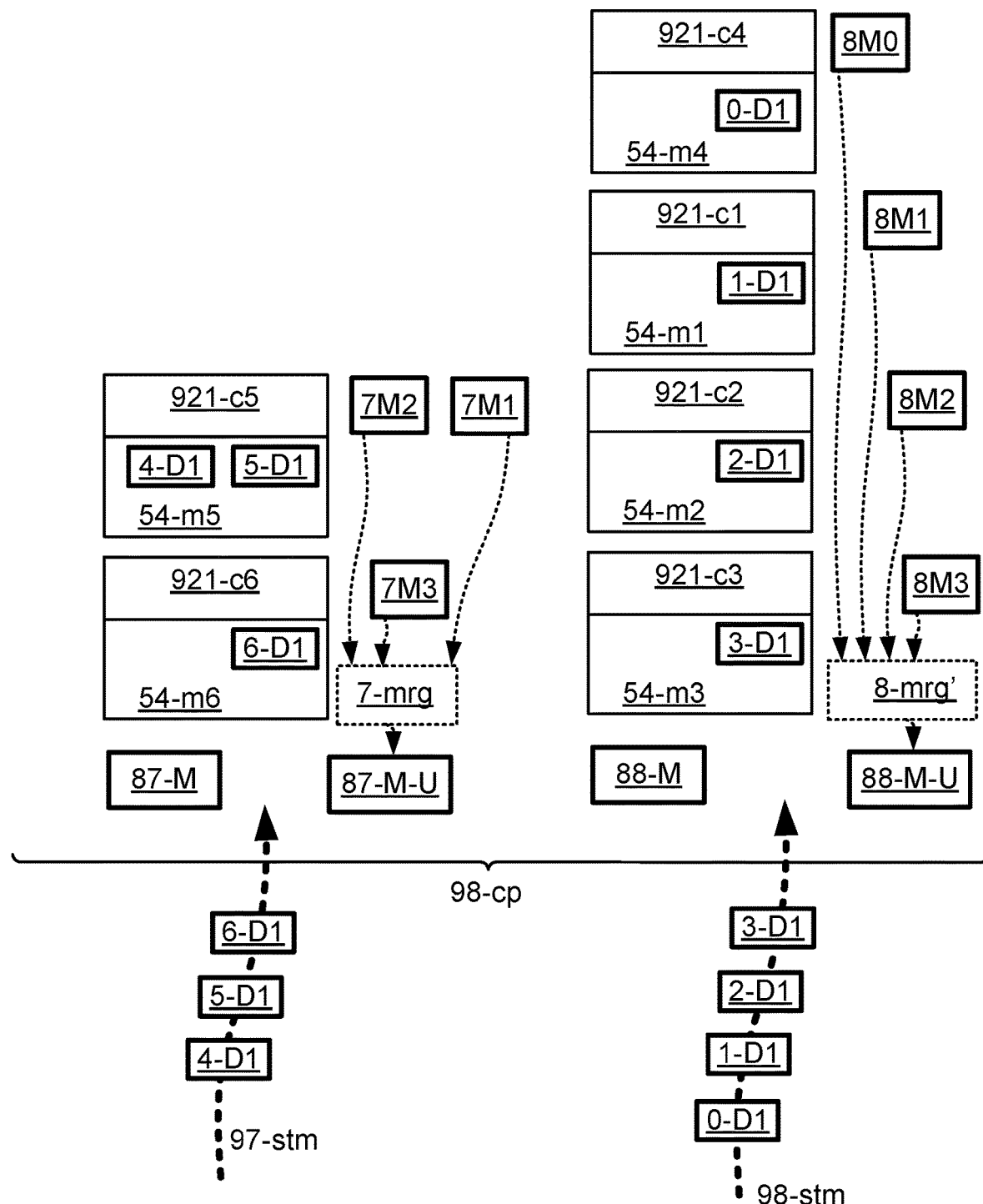
FIG. 19B illustrates one embodiment of a system for efficiently executing in real-time multiple machine learning processes, in which the system is shown after re-allocation of compute elements to meet the peak demand of a machine learning process.

FIG. 19B illustrates the state of a system at a particular point of time, after re-allocation of compute elements from one machine learning process to another machine learning process. All of the individual elements in FIG. 19B are the same elements as in FIG. 19A, but in FIG. 19B compute element 921-*c*4, with associated memory 54-*m*4, has been re-allocated from the first machine learning process associated with data stream 97-*stm* to the second machine learning process associated with data stream 98-*stm*. The machine learning processes in FIG. 19B place different processing demands on the system, such that the second machine learning process requires significantly greater processing resources than the first machine learning process. This may be due to different quantities of data to be processed, as, for example, 5-D1 and 6-D1 being processed in the first machine learning process, versus 0-D1, 1-D1, 2-D1, 3-D1, being processed in the second machine learning process. It may be due to the different complexities of the machine learning updates to original mathematical models, where, for example, the updated model 88-M-U is a significant and complex update from original model 88-M, versus the updated model 87-M-U is a relatively less significant and/or less complex update from original model 87-M. It may be due to the fact that more individual mathematical models are required in one machine learning process, where for example, as illustrated, the second machine leaning process requires updated mathematical models 8M0, 8M1, 8M2, and 8M3, whereas the first machine learning process requires only updated mathematical models 7M1, 7M2, and 7M3. The re-allocation of compute resources allows the system to handle efficiently, in real-time, the different processing demands placed on the system by the first and second machine learning processes. The re-allocation may be very temporary, perhaps on the order of few thousands of clock cycles of a CPU, or may be for a longer period of time, all in accordance with the different and changing processing demands placed on the system by additional machine learning processes. As a general matter, machine learning processes that have greater than average processing demands up to peak demands, are more likely to have compute elements re-allocated to them, while machine learning processes that have lesser than average processing demands down to dip demands, are more likely to have compute elements re-allocated away from them. In a system with many compute elements, data streams, data sets, and machine learning processes, statistically it is extremely unlikely that all or even a significant portion of the machine learning processes will reach or approach peak demands at one time, so that the compute elements required for computer processing of data sets may be shifted rapidly from one machine learning process to another in accordance with shifting processing demands. Machine learning processes often place heavy processing demands, at unpredictable times, on a compute system, so the ability to rapidly and effectively re-allocate computing resources, as described herein, will permit effective meeting of all processing demands while reducing, to the extent reasonably possible, the total amount of computing resources that must be within the system.

One embodiment is a system operative to execute in real-time a plurality of machine learning processes. A computing platform 98-*cp* includes multiple compute elements 921-*c*1, 921-*c*2, 921-*c*3, 921-*c*4, 921-*c*5, 921-*c*6. Further, there are multiple data streams 97-*stm*, 98-*stm*, with multiple data sets that are initially located outside the computing platform 98-*cp* but that are streamed into and received by the computing platform 98-*cp*. Each stream of data is associated with a machine learning process, 97-*stm* with a first process, 98-*stm* with a second process, and each machine learning process is operative to train, in real-time, a respective initial mathematical model 87-M with the first machine learning process, 88-M with the second machine learning process, using as real-time inputs the respective stream 97-*stm* with the first process, 98-*stm* with the second process, and in which each of the machine learning processes is characterized by having peak and dip demands for computational resources during progression of the training of the respective mathematical model 87-M, 88-M. Further, the system is configured to re-allocate, in real-time, the compute elements to the different machine learning processes according to the different and changing demands for computational resources, such that all of the peak demands are handled by the system on-the-fly by re-allocating more compute elements to the machine learning processes having the peak demands, thereby preventing the peak demands from stalling the system or otherwise causing the system to fail in the real-time training of the mathematical models. As one example, compute element 921-*c*4 is re-allocated from handing initial model 87-M and stream 97-*stm* as shown in FIG. 19A, to handling initial model 88-M and stream 98-*stm* in FIG. 19B, in which the machine learning process associated with initial model 88-M and stream 98-*stm* is currently in peak demand.

In one possible alternative embodiment to the system just described, further the multiple machine learning processes are uncorrelated the one with the other, therefore causing the respective peak processing demands to be uncorrelated in time, thereby enabling the system to avoid stalling by re-allocating the compute elements on a real-time basis to meet peak demands.

In a possible configuration of the possible alternative embodiment just described, further as a result of the multiple machine learning processes being uncorrelated, the system is able to avoid stalling even when a total processing power of the computing platform 98-*cp* is less that a certain processing power needed to handle all peak demands simultaneously. The reason is that it is extremely unlikely, to the point of statistical impossibility, that all of the peak demands by all of the uncorrelated machine learning processes would happen to arrive at the exact same time.

In a possible variation of the possible configuration just described, further as a result of an inherent nature of machine learning processes in general, the peak demand for computational resources is significantly higher than both the dip demand and an average demand for computational resources. Consequently, statistically speaking, as a result of said re-allocation in real time, the system is able prevent said stalling even when the total processing power of the computing platform is just at, or slightly higher than, the level of a processing power needed to merely handle all average demands simultaneously.

In a possible option of the possible variation just described, further as a result of the inherent nature of machine learning processes in general, the ratio between the peak demand and the dip demand for computational resources is above one hundred to one (above 100:1), and the ratio between the average demand and the dip demand for computational resources is below two to one (below 2:1). Therefore, the system is able to prevent stalling with less than two percent (2%) of the computational resources that would have otherwise been needed in a case in which re-allocation in real-time was not available.

Figure 20A:
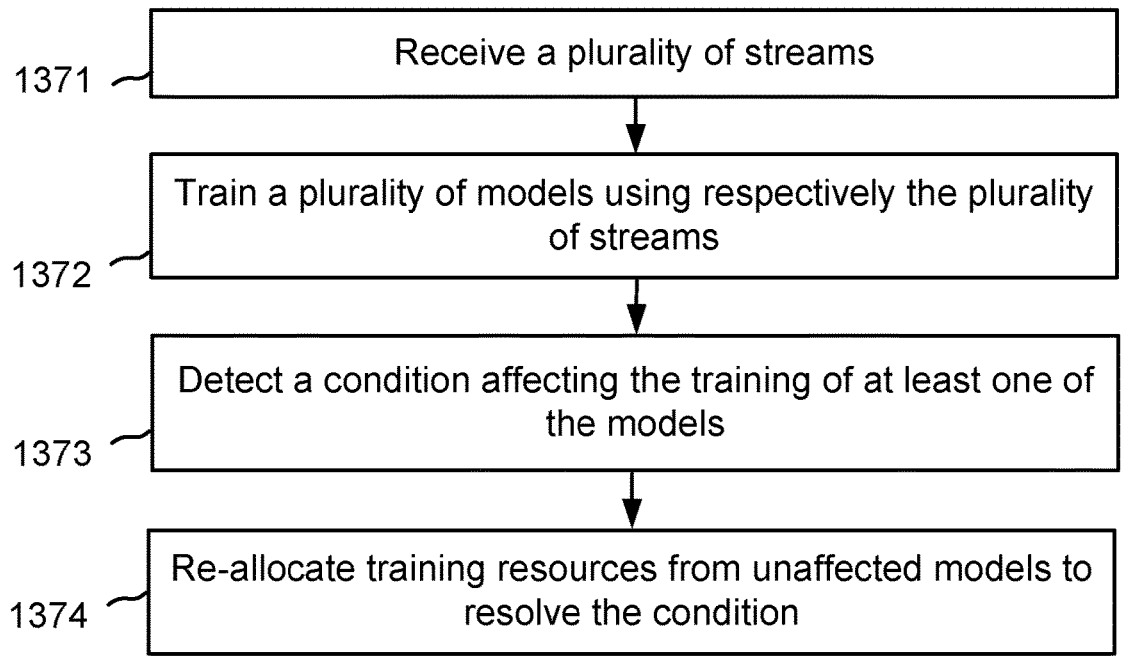
FIG. 20A illustrates one embodiment of a method for efficiently executing multiple real-time machine learning processes.

FIG. 20A illustrates one embodiment of a method for executing efficiently a plurality of machine learning processes. In step 1371, a computing platform 98-*cp*, which includes multiple compute elements 921-*c*1, 921-*c*2, 921-*c*3, 921-*c*4, 921-*c*5, 921-*c*6, receives multiple streams 97-*stm*, 98-*stm* of data sets 0-D1, 1-D1, 2-D1, 3-D1, 4-D1, 5-D1, 6-D1. In step 1372, the compute elements use as inputs the data sets in the multiple data streams 97-*stm*, 98-*stm* to train continuously multiple mathematical models 87-M, 88-M, in which the continuous training is executed respectively as a plurality of machine learning processes in conjunction with the compute elements. In step 1373, the computing platform 98-*cp* detects, during executing of the multiple machine learning processes, a temporary condition in which one of the continuous training of one of the mathematical models 88-M is lagging behind the respective stream 98-*stm* as a result of a temporary computational state associated with the mathematical model 88-M and the respective stream 98-*stm*. Despite the lag between the stream 98-*stm* and the continuous training of the mathematical model 88-M, the stream 98-*stm* continues to send data to the computing platform 98-*cp*, so that if no action is taken, ultimately the system may stall, or may discard critical data sets, or may take other action harmful to effective and efficient operation of the system. In step 1374, the computing platform 98-*cp* re-allocates, at least temporarily, some of the multiple compute elements away from at least some of the continuous training currently requiring less computational resources, and toward boosting performance of the continuous training which lags behind the stream 98-*stm*, thereby allowing the computing platform 98-*cp* to cope with the temporary condition. For example, compute element 921-*c*4 may be re-allocated from handing stream 97-*stm* in FIG. 19A, to handling stream 98-*stm* in FIG. 19B.

In a first possible alternative embodiment to the method described above for efficiently executing a plurality of machine learning processes, further the temporary computational state is a state in which the respective mathematical model 88-M has evolved into a certain state of the mathematical model which inherently requires more computational resources to process the respective data sets 0-D1, 1-D1, 2-D1, 3-D1 of the respective stream 98-*stm*.

In a first possible configuration of the first possible alternative embodiment just described, further boosting the performance of the continuous training which lags behind the stream 98-*stm* includes changing the respective mathematical model 88-M from the certain state of the mathematical model into a previous state of the mathematical model, and includes further re-training the respective mathematical model 88-M, using the respective data sets 0-D1, 1-D1, 2-D1, 3-D1, thereby converging to a new state of the mathematical model 88-M-U, which is different than the certain state, thereby eliminating the temporary computational state.

In one possible variation of the first possible configuration just describe, further re-training includes using the respective data sets 0-D1, 1-D1, 2-D1, 3-D1, repeatedly, a plurality of times, each time producing a different alternative state of the mathematical model 88-M, thereby producing a plurality of alternative states 88-M-U of the mathematical model. Re-training includes also selecting the best one of the plurality of alternative states as the new state of the mathematical model.

In a second possible configuration of the first possible alternative embodiment just described, said boosting of performance includes distributing the continuous training of the certain state of the mathematical model 88-M among the compute element(s) re-allocated toward the boosting 921-*c*4 and the initial compute elements 921-*c*1, 921-*c*2, 921-*c*3, thereby converging into a next state of the mathematical model 88-M-U which eliminates the temporary computational state in which there was a lag between the continuous training and the respective data stream 98-*stm*.

In a second possible alternative embodiment to the method described above for efficiently executing a plurality of machine learning processes, further the temporary computational state is a state in which the respective mathematical model 88-M is no longer valid in view of a certain change in the data sets 0-D1, 1-D1, 2-D1, 3-D1 of the respective stream 98-*stm*.

In a possible configuration of the second possible alternative embodiment just described, further the boosting of performance includes resetting the respective mathematical model 88-M into an initial mathematical model as a result of the change in the data sets, and re-training the initial mathematical model, using the respective data sets 0-D1, 1-D1, 2-D1, 3-D1, thereby converging to a new state of the mathematical model 88-M-U, and hence eliminating the temporary computational state.

In a third possible alternative embodiment to the method described above for efficiently executing a plurality of machine learning processes, further the respective mathematical model 88-M is a prediction model, a classification model, or a clustering model, in which the respective continuous training of the model, in view of the respective stream 98-*stm*, is done using a technique associated with a gradient-descent or stochastic-gradient-descent, and in which the temporary computational state is a state associated with poor convergence of the gradient-descent or stochastic-gradient-descent technique.

In a fourth possible alternative embodiment to the method described above for efficiently executing a plurality of machine learning processes, further the respective mathematical model 88-M is a neural network model, in which the respective continuous training of the model, in view of the respective stream 98-*stm*, is done using a technique associated with deep learning, and in which the temporary computational state is a state associated with a need to either increase a complexity of the neural network model or increase a number of layers associated with the neural network model.

Figure 20B:
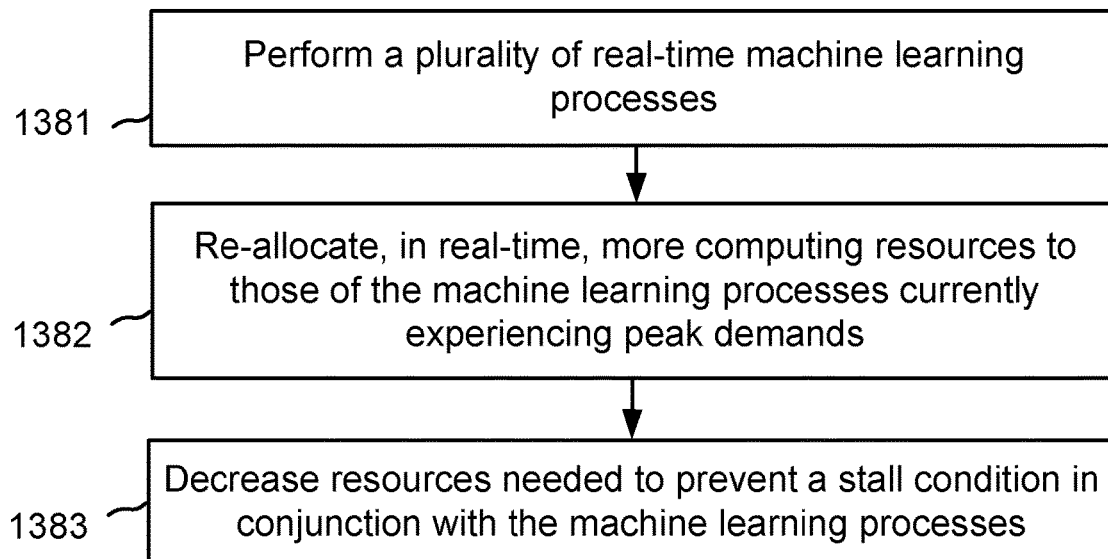
FIG. 20B illustrates one embodiment of a method for reducing significantly the processing resources needed to execute multiple real-time machine learning processes.

FIG. 20B illustrates one embodiment of a method for significantly reducing processing resources needed to execute multiple real-time machine learning processes. In step 1381, a computing platform 98-*cp* that includes multiple compute elements 921-*c*1, 921-*c*2, 921-*c*3, 921-*c*4, 921-*c*5, 921-*c*6, performs multiple real-time machine learning processes associated with, respectively, multiple real-time streams 97-*stm*, 98-*stm*, in which each of the machine learning processes is inherently characterized by having a peak demand for computational resources that is significantly higher than an average demand for computational resources. In step 1382, the computing platform 98-*cp* re-allocates, in real-time, the compute elements 921-*c*1, 921-*c*2, 921-*c*3, 921-*c*4, 921-*c*5, 921-*c*6 to the different machine learning processes according to the processing demands, such that all of the peak demands are handled by the computing platform on-the-fly by re-allocating more compute elements to the machine learning processes currently having the peak demands, and thereby preventing the peak demands from stalling the system. For example, compute element 921-*c*4 may be re-allocated from handling model 87-M and stream 97-*stm* in FIG. 19A, to handling model 88-M and stream 98-*stm* in FIG. 19B, in which the machine learning process associated with model 88-M and stream 98-*stm* is currently in peak demand. In step 1383, as a result of the re-allocation of compute resources, the system significantly increases the utilization rate of the multiple compute elements, and thereby decreases the actual number of compute elements needed to prevent a stalling of the system.

In a possible alternative embodiment to the method described above for significantly reducing processing resources needed to execute multiple real-time machine learning processes, further the multiple real-time machine learning processes are uncorrelated, therefore causing the respective peak demands to be uncorrelated in time, thereby enabling the system to achieve the decrease in actual number of compute elements needed to prevent a stalling of the system.

In a first possible configuration of the possible alternative embodiment to the method just described, further the plurality of machine learning processes are uncorrelated as a result of the streams 97-*stm*, 98-*stm* being originated by different and uncorrelated sources. In one embodiment, the different and uncorrelated sources are associated respectively with different clients using the computing platform 98-*cp* as a shared machine learning platform, in which the shared machine learning platform is a data center adapted particularly to handle, in real-time, machine learning requirements of the different clients.

In a second possible configuration of the possible alternative embodiment described above, further the multiple machine learning processes are uncorrelated as a result of the streams 97-*stm*, 98-*stm* being made intentionally uncorrelated by adapting, rearranging, reordering, or otherwise manipulating a single real-time stream, such as a combined stream 97-*stm* and 98-*stm*, into the component parts of stream 97-*stm* and stream 98-*stm* which are uncorrelated.

In a third possible configuration of the possible alternative embodiment described above, further the multiple machine learning processes are uncorrelated as a result of a breaking of a single master machine learning process into the multiple machine learning processes.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagram illustrates non-limiting embodiment/case example of the methods, and block diagrams illustrate non-limiting embodiment/case examples of the devices. Some operations in the flow diagram may be described with reference to the embodiments/cases illustrated by the block diagrams. However, the method of the flow diagram could be performed by embodiments/cases of the invention other than those discussed with reference to the block diagrams, and embodiments/cases discussed with reference to the block diagrams could perform operations different from those discussed with reference to the flow diagram. Moreover, although the flow diagram may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, a system may include multiple compute elements, each of which is communicatively connected to multiple servers, even though specific illustrations presented herein include only one compute element or a maximum of two compute elements.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for efficiently executing a plurality of machine learning processes, comprising:
   receiving, in a computing platform comprising a plurality of compute elements, a plurality of streams of data sets;
   continuous training, by the plurality of compute elements, of a plurality of mathematical models using respectively the plurality of streams acting as inputs, in which said continuous training is executed respectively as a plurality of machine learning processes in conjunction with the plurality of compute elements, wherein the plurality of mathematical models include a first mathematical and a second mathematical model, wherein the plurality of compute elements include one or more first compute elements allocated to the continuous training of the first mathematical model and one or more second compute elements allocated to the continuous training of the second mathematical model;

detecting, in the computing platform, during executing of the plurality of machine learning processes, a temporary condition in which the continuous training of the second mathematical model is lagging behind a respective stream of the plurality of streams of data sets as a result of a temporary computational state associated with the second mathematical model and the respective stream; and at least temporarily re-allocating at least one of the one or more first compute elements from the continuous training of the first mathematical model to the continuous training of the second mathematical model based, at least in part, on the detected temporary condition and on a utilization of the re-allocated at least one first compute element being lower than a utilization of the one or more second compute elements, thereby boosting performance of said continuous training which lags behind the respective stream, thereby allowing the computing platform to cope with the temporary condition.

2. The method of claim 1, wherein the temporary computational state is a state in which the second mathematical model has evolved into a certain state in which the second mathematical model requires more computational resources to process the respective data sets of the respective stream.

3. The method of claim 2, wherein said boosting of performance comprises:

changing the second mathematical model from the certain state of the second mathematical model into a previous state of the second mathematical model; and re-training the second mathematical model, using the respective data sets, thereby converging to a new state of the second mathematical model, which is different than said certain state, thereby eliminating the temporary computational state.

4. The method of claim 3, wherein said re-training comprises:

using the respective data sets, repeatedly, a plurality of times, each time producing a different alternative state of the second mathematical model, thereby producing a plurality of alternative forms of the second mathematical model; and selecting one of the plurality of alternative forms as the new state of the mathematical model.

5. The method of claim 2, wherein said boosting of performance comprises:

distributing the continuous training of the certain state of the second mathematical model among the at least one first compute elements re-allocated toward said boosting, thereby converging into a next state of the mathematical model which eliminates the temporary computational state.

6. The method of claim 1, wherein the temporary computational state is a state in which the second mathematical model is no longer valid in view of a certain change in the data sets of the respective stream.

7. The method of claim 6, wherein said boosting of performance comprises:

resetting the second mathematical model into an initial state as a result of said change; and re-training the second mathematical model, using the respective data sets, thereby converging to a new state of the second mathematical model, thereby eliminating the temporary computational state.

8. The method of claim 1, wherein the second mathematical model is a prediction model, a classification model, or a clustering model, in which the continuous training of the second mathematical model, in view of the respective stream, is done using a technique associated with a gradient-descent or stochastic-gradient-descent, in which said temporary computational state is a state associated with poor convergence of the gradient-descent or stochastic-gradient-descent technique.

9. The method of claim 1, wherein the second mathematical model is a neural network model, in which the continuous training of the second mathematical model, in view of the respective stream, is done using a technique associated with deep learning, in which said temporary computational state is a state associated with a need to either increase a complexity of the neural network model or increase a number of layers associated with the neural network model.

10. A system comprising:

a computing platform comprising a plurality of compute elements, wherein the computing platform is configured to perform operations including:

receiving a plurality of streams of data sets;

continuous training, by the plurality of compute elements, of a plurality of mathematical models using respectively the plurality of streams acting as inputs, in which said continuous training is executed respectively as a plurality of machine learning processes in conjunction with the plurality of compute elements, wherein the plurality of mathematical models include a first mathematical and a second mathematical model, wherein the plurality of compute elements include one or more first compute elements allocated to the continuous training of the first mathematical model and one or more second compute elements allocated to the continuous training of the second mathematical model;

detecting, during executing of the plurality of machine learning processes, a temporary condition in which the continuous training of the second mathematical model is lagging behind a respective stream of the plurality of streams of data sets as a result of a temporary computational state associated with the second mathematical model and the respective stream; and at least temporarily re-allocating at least one of the one or more first compute elements from the continuous training of the first mathematical model to the continuous training of the second mathematical model based, at least in part, on the detected temporary condition and on a utilization of the re-allocated at least one first compute element being lower than a utilization of the one or more second compute elements, thereby boosting performance of said continuous training which lags behind the respective stream, thereby allowing the computing platform to cope with the temporary condition.

11. The system of claim 10, wherein the plurality of machine learning processes are uncorrelated such that respective peak demands of the plurality of machine learning processes for computational resources are uncorrelated in time.

12. The system of claim 11, wherein as a result of the plurality of machine learning processes being uncorrelated, the system is able to avoid stalling despite a total processing power of the computing platform being less than a certain processing power needed to handle all the peak demands simultaneously.

13. The system of claim 12, wherein the peak demand for computational resources is higher than both the dip demand and an average demand for computational resources, and as a result of said re-allocation, the system prevents said stalling when the total processing power of the computing platform is greater than or equal to a level of a processing power needed to handle all average demands simultaneously.

14. The system of claim 13, wherein:
a ratio between the peak demand and the dip demand for computational resources is above one hundred to one;
a ratio between the average demand and the dip demand for computational resources is below two to one;
and therefore the system is able to prevent said stalling with less than two percent of the computational resources that would have otherwise been needed in a case that said re-allocation in real-time was not available.

15. The method of claim 1, wherein the plurality of machine learning processes are uncorrelated, therefore causing the respective peak demands to be uncorrelated in time, thereby enabling the system to achieve said decrease in actual number of said compute elements needed to prevent the system from stalling.

16. The method of claim 1, wherein the plurality of machine learning processes are uncorrelated as a result of the streams being originated by different uncorrelated sources.

17. The method of claim 1, wherein the plurality of machine learning processes are uncorrelated as a result of the streams being made intentionally uncorrelated by adapting, rearranging, reordering, or otherwise manipulating a single stream into said plurality of streams which are uncorrelated.

18. The method of claim 1, wherein the plurality of machine learning processes are uncorrelated as a result of breaking a single master machine learning process into said plurality of machine learning processes.

19. The method of claim 1, wherein the training of each of the plurality of mathematical models is characterized by having a peak demand and a dip demand for computational resources, wherein the peak demand for computational resources is higher than both the dip demand and an average demand for computational resources.

20. The method of claim 1, wherein the training of each of the plurality of mathematical models is characterized by having a peak demand and a dip demand for computational resources, wherein the peak demand for computational resources is higher than both the dip demand and an average demand for computational resources.

\* \* \* \* \*